(12) United States Patent
Morimoto et al.

(10) Patent No.: US 8,222,326 B2
(45) Date of Patent: Jul. 17, 2012

(54) WATER-BASED INK COMPOSITION FOR INKJET RECORDING

(75) Inventors: Kiyoshi Morimoto, Kanagawa (JP); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 414 days.

(21) Appl. No.: 12/535,702

(22) Filed: Aug. 5, 2009

(65) Prior Publication Data
US 2010/0160504 A1 Jun. 24, 2010

(30) Foreign Application Priority Data

Aug. 14, 2008 (JP) .................................. 2008-209008

(51) Int. Cl.
*C09D 11/10* (2006.01)
(52) U.S. Cl. ............ 524/88; 524/105; 524/90; 524/190; 524/556; 347/21; 427/288; 427/256
(58) Field of Classification Search ............... 524/88, 524/90, 105, 190, 556; 427/288, 256; 347/21
See application file for complete search history.

(56) References Cited

U.S. PATENT DOCUMENTS 5,298,535 A * 3/1994 Kammer ..................... 524/190

FOREIGN PATENT DOCUMENTS

| EP | 1666547 A | 6/2006 |
| EP | 2042570 A | 4/2009 |
| JP | 2000-239594 A | 9/2000 |
| WO | 2006/006703 A | 1/2006 |
| WO | 2008/056828 A | 5/2008 |
| WO | 2009/005137 A | 1/2009 |
| WO | WO 2009/005137 * | 1/2009 |

OTHER PUBLICATIONS

Corresponding EPO Official Communication.

* cited by examiner

*Primary Examiner* — Robert D. Harlan
(74) *Attorney, Agent, or Firm* — SOLARIS Intellectual Property Group, PLLC

(57) ABSTRACT

The invention provides a water-based ink composition for inkjet recording which contains vinyl polymer particles containing a styrene-acrylic acid copolymer in which the total content of the constitutional units derived from styrene monomer, acrylic acid, and methacrylic acid is 45% by mass or more; and at least one of an azo pigment represented by Formula (1), a tautomer thereof, a salt or hydrate thereof; and a water-based liquid medium, and which is excellent in discharge stability after a long-term storage or after aging at high temperatures:

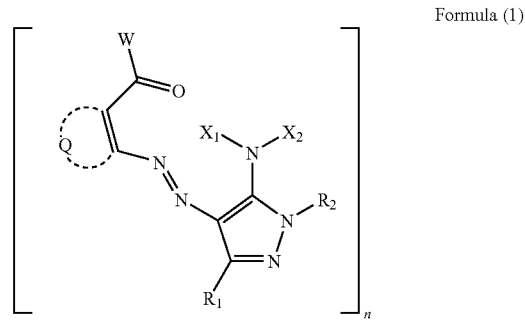

Formula (1)

Figure 17:
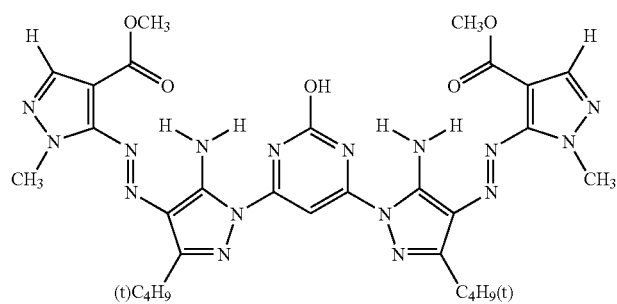
Figure 18:
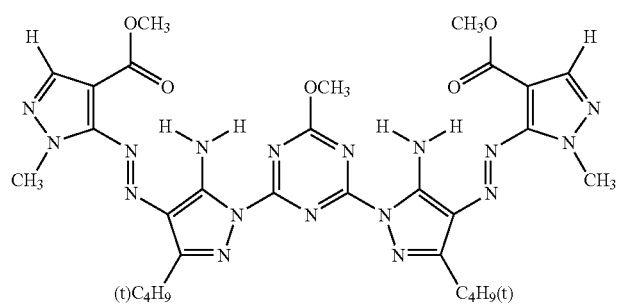
Figure 19:
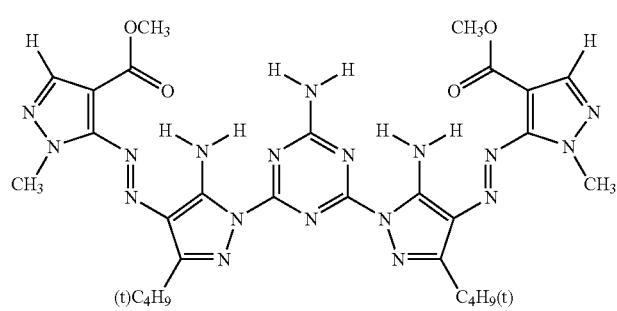
Figure 20:
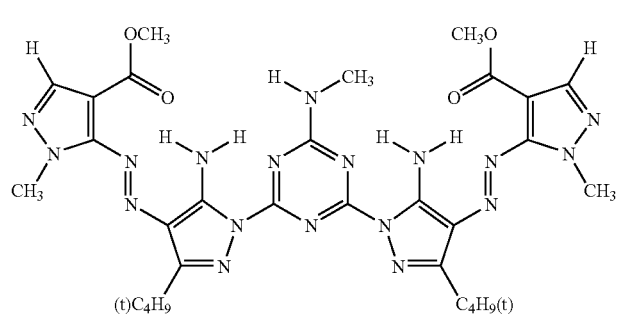
Figure 21:
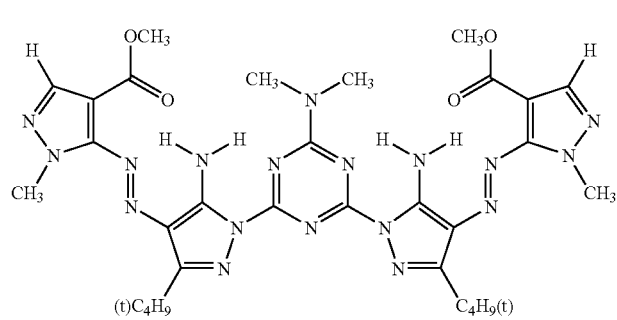
Figure 22:
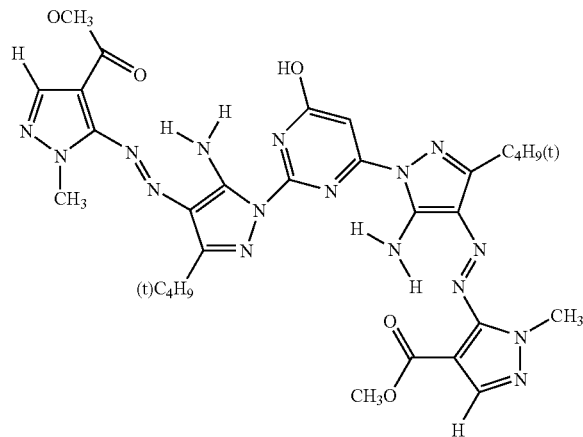
Figure 23:
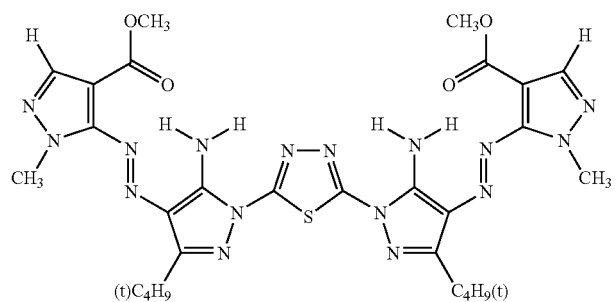
Figure 24:
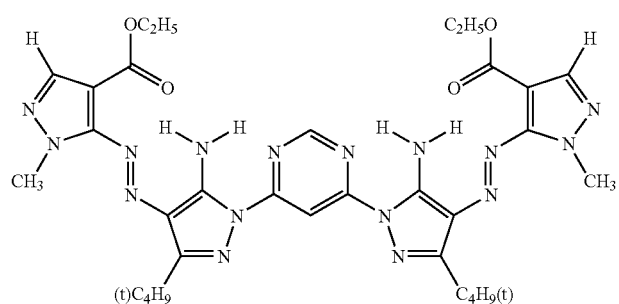
Figure 25:
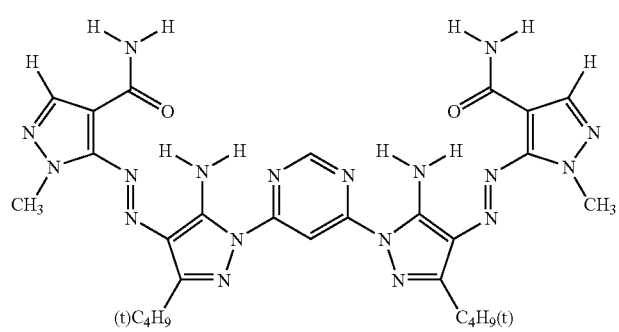
Figure 26:
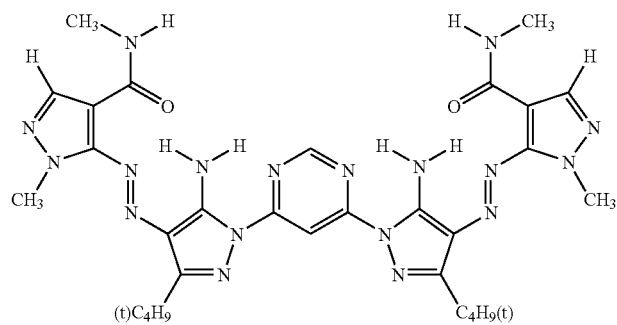
Figure 27:
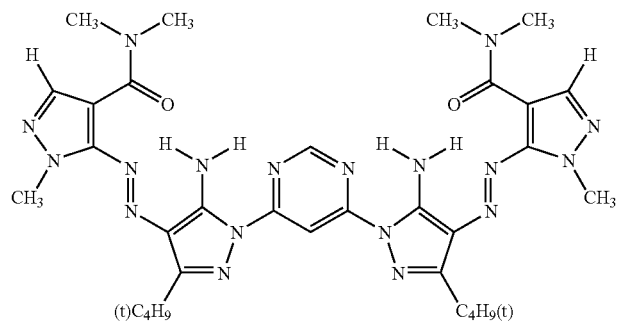
Figure 28:
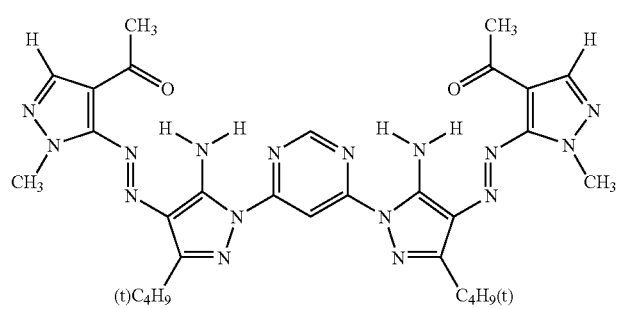
Figure 29:
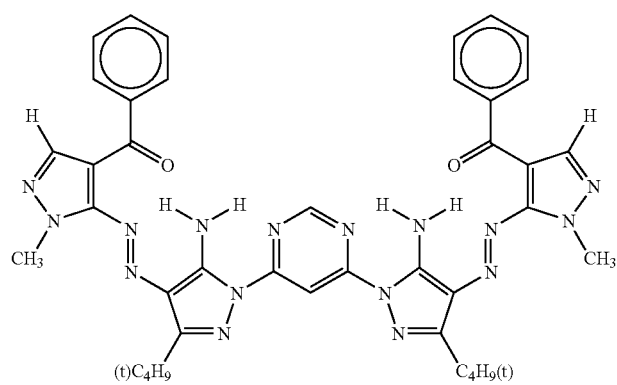
Figure 30:
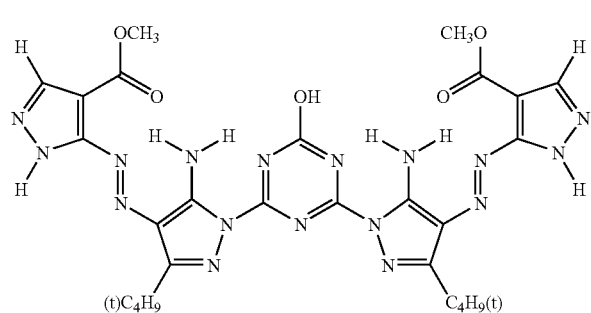
Figure 31:
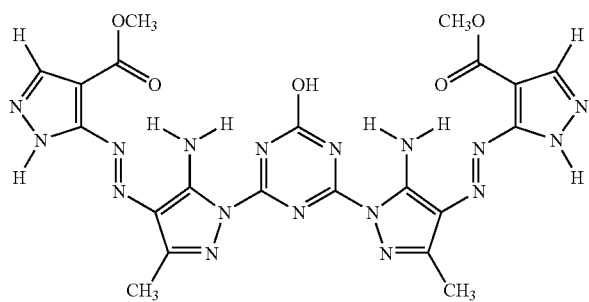
Figure 32:
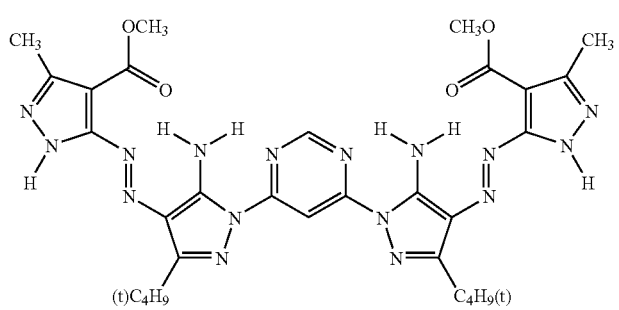
Figure 33:
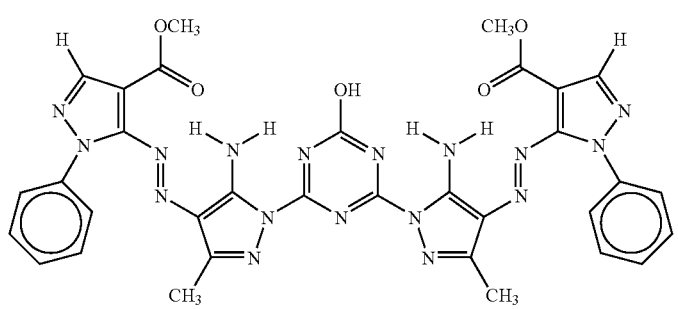
Figure 34:
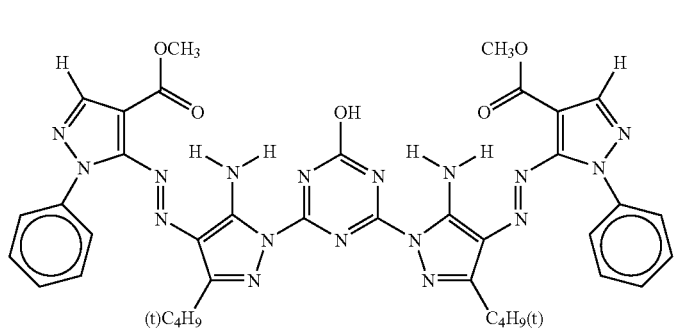
Figure 35:
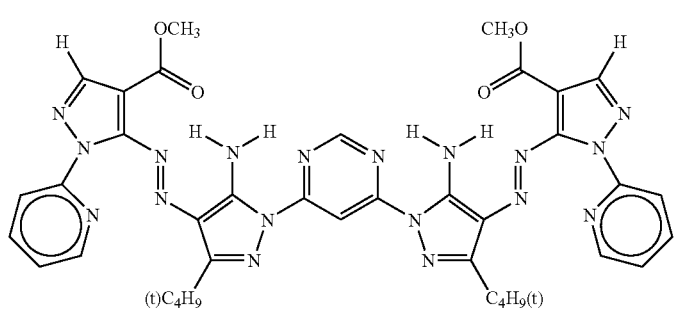
Figure 36:
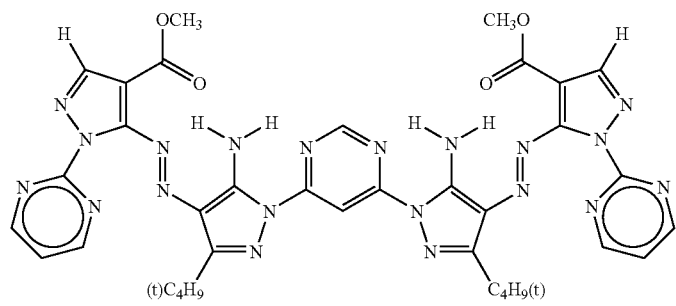
Figure 37:
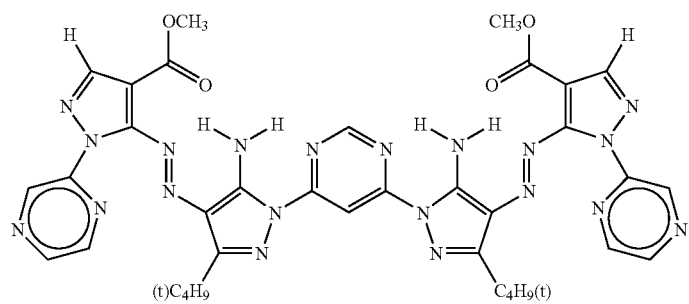
Figure 38:
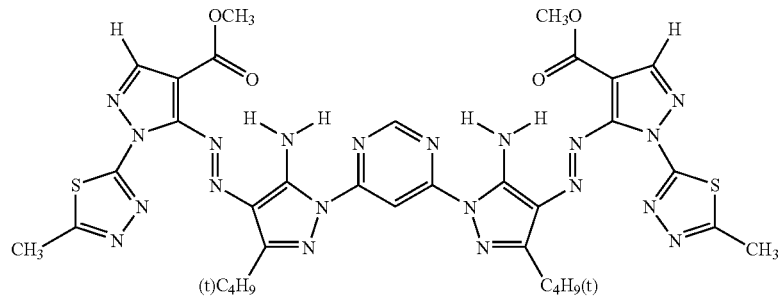
Figure 39:
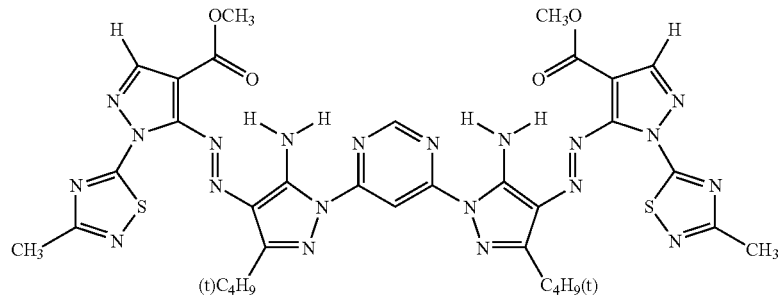
Figure 40:
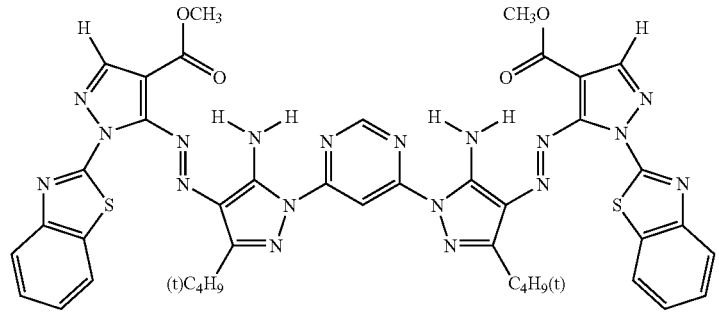
Figure 46:
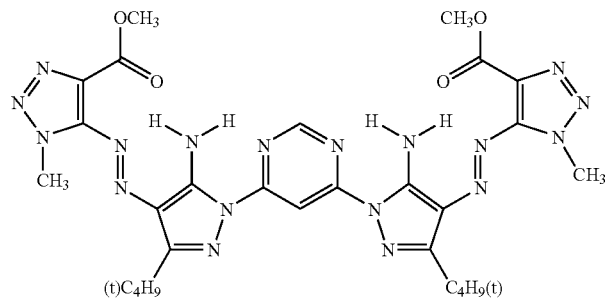
Figure 47:
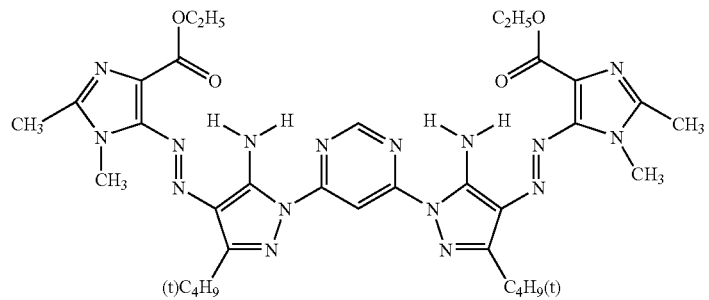
Figure 48:
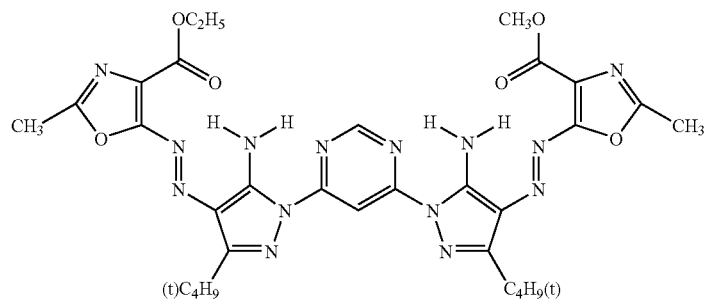
Figure 49:
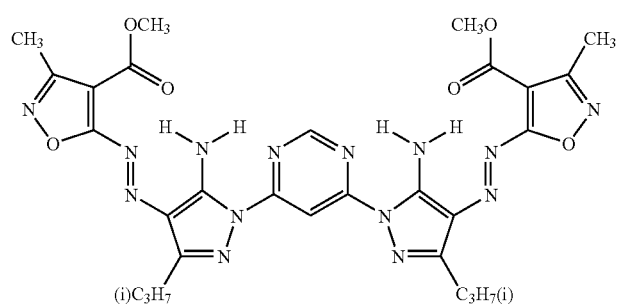
Figure 50:
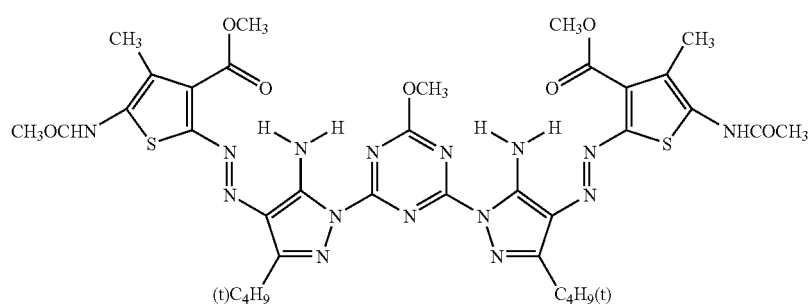
Figure 61:
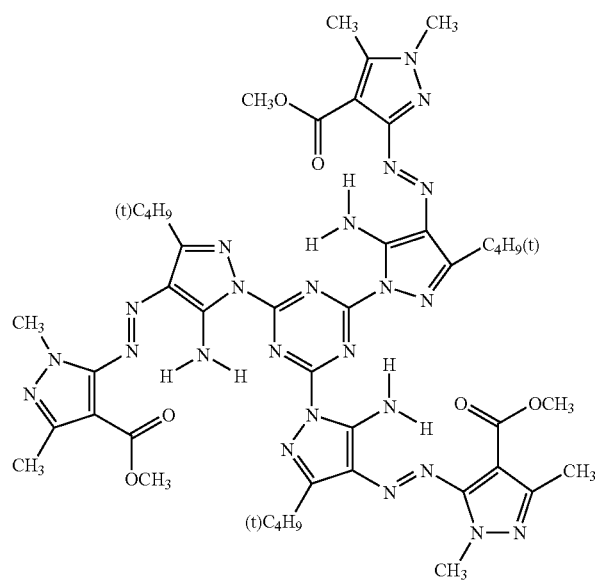
Figure 62:
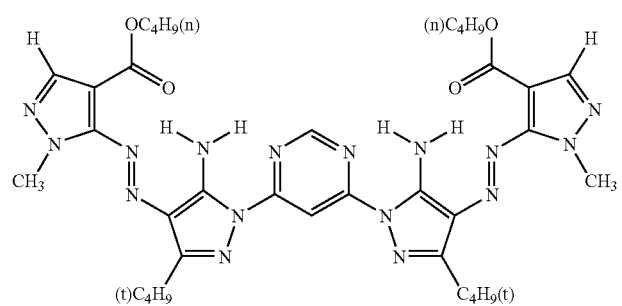
Figure 63:
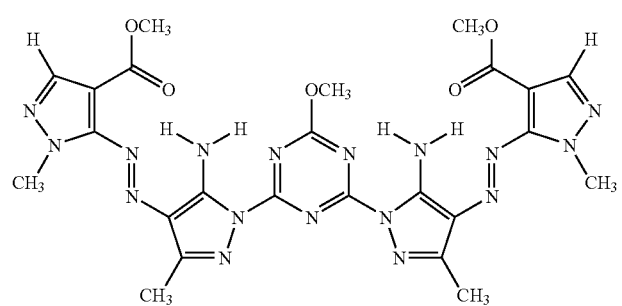
Figure 64:
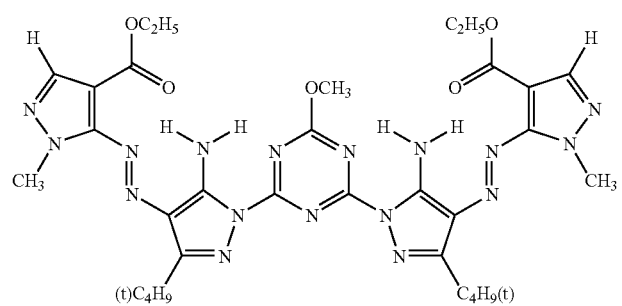
Figure 65:
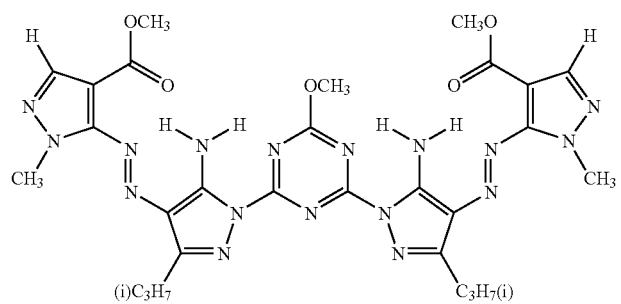
Figure 66:
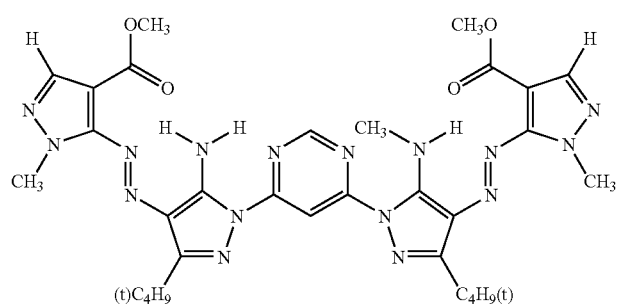
Figure 67:
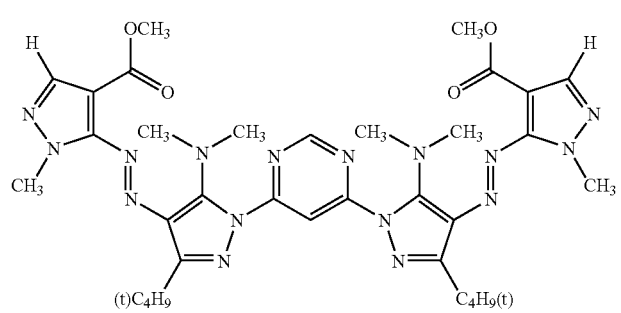
Figure 68:
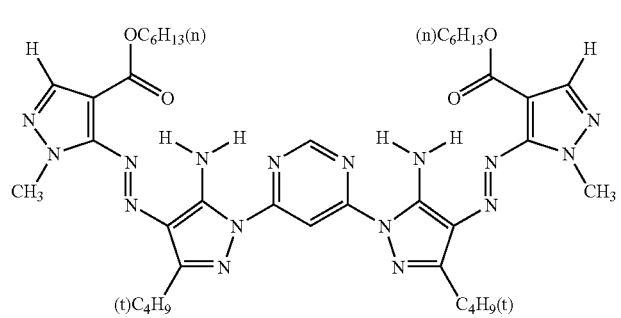
Figure 69:
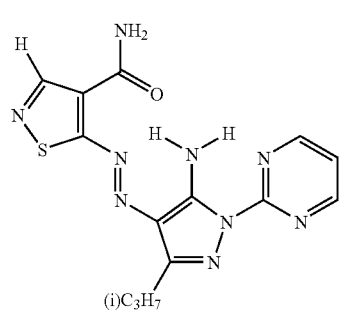

wherein, Q represents a heterocyclic group; W represents an alkoxy group, an amino group etc.; $X_1$ and $X_2$ each independently represent a hydrogen atom, an alkyl group etc.; $R_1$ represents a hydrogen atom or a substituent; $R_2$ represents a heterocyclic group; and n represents an integer of 1 to 4.

19 Claims, No Drawings

WATER-BASED INK COMPOSITION FOR INKJET RECORDING

CROSS-REFERENCE TO RELATED APPLICATION

This application claims priority under 35 USC 119 from Japanese Patent Application No. 2008-209008 filed on Aug. 14, 2008, the disclosure of which is incorporated by reference herein.

BACKGROUND OF THE INVENTION

1. Field of the Invention

The present invention relates to a water-based ink composition for inkjet recording (with which an image is recorded by an inkjet method).

2. Related Art

Various media have been used as a recording medium for ink jet recording. A high-definition image quality has been required for not only inkjet dedicated paper, but also commercially available plain paper and printing media such as fine paper, coat paper, or art paper. When the plain paper or the printing media is used, it is suitable to use a pigment as an ink color material which gives fastness such as waterproof properties or light resistance. From the viewpoints of cost and the like, the application of a water-based pigment ink has been variously examined.

Among them, an azo pigment (for example, C.I. Pigment Yellow 74) has been preferably used as a yellow pigment which is used for a water-based pigment ink for inkjet recording.

As the water-based pigment ink, a water-based ink composition for inkjet recording which includes a pigment dispersion containing C. I. Pigment Yellow 74 pigment and an anionic group-containing organic polymer is disclosed (for example, refer to Japanese Patent Application Laid-Open (JP-A) No. 2000-239594). Specifically, a good dispersibility and dispersion stability may be obtained by using C.I. Pigment Yellow 74 as a pigment, and a copolymer of n-butyl methacrylate, n-butyl acrylate, 2-hydroxyethyl methacrylate, methacrylic acid and styrene as a dispersing agent, and whereby a clear image may be formed.

SUMMARY OF THE INVENTION

It is found that when the water-based ink composition for inkjet recording formed using the pigment dispersion described in JP-A No. 2000-239594 is used after being stored for a long period or after aging at high temperatures, a satisfactory level is not obtained from the viewpoint of non-discharge caused by clogging. In view of the above circumstances, it is an object of the present invention to provide a water-based ink composition for inkjet recording which is excellent in discharge stability after long-term storage or after aging at high temperatures. More specifically, an aspect of the present invention provides a water-based ink composition for inkjet recording, including vinyl polymer particles and a water-based liquid medium, the vinyl polymer particles including: a styrene-acrylic acid copolymer including a constitutional unit derived from a styrene monomer and a constitutional unit derived from at least either acrylic acid or methacrylic acid in which the total content of the constitutional units derived from the styrene monomer, acrylic acid, and methacrylic acid is 45% by mass or more; and at least one of an azo pigment represented by the following Formula (1), a tautomer thereof, a salt of the azo pigment or tautomer, or a hydrate of the azo pigment or tautomer:

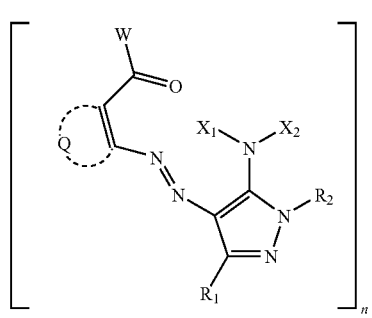

Formula (1)

wherein, in Formula 1, Q represents a 5- to 7-membered heterocycle together with two carbon atoms to which Q is bonded; W represents an alkoxy group, an amino group, an alkyl group, or an aryl group; $X_1$ and $X_2$ each independently represent a hydrogen atom, an alkyl group, an acyl group, an alkylsulfonyl group, or an arylsulfonyl group; $R_1$ represents a hydrogen atom or a substituent; $R_2$ represents a heterocyclic group; and n represents an integer of 1 to 4, provided that in the case of n=2 to 4, Formula (1) represents a dimer, a trimer, or a tetramer which is bonded via Q, W, $X_1$, $X_2$, $R_1$, or $R_2$.

DETAILED DESCRIPTION OF THE INVENTION

The present inventors found, after studying hard the problems, that the objects to solve the problems may be achieved by items <1> to <19> shown below.

<1> A water-based ink composition for inkjet recording, including vinyl polymer particles and a water-based liquid medium, the vinyl polymer particles including: a styrene-acrylic acid copolymer including a constitutional unit derived from a styrene monomer and a constitutional unit derived from at least either acrylic acid or methacrylic acid, in which the total content of the constitutional units derived from the styrene monomer, acrylic acid, and methacrylic acid is 45% by mass or more, and at least one of an azo pigment represented by the following Formula (1), a tautomer thereof, a salt of the azo pigment or tautomer, or a hydrate of the azo pigment or tautomer:

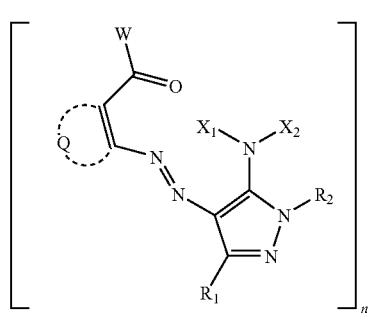

Formula (1)

wherein, in Formula 1, Q represents a 5- to 7-membered heterocycle together with two carbon atoms to which Q is bonded; W represents an alkoxy group, an amino group, an alkyl group, or an aryl group; $X_1$ and $X_2$ each independently represent a hydrogen atom, an alkyl group, an acyl group, an alkylsulfonyl group, or an arylsulfonyl group; $R_1$ represents a hydrogen atom or a substituent; $R_2$ represents a heterocyclic group; and n represents an integer of 1 to 4, provided that in the case of n=2 to 4, Formula (1) represents a dimer, a trimer, or a tetramer which is bonded via Q, W, $X_1$, $X_2$, $R_1$, or $R_2$.

<2> The water-based ink composition for inkjet recording according to the item <1>, wherein the total content of the constitutional unit derived from the styrene monomer, acrylic acid, and methacrylic acid is in a range of from 60% by mass to 90% by mass in the styrene-acrylic acid copolymer.

<3> The water-based ink composition for inkjet recording according to the item <1> or the item <2>, wherein an acid value of the styrene-acrylic acid copolymer is in a range of from 50 mgKOH/g to 250 mgKOH/g.

<4> The water-based ink composition for inkjet recording according to any one of the items <1> to <3>, wherein a weight average molecular weight (Mw) of the styrene-acrylic acid copolymer is from 20,000 to 50,000.

<5> The water-based ink composition for inkjet recording according to any one of the items <1> to <4>, wherein the styrene-acrylic acid copolymer is a styrene-acrylic acid-methacrylic acid-methacrylic acid ester copolymer.

<6> The water-based ink composition for inkjet recording according to any one of the items <1> to <5>, wherein the azo pigment represented by Formula (1) is represented by the following Formula (2):

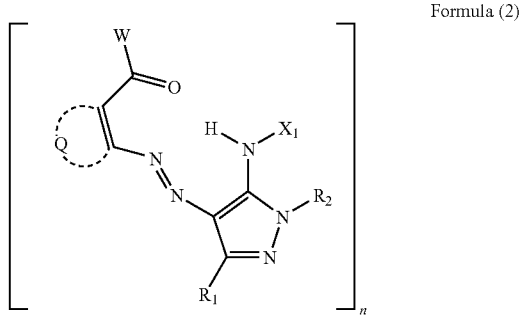

Formula (2)

wherein, in Formula (2), Q represents a 5- to 7-membered heterocycle together with two carbon atoms to which Q is bonded; W represents an alkoxy group, an amino group, an alkyl group, or an aryl group; $X_1$ represents a hydrogen atom, an alkyl group, an acyl group, an alkylsulfonyl group, or an arylsulfonyl group; $R_1$ represents a hydrogen atom or a substituent; $R_2$ represents a heterocyclic group; and n represents an integer of 1 to 4 provided that in the case of n=2 to 4, Formula (2) represents a dimer, a trimer or a tetramer which is bonded via Q, W, $X_1$, $R_1$, or $R_2$.

<7> The water-based ink composition for inkjet recording according to any one of the items <1> to <6>, wherein Q in Formula (1) or Formula (2) represents a 5-membered nitrogen-containing heterocycle together with two carbon atoms to which Q is bonded.

<8> The water-based ink composition for inkjet recording according to any one of the items <1> to <7>, wherein n in Formula (1) or Formula (2) is 2.

<9> The water-based ink composition for inkjet recording according to any one of the items <6> to <8>, wherein $X_1$ in Formula (2) is a hydrogen atom.

<10> The water-based ink composition for inkjet recording according to any one of the items <1> to <5>, wherein the azo pigment represented by Formula (1) is represented by the following Formula (3):

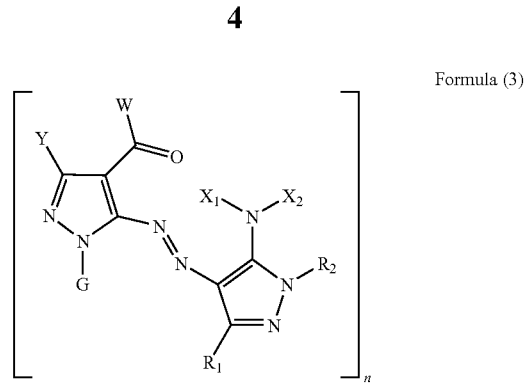

Formula (3)

wherein, in Formula (3), Y represents a hydrogen atom or a substituent; G represents a hydrogen atom, an alkyl group, a cycloalkyl group, an aralkyl group, an alkenyl group, an alkynyl group, an aryl group, or a heterocyclic group; W represents an alkoxy group, an amino group, an alkyl group, or an aryl group; $X_1$ and $X_2$ each independently represent a hydrogen atom, an alkyl group, an acyl group, an alkylsulfonyl group, or an arylsulfonyl group; $R_1$ represents a hydrogen atom or a substituent; $R_2$ represents a heterocyclic group; and n represents an integer of 1 to 4 provided that in the case of n=2 to 4, Formula (3) represents a dimer, a trimer o a tetramer which is bonded via G, Y, W, $X_1$, $X_2$, $R_1$, or $R_2$.

<11> The water-based ink composition for inkjet recording according to any one of the items <1> to <10>, wherein W in any one of Formulae (1) to (3) is an alkoxy group whose total number of carbon atoms is 3 or less, an amino group, or an alkylamino group whose total number of carbon atoms is 3 or less.

<12> The water-based ink composition for inkjet recording according to the item <10>, wherein G in Formula (3) is an alkyl group whose total number of carbon atoms is 3 or less.

<13> The water-based ink composition for inkjet recording according to any one of the items <10> to <12>, wherein $X_1$ in Formula (3) is a hydrogen atom.

<14> The water-based ink composition for inkjet recording according to any one of the items <10> to <13>, wherein the azo pigment represented by Formula (3) is represented by the following Formula (4):

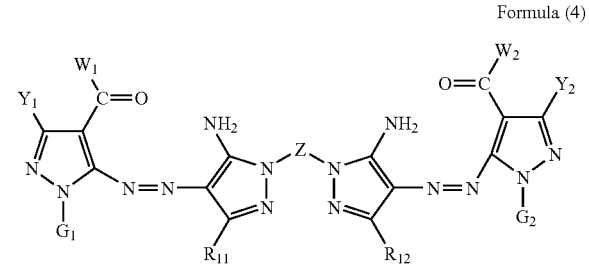

Formula (4)

wherein, in Formula (4), Z represents a divalent group derived from a 5- to 8-membered nitrogen-containing heterocycle; $Y_1$, $Y_2$, $R_{11}$, and $R_{12}$ each independently represent a hydrogen atom or a substituent; $G_1$ and $G_2$ each independently represent a hydrogen atom, an alkyl group, an aralkyl group, an alkenyl group, an alkynyl group, an aryl group, or a heterocyclic group; and $W_1$ and $W_2$ each independently represent an alkoxy group, an amino group, an alkyl group, or an aryl group.

<15> The water-based ink composition for inkjet recording according to the item <14>, wherein $W_1$ and $W_2$ in Formula (4) each independently represent an alkoxy group whose total number of carbon atoms is 3 or less, an amino group, or an alkylamino group whose total number of carbon atoms is 3 or less.

<16> The water-based ink composition for inkjet recording according to the items <14> or <15>, wherein $G_1$ and $G_2$ in Formula (4) each independently represent an alkyl group whose total number of carbon atoms is 3 or less.

<17> The water-based ink composition for inkjet recording according to any one of the items <14> to <16>, wherein Z in Formula (4) is a divalent group derived from a 6-membered nitrogen-containing heterocycle.

<18> The water-based ink composition for inkjet recording according to any one of the items <14> to <17>, wherein $Y_1$ and $Y_2$ in Formula (4) each independently represent a hydrogen atom, a methyl group, a phenyl group, or a methylthio group.

<19> The water-based ink composition for inkjet recording according to any one of the items <14> to <18>, wherein $R_{11}$ and $R_{12}$ in Formula (4) each independently represents a straight chain or branched alkyl group whose total number of carbon atoms is from 1 to 8.

The inventors of the invention has found out that colored particles are formed using an azo pigment having a carbonyl group which may form an intramolecular hydrogen bond with the carbon atom adjacent to the carbon atom to which an azo group is bonded and a vinyl polymer having a specific structure, thereby providing a water-based ink composition for ink jet recording which is excellent in discharge stability even after the long-term storage or after aging at high temperatures and may suppress density unevenness and streaked unevenness.

Hereinafter, the invention will be specifically described.

[Vinyl Polymer Particles]

Vinyl polymer particles (colored particles) in the invention include at least one of styrene-acrylic acid copolymer and at least one of an azo pigment represented by Formula (1), a tautomer thereof, a salt of the azo pigment or tautomer, or a hydrate of the azo pigment or tautomer.

<Styrene-Acrylic Acid Copolymer>

The styrene-acrylic acid copolymer to be used in the invention includes a constitutional unit derived from a styrene monomer and at least one of a constitutional unit derived from acrylic acid and a constitutional unit derived from methacrylic acid.

In the invention, the total amount of the styrene monomer, acrylic acid, and methacrylic acid constituting the styrene-acrylic acid copolymer is 45% by mass or more with respect to the total amount of all monomers constituting the styrene-acrylic acid copolymer. It is preferably 50% by mass or more, and further preferably from 60% by mass to 90% by mass.

Known compounds may be used as the styrene monomer constituting the styrene-acrylic acid copolymer to be used in the invention. Examples thereof include an alkylstyrene monomer such as styrene, α-methylstyrene, β-methylstyrene, dimethylstyrene, trimethylstyrene, ethylstyrene, i-propylstyrene, n-butylstyrene, t-butylstyrene; methoxystyrene, butoxystyrene, acetoxystyrene, chlorostyrene, dichlorostyrene, bromostyrene, chloromethylstyrene, methyl vinylbenzoate, α-methylstyrene, and vinylnaphthalene.

Among these styrene monomers, an alkylstyrene monomer is preferably used, and a styrene monomer is particularly preferably used.

The styrene-acrylic acid copolymer in the invention may include a constitutional unit derived from other monomers which may be copolymerized with monomers such as the styrene monomer, acrylic acid, and methacrylic acid, if necessary.

Examples of the other monomer include (meth)acrylic acid esters such as methyl(meth)acrylate, ethyl(meth)acrylate, n-propyl(meth)acrylate, i-propyl(meth)acrylate, n-butyl (meth)acrylate, s-butyl(meth)acrylate, t-butyl(meth)acrylate, pentyl(meth)acrylate, hexyl(meth)acrylate, cyclohexyl (meth)acrylate, 2-ethylhexyl(meth)acrylate, heptyl(meth) acrylate, octyl(meth)acrylate, nonyl(meth)acrylate, 2-ethoxyethyl acrylate, 3-ethoxypropyl acrylate, 2-ethoxybutyl acrylate, 3-ethoxybutyl acrylate, dimethylaminoethyl (meth)acrylate, hydroxyethyl(meth)acrylate, hydroxypropyl (meth)acrylate, hydroxybutyl(meth)acrylate, ethyl α-(hydroxymethyl)acrylate, methyl α-(hydroxymethyl)acrylate, phenyl(meth)acrylate, benzyl(meth)acrylate, phenylethyl(meth)acrylate or phenoxyethyl(meth)acrylate; mono (meth)acrylic acid esters of polyhydric alcohols or polyhydric phenols such as diethylene glycol, triethylene glycol, polyethylene glycol, glycerin or bisphenol A; dialkyl maleates such as dimethyl maleate or diethyl maleate; (meth) acrylamides such as N-cyclohexyl(meth)acrylamide, N-2-(methoxyethyl)(meth)acrylamide, N,N-diallyl(meth)acrylamide or N-allyl(meth)acrylamide; and vinyl esters such as vinyl acetate, vinyl chloroacetate, vinyl propionate, vinyl butyrate, vinyl methoxyacetate or vinyl benzoate.

In the invention, it is preferable to use (meth)acrylic acid esters as other monomers from the viewpoint of dispersion stability, more preferable to use (meth)acrylic acid alkyl esters, and further preferable to use (meth)acrylic acid esters with an alkyl group having 1 to 4 carbon atoms.

In this regard, (meth)acrylic ester means either acrylic acid ester or methacrylic acid ester.

Additionally, one or two or more of these other monomers may be used as a monomer component constituting the styrene-acrylic acid copolymer.

In the invention, in the case where the styrene-acrylic acid copolymer is a copolymer of, for example, styrene, acrylic acid, methacrylic acid, and methyl methacrylate, the copolymerization ratio of these monomers is preferably styrene: acrylic acid:methacrylic acid:methyl methacrylate=25 to 90:0 to 17:0 to 17:10 to 55, and more preferably 40 to 70:4 to 10:5 to 11:20 to 55.

Hereinafter, specific examples of a monomer structure of the styrene-acrylic acid copolymer in the invention will be described, however, the invention is not limited thereto.

Styrene:acrylic acid:methacrylic acid:methyl methacrylate=25:10:10:55

Styrene:acrylic acid:methacrylic acid:methyl methacrylate=40:10:10:40

Styrene:acrylic acid:methacrylic acid:methyl methacrylate=55:18:18:9

Styrene:acrylic acid:methacrylic acid:methyl methacrylate=70:10:10:10

Styrene:acrylic acid:methacrylic acid:methyl methacrylate=55:4:3:38

Styrene:acrylic acid:methacrylic acid=80:10:10

Styrene:acrylic acid:methacrylic acid=90:5:5

Styrene:acrylic acid:methacrylic acid:benzyl methacrylate=55:5:5:35

Styrene:acrylic acid:methacrylic acid:cyclohexyl methacrylate=55:5:5:35

The acid value of the styrene-acrylic acid copolymer in the invention is preferably in a range of from 50 mgKOH/g/g to 250 mgKOH/g/g, more preferably in a range of 60 mgKOH/g/g or more and less than 150 mgKOH/g/g from the viewpoints of pigment dispersibility and preservation stability.

In this regard, the term "acid value" used herein is defined as a mass (mg) of KOH necessary to completely neutralize 1 g of the styrene-acrylic acid copolymer and may be measured by the method described in JIS (Japanese Industrial Standards) (JISK0070, 1992).

The styrene-acrylic acid copolymer in the invention may be a random copolymer in which respective structural units are randomly introduced or may be a block copolymer in which respective structural units are regularly introduced. In the case of the block copolymer, respective structural units may be synthesized in any order of introduction and the same structural component may be used twice or more.

It is preferable that the styrene-acrylic acid copolymer in the invention is a random copolymer from the viewpoints of multiplicity of use and manufacturability.

As for the molecular weight range of the styrene-acrylic acid copolymer to be used in the invention, the weight average molecular weight (Mw) is preferably from 10,000 to 150,000, more preferably from 20,000 to 50,000, and further preferably from 30,000 to 40,000.

When the molecular weight is within the above-mentioned range, there is a tendency to increase the steric repulsion effect as the dispersing agent. Additionally, it is preferable that from the viewpoint that there is a tendency to lessen the time for the adsorption to the pigment because of the steric effect.

The molecular weight distribution (represented by weight average molecular weight value/number average molecular weight value) of the styrene-acrylic acid copolymer to be used in the invention is preferably from 1 to 6, and more preferably from 1 to 4.

It is preferable that the molecular weight distribution is within the above-mentioned range from the viewpoints of dispersion stability of ink and discharge stability.

Here, the term "number average molecular weight and weight average molecular weight" means a molecular weight obtained by detecting it with a differential refractometer (solvent: tetrahydrofuran) using a GPC analyzer using columns (trade names: TSKgel Super HZM-H, TSKgel Super HZ4000, TSKgel Super HZ00, all manufactured by TOSOH CORPORATION) and converting it using polystyrene as a standard substance.

As for the styrene-acrylic acid copolymer in the invention, it is preferable that the content of the constitutional unit derived from the styrene monomer is 25% by mass or more, the total content of the constitutional units derived from the styrene monomer, acrylic acid, and methacrylic acid is 45% by mass or more, the constitutional unit derived from other monomers is derived from (meth)acrylic acid esters, and the weight average molecular weight is from 10,000 to 150,000.

More preferably, the constitutional unit derived from the styrene monomer is from 40% by mass to 70% by mass, the total content of the constitutional units derived from the styrene monomer, acrylic acid, and methacrylic acid is from 50% by mass to 80% by mass, the constitutional unit derived from other monomers is derived from (meth)acrylic acid alkyl ester, and the weight average molecular weight is from 20,000 to 50,000.

The styrene-acrylic acid copolymer used in the invention may be synthesized by various polymerization methods such as solution polymerization, precipitation polymerization, suspension polymerization, bulk polymerization, and emulsion polymerization. Further, the polymerization reaction may be performed by known operations such as batch system, semi-continuous system, and continuous system.

Examples of the method for initiating polymerization include a method using a radical initiator and a method for applying light or radiation. The polymerization methods and the methods for initiating polymerization are described in, for example, "Macromolecular Synthesis Method, Teiji Tsuruta, Revised Edition, THE NIKKAN KOGYO SHIMBUN, LTD., (1971)" and " "Experimental Technique For Macromolecular Synthesis, co-authored by Takayuki Otsu and Masayoshi Kinoshita, pages 124 to 154, Kagaku-dojin Publishing Company, INC, (1972)".

Among the above polymerization methods, particularly a solution polymerization method using a radical initiator is preferable. In the solvent to be used in the solution polymerization method, for example, various organic solvents such as ethyl acetate, butyl acetate, acetone, methyl ethyl ketone, methyl i-butyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, 1-butanol may be used singly, or in a mixture of two or more of them. Alternatively, these solvents may be mixed with water.

It is necessary to set the polymerization temperature in association with the molecular weight of the polymer to be produced and the kinds of initiators. Usually, it is from about 0° C. to about 100° C. It is preferable that the polymerization is performed at from 50° C. to 100° C.

The reaction pressure may be selected appropriately. Usually, it is from 1 kgf/cm² to 100 kgf/cm², and particularly preferably from about 1 kgf/cm² to about 30 kgf/cm². The reaction time is about 5 hours to about 30 hours. The obtained resin may be subjected to purification such as reprecipitation.

The content of the styrene-acrylic acid copolymer in the vinyl polymer particles is preferably in a range of from 10% by mass to 90% by mass, more preferably in a range of from 20% by mass to 60% by mass with respect to the azo pigment from the viewpoint of dispersion stability.

<Azo Pigment>

The azo pigment to be used in the invention is typically represented by Formula (1) and constitutes the vinyl polymer particles together with the styrene-acrylic acid copolymer. The azo pigment may have the structure represented Formula (1), may be a tautomer thereof, or may be included in the vinyl polymer particles as at least one of salts and hydrates of the azo pigment or tautomer.

Hereinafter, the azo pigment represented by Formula (1) will be described.

The pigment molecule of the compound represented by Formula (1) easily causes intramolecular or intermolecular interaction due to its specific structure. Since the compound has a low solubility in water or organic solvents, it may be used as the preferable azo pigment in the exemplary embodiment of the invention. The pigment is different from a dye which is used by dissolving in water or an organic solvent in a molecular dispersion state and is used by finely-dispersing it, as a solid particle such as a molecular aggregate, in a medium.

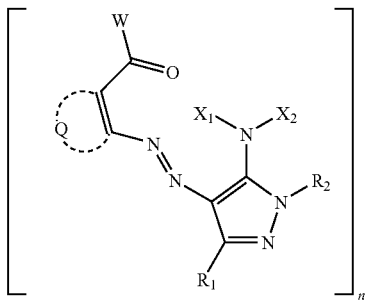

Formula (1)

In Formula (1), Q represents a 5- to 7-membered heterocycle together with two carbon atoms to which Q is bonded. W represents an alkoxy group, an amino group, an alkyl group, or an aryl group, $X_1$ and $X_2$ each independently represent a hydrogen atom, an alkyl group, an acyl group, an alkylsulfonyl group, or an arylsulfonyl group, $R_1$ represents a hydrogen atom or a substituent, $R_2$ represents a heterocyclic group, and n represents an integer of 1 to 4. In a case of n=2 to 4, Formula (1) represents a dimer, a trimer or a tetramer which is connected via Q, W, $X_1$, $X_2$, $R_1$, or $R_2$.

When n is 1, the azo pigment represented by Formula (1) represents a mono-azo pigment.

When n is 2, the azo pigment represented by Formula (1) represents a bis-azo pigment in which the two azo compounds in parenthesis are mutually bonded via any of Q, W, $X_1$, $X_2$, $R_1$ and $R_2$.

When n is 3, the azo pigment represented by Formula (1) represents a tris-azo pigment in which the three azo compounds in parenthesis are mutually bonded via any of Q, W, $X_1$, $X_2$, $R_1$ and $R_2$. In the bonding mode of each of the azo compounds, for example, two of Q, W, $X_1$, $X_2$, $R_1$, and $R_2$ in one of the azo compounds are divalent groups, and any of Q, W, $X_1$, $X_2$, $R_1$, and $R_2$ in the respective other two azo compounds is a divalent group; one of Q, W, $X_1$, $X_2$, $R_1$, and R2 in one of the azo compounds is a trivalent group, and any of Q, W, $X_1$, $X_2$, $R_1$, and $R_2$ in the respective other two azo compounds is a divalent group.

When n is 4, the azo pigment represented by Formula (1) represents a tetrakis-azo pigment in which the four azo compounds in parenthesis are mutually bonded via any of Q, W, $X_1$, $X_2$, $R_1$ and $R_2$. In the bonding mode of each of the azo compounds, for example, three of Q, W, $X_1$, $X_2$, $R_1$, and $R_2$ in one of the azo compounds are divalent groups, and any of Q, W, $X_1$, $X_2$, $R_1$, and $R_2$ in the respective other three azo compounds is a divalent group; or two of Q, W, $X_1$, $X_2$, $R_1$, and R2 in one of the azo compounds are divalent groups and the other one is a trivalent group, and any of Q, W, $X_1$, $X_2$, $R_1$, and $R_2$ in the respective other three azo compounds is a divalent group; or one of Q, W, $X_1$, $X_2$, $R_1$, and $R_2$ in one of the azo compounds is a tetravalent group, and any of Q, W, $X_1$, $X_2$, $R_1$, and $R_2$ in the respective other three azo compounds is a divalent group.

In the invention, n is preferably an integer of 1 to 3, more preferably 1 or 2, and particularly preferably 2. When n is 2, the solubility in water or an organic solvent is decreased (substantially insolubilized), and further, waterproof properties and fastness against chemicals are improved and thus it is preferable.

In Formula (1), $X_1$ and $X_2$ each independently represent a hydrogen atom, an alkyl group, an acyl group, an alkylsulfonyl group, or an arylsulfonyl group.

As the alkyl group represented by $X_1$ and $X_2$, a straight chain, branched, or cyclic, substituted or unsubstituted alkyl group is listed. Examples thereof include a cycloalkyl group, a bicycloalkyl group, and a tricyclo structure and the like having many ring structures. Alkyl groups in the substituents to be described hereinafter (for example, alkyl groups of an alkoxy group, an alkylcarbonyl group and an alkylsulfonyl group) represent the alkyl group of the above-described concept.

Examples of the alkyl group preferably include an alkyl group having 1 to 30 carbon atoms, and particularly preferably an alkyl group having 1 to 8 carbon atoms. Specifically, examples of the alkyl group include a methyl group, an ethyl group, an n-propyl group, an i-propyl group, a t-butyl group, an n-octyl group, an eicosyl group, a 2-chloroethyl group, a 2-cyanoethyl group, a 2-ethylhexyl group and the like. Preferable examples of the cycloalkyl group include a substituted or unsubstituted cycloalkyl group having 3 to 30 carbon atoms such as a cyclohexyl group, a cyclopentyl group, and a 4-n-dodecylcyclohexyl group. Preferable examples of the bicycloalkyl group include a substituted or unsubstituted bicycloalkyl group having 5 to 30 carbon atoms, namely, a monovalent group in which a hydrogen atom is removed from bicycloalkane having 5 to 30 carbon atoms, for example, a bicyclo [1.2.2]heptan-2-yl group and a bicyclo[2.2.2]octan-3-yl group.

Examples of the acyl group represented by $X_1$ or $X_2$ preferably include a formyl group, a substituted or unsubstituted alkylcarbonyl group having 2 to 30 carbon atoms, a substituted or unsubstituted aryl carbonyl group having 7 to 30 carbon atoms, and a substituted or unsubstituted heterocyclic carbonyl group having 2 to 30 carbon atoms in which the carbonyl group thereof is bonded to a carbon atom of the heterocycle thereof, and particularly preferably an alkylcarbonyl group having 2 to 8 carbon atoms, a substituted or unsubstituted arylcarbonyl group having 7 to 18 carbon atoms, and a substituted or unsubstituted heterocyclic carbonyl group having 2 to 18 carbon atoms in which the carbonyl group thereof is bonded to a carbon atom of the heterocycle thereof Specifically, examples of the acyl group represented by $X_1$ or $X_2$ include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

Examples of the alkylsulfonyl group and arylsulfonyl group represented by $X_1$ or $X_2$ preferably include a substituted or unsubstituted alkylsulfonyl group having 1 to 30 carbon atoms and a substituted or unsubstituted arylsulfonyl group having 6 to 30 carbon atoms, and particularly preferably a substituted or unsubstituted alkylsulfonyl group having 1 to 8 carbon atoms and a substituted or unsubstituted arylsulfonyl group having 6 to 18 carbon atoms. Specifically, examples of the alkylsulfonyl group and arylsulfonyl group represented by $X_1$ or $X_2$ include a methylsulfonyl group, an ethylsulfonyl group, a phenylsulfonyl group, and a p-methylphenylsulfonyl group.

Among them, preferable examples of $X_1$ and $X_2$ include a hydrogen atom, an acyl group, and an alkylsulfonyl group. More preferably, at least one of $X_1$ and $X_2$ is a hydrogen atom. It is particularly preferable that both of $X_1$ and $X_2$ are hydrogen atoms. In a case where at least one of $X_1$ and $X_2$ is a hydrogen atom, a pigment molecule easily forms a stronger hydrogen bond in the molucule and/or between the molucules, and thereby becomes to easily construct a pigment structure with more stable molecular arrengement, which may lead to achieve a better hue and higher fastness (for example, fastness against light, gas, heat, water, or chemicals).

In Formula (1), W represents an alkoxy group, an amino group, an alkyl group, or an aryl group.

Examples of the alkoxy group represented by W preferably include a substituted or unsubstituted alkoxy group having 1 to 30 carbon atoms, and particularly preferably a substituted or unsubstituted alkoxy group having 1 to 5 carbon atoms. Specifically, examples of the alkoxy group represented by W include a methoxy group, an ethoxy group, an i-propoxy group, a t-butoxy group, an n-octyloxy group, and a 2-methoxyethoxy group.

The amino group represented by W includes an alkylamino group, an arylamino group, and a heterocyclic amino group. Preferable examples thereof include an amino group, a substituted or unsubstituted alkylamino group having 1 to 30 carbon atoms, and a substituted or unsubstituted anilino group having 6 to 30 carbon atoms. Among them, an amino group, a substituted or unsubstituted alkylamino group having 1 to 8 carbon atoms, and a substituted or unsubstituted anilino group having 6 to 18 carbon atoms are preferable, and an amino group, a substituted or unsubstituted alkylamino group having 1 to 4 carbon atoms, and a substituted or unsubstituted anilino group having 6 to 12 carbon atoms are more preferable. For example, an amino group (—$NH_2$), a methylamino group (—$NHCH_3$), a dimethylamino group {—N$(CH_3)_2$}, an anilino group (—NHPh), an N-methyl-anilino group {—N($CH_3$)Ph}, a diphenylamino group {—N$(Ph)_2$} and the like are listed.

As the alkyl group represented by W, a straight chain, branched, or cyclic, substituted or unsubstituted alkyl group is listed. Examples thereof include a cycloalkyl group, a bicycloalkyl group, and a tricyclo structure and the like having many ring structures. Alkyl groups in the substituents to be described hereinafter (for example, alkyl groups of an alkoxy group and an alkylthio group) represent the alkyl group of the above-described concept. Specifically, preferable examples of the alkyl group include an alkyl group having 1 to 30 carbon atoms such as a methyl group, an ethyl group, an n-propyl group, an i-propyl group, an n-butyl group, an i-butyl group, an s-butyl group, a t-butyl group, an n-octyl group, an eicosyl group, a 2-chloroethyl group, a 2-cyanoethyl group, and a 2-ethylhexyl group. Preferable examples of the cycloalkyl group include a substituted or unsubstituted cycloalkyl group having 3 to 30 carbon atoms such as a cyclohexyl group, a cyclopentyl group, and a 4-n-dodecylcyclohexyl group. Preferable examples of the bicycloalkyl group include a substituted or unsubstituted bicycloalkyl group having 5 to 30 carbon atoms, namely, a monovalent group in which a hydrogen atom is removed from bicycloalkane having 5 to 30 carbon atoms, for example, a bicyclo[1.2.2]heptan-2-yl group and a bicyclo[2.2.2]octan-3-yl group.

Preferable examples of the aryl group represented by W include a substituted or unsubstituted aryl group having 6 to 30 carbon atoms such as a phenyl group, a p-tolyl group, a naphthyl group, an m-chlorophenyl group, and an o-hexadecanoylaminophenyl group.

The aryl group represented by W is preferably a substituted or unsubstituted aryl group having 6 to 30 carbon atoms, more preferably a substituted or unsubstituted aryl group having 6 to 18 carbon atoms, and even more preferably a substituted or unsubstituted aryl group having 6 to 12 carbon atoms. For example, a phenyl group, a p-tolyl group, a naphthyl group, an m-chlorophenyl group, and an o-hexadecanoylaminophenyl group are listed.

W is preferably an alkoxy group (for example, a methoxy group, an ethoxy group, an i-propoxy group, or a t-butoxy group), an amino group (for example, an —$NH_2$ group, a methylamino group, a dimethylamino group, or an anilino group), an alkyl group (for example, a methyl group, an ethyl group, an n-propyl group, an i-propyl group, an n-butyl group, a t-butyl group, or a cyclopropyl group) or an aryl group (for example, a phenyl group, a p-tolyl group, or a naphthyl group). W is more preferably an alkoxy group, an amino group, a phenyl group, or an alkyl group, and even more preferably an alkoxy group or an amino group.

Further preferably, W is an alkoxy group whose total number of carbon atoms is 5 or less, an amino group (an —$NH_2$ group), or an alkylamino group whose total number of carbon atoms is 5 or less. When W is an alkoxy group whose total number of carbon atoms is 5 or less, an amino group, or an alkylamino group whose total number of carbon atoms is 5 or less, a pigment molecule easily forms a stronger hydrogen bond in the molecule and/or between the molecules, which is preferable from the viewpoints of a good hue and high fastness (for example, fastness against light, gas, heat, water, or chemicals).

From the viewpoints of hue, lightfastness and solvent resistance, W is particularly preferably an alkoxy group whose total number of carbon atoms is 3 or less, an amino group (an —$NH_2$ group), or an alkylamino group whose total number of carbon atoms is 3 or less. Among them, a methoxy group (an —$OCH_3$ group) and an ethoxy group (an —$OC_2H_5$ group) are particularly preferable, and a methoxy group is most preferable from the viewpoints of a good hue and an increase in lightfastness.

In Formula (1), $R_1$ represents a hydrogen atom or a substituent. Examples of the substituent when $R_1$ represents a substituent include a straight chain or branched alkyl group having 1 to 12 carbon atoms, a straight chain or branched aralkyl group having 7 to 18 carbon atoms, a straight chain or branched alkenyl group of having 2 to 12 carbon atoms, a straight chain or branched alkynyl group having 2 to 12 carbon atoms, a straight chain or branched cycloalkyl group having 3 to 12 carbon atoms, a straight chain or branched cycloalkenyl group having 3 to 12 carbon atoms (for example, methyl, ethyl, n-propyl, i-propyl, n-butyl, i-butyl, sec-butyl, t-butyl, 2-ethylhexyl, 2-methylsulfonylethyl, 3-phenoxypropyl, trifluoromethyl, or cyclopentyl), a halogen atom (for example, a chlorine atom or a bromine atom), an aryl group (for example, phenyl, 4-t-butylphenyl, or 2,4-di-t-amylphenyl), a heterocyclic group (for example, imidazolyl, pyrazolyl, triazolyl, 2-furyl, 2-thienyl, 2-pyrimidinyl, or 2-benzothiazolyl), a cyano group, a hydroxy group, a nitro group, a carboxy group, an amino group, an alkyloxy group (for example, methoxy, ethoxy, 2-methoxyethoxy, or 2-methylsulfonylethoxy), an aryloxy group (for example, phenoxy, 2-methylphenoxy, 4-t-butylphenoxy, 3-nitrophenoxy, 3-t-butyloxycarbonylphenoxy, or 3-methoxycarbonylphenyloxy), an acylamino group (for example, acetamido, benzamido, or 4-(3-t-butyl-4-hydroxyphenoxy)butaneamido), an alkylamino group (for example, methylamino, butylamino, diethylamino, or methylbutylamino), an arylamino group (for example, phenylamino or 2-chloroanilino), a ureido group (for example, phenylureido, methylureido, or N,N-dibutylureido), a sulfamoylamino group (for example, N,N-dipropylsulfamoylamino), an alkylthio group (for example, methylthio, octylthio, or 2-phenoxyethylthio), an arylthio group (for example, phenylthio, 2-butoxy-5-t-octylphenylthio, or 2-carboxyphenylthio), an alkyloxycarbonylamino group (for example, methoxycarbonylamino), an alkylsulfonylamino group and an arylsulfonylamino group (for example, methylsulfonylamino, phenylsulfonylamino, p-toluenesulfonylamino), a carbamoyl group (for example, N-ethylcarbamoyl or N,N-dibutylcarbamoyl), a sulfamoyl group (for example, N-ethylsulfamoyl, N,N-dipropylsulfamoyl, or N-phenylsulfamoyl), a sulfonyl group (for example, methylsulfonyl, octylsulfonyl, phenylsulfonyl, or p-toluenesulfonyl), an alkyloxycarbonyl group (for example, methoxycarbonyl or butyloxycarbonyl), a heterocyclic oxy group (for example, 1-phenyltetrazole-5-oxy or 2-tetrahydropyranyloxy), azo group (for example,phenylazo, 4-methoxyphenylazo, 4-pivaloylaminophenylazo, or 2-hydroxy-4-propanoylphenylazo), an acyloxy group (for example, acetoxy), a carbamoyloxy group (for example, N-methylcarbamoyloxy or N-phenylcarbamoyloxy), a silyloxy group (for example, trimethylsilyloxy or dibutylmethylsilyloxy), an aryloxycarbonylamino group (for example, phenoxycarbonylamino), an imido group (for example, N-succinimido, or N-phthalimido), a heterocyclic thio group (for example, 2-benzothiazolythio, 2,4-di-phenoxy-1,3,5-triazole 6-thio, or 2-pyridylthio), a sulfinyl group (for example, 3-phenoxypropylsulfinyl), a phosphonyl group (for example, phenoxyphosphonyl, octyloxyphosphonyl, or phenylphosphonyl), an aryloxycarbonyl group (for example, phenoxycarbonyl), an acyl group (for example, acetyl, 3-phenylpropanoyl, or benzoyl), and an ionic hydrophilic group (for example, a carboxy group, or a sulfo group).

Examples of $R_1$ in Formula (1) preferably include a substituted or unsubstituted acylamino group whose total number of carbon atoms is from 1 to 8, a substituted or unsubstituted alkyl group whose total number of carbon atoms is from 1 to 12, a substituted or unsubstituted aryl group whose total number of carbon atoms is from 6 to 18, and a substituted or unsubstituted heterocyclic group whose total number of carbon atoms is from 4 to 12, more preferably a straight chain or branched alkyl group having 1 to 8 carbon atoms, and even more preferably a straight chain or branched alkyl group having 1 to 4 carbon atoms. Specifically, $R_1$ in Formula (1) is preferably a methyl group, an i-propyl group or a t-butyl group, more preferably an i-propyl group or a t-butyl group, and particularly preferably a t-butyl group. In a case where $R_1$ in Formula (1) is a straight chain or branched alkyl group having a small number of carbon atoms (for example, 1 to 4), a more excellent hue, a higher coloring power and an increased image fastness may be achieved by using a pigment represented by Formula (1).

In Formula (1), $R_2$ represents a heterocyclic group and it may be further condensed. $R_2$ is preferably a 5- to 8-membered heterocyclic group, more preferably a 5- or 6-membered substituted or unsubstituted heterocyclic group, and particularly preferably a 6-membered nitrogen-containing heterocyclic group having 3 to 10 carbon atoms.

Examples of the heterocyclic group represented by $R_2$ without limiting the substitution position thereof include pyridyl, pyrazinyl, pyridazinyl, pyrimidinyl, triazinyl, quinolinyl, isoquinolinyl, quinazolinyl, cinnolinyl, phthalazinyl, quinoxalinyl, pyrrolyl, indolyl, furyl, benzofuryl, thienyl, benzothienyl, pyrazolyl, imidazolyl, benzimidazolyl, triazolyl, oxazolyl, benzoxazolyl, thiazolyl, benzothiazolyl, isothiazolyl, benzisothiazolyl, thiadiazolyl, isoxazolyl, benzisoxazolyl, pyrrolidinyl, piperidinyl, piperazinyl, imidazolidinyl, thiazolinyl, and sulfolanyl.

Examples of the heterocyclic group represented by $R_2$ preferably include pyridyl, pyrimidinyl, s-triazinyl, pyridazinyl, pyrazinyl, 1,2,4-thiadiazolyl, 1,3,4-thiadiazolyl, and imidazolyl, and more preferably pyridyl, pyrimidinyl, s-triazinyl, pyridazinyl, pyrazinyl. Particularly, from the viewpoints of hue, coloring power and image fastness, pyrimidinyl or s-triazinyl is preferable as $R_2$. Further, from the viewpoints of hue and image fastness, pyrimidinyl having substituents at 4- and 6-positions of it or s-triazinyl substituted by an alkoxy group having 1 to 4 carbon atoms at 2-position of it is preferable as $R_2$. Among them, pyrimidinyl having substituents at 4- and 6-positions of it is particularly preferable as $R_2$.

In Formula (1), Q represents a 5- to 7-membered heterocycle together with two carbon atoms to which Q is bonded. An aliphatic ring, aromatic ring, or another heterocycle may be condensed with the heterocycle.

Examples of a 5- to 7-membered heterocycle formed by Q together with carbon atoms include a thiophene ring, a furan ring, a pyrrole ring, an indoline ring, an imidazole ring, a pyrazole ring, a thiazole ring, an isothiazole ring, an oxazole ring, an isoxazole ring, a triazine ring, a pyridine ring, a pyrazine ring, a pyridazine ring, and an oxazepine ring. Each heterocycle may further have a substituent. The substituent is synonymous with the substituent in $R_1$ in Formula (1).

The 5- to 7-membered heterocycle represented by Q together with carbon atoms is preferably a 5-membered nitrogen-containing heterocycle, and more preferably any of heterocycles represented by Formula (a) to (j) described below. From the viewpoints of hue, coloring power and image fastness, the 5- to 7-membered heterocycle represented by Q together with carbon atoms is preferably any of heterocycles represented by Formula (a) to (f), or (j) described below, more preferably any of heterocycles represented by Formula (a), (b), (c), (e) or (j), even more preferably any of heterocycles represented by Formula (a) or (c), and particularly preferably a heterocycle represented by Formula (a).

In Formula (a) to (j) described below, "*" denotes a bond with an azo group in Formula (1) at this position.

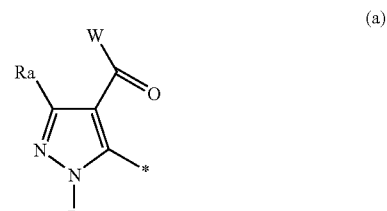

(a)

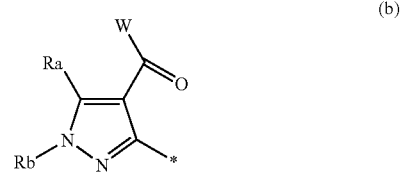

(b)

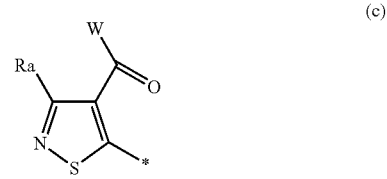

(c)

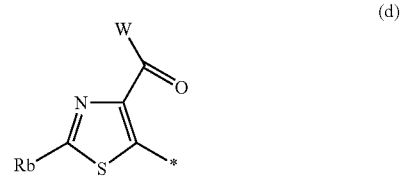

(d)

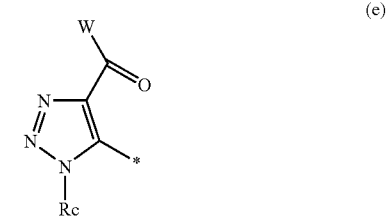

(e)

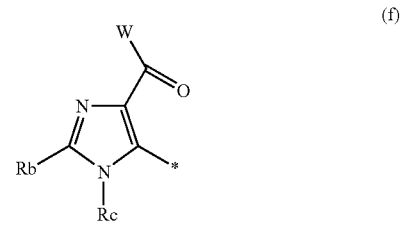

(f)

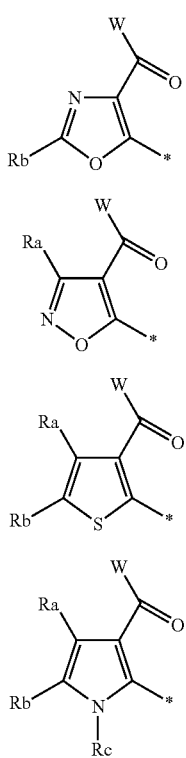

In Formulae (a) to (j), Ra represents a hydrogen atom or a substituent. Rb and Rc independently represent a hydrogen atom, an alkyl group, a cycloalkyl group, an aralkyl group, an alkenyl group, an alkynyl group, an aryl group, or a heterocyclic group.

W is synonymous with W in Formula (1), and preferable examples thereof are also the same.

W is preferably an alkoxy group (for example, a methoxy group, an ethoxy group, an i-propoxy group, or a t-butoxy group), an amino group (for example, an —$NH_2$ group, a methylamino group, a dimethylamino group, or an anilino group), an alkyl group (for example, a methyl group, an ethyl group, an n-propyl group, an i-propyl group, an n-butyl group, a t-butyl group, or a cyclopropyl group) or an aryl group (for example, a phenyl group, a p-tolyl group, or a naphthyl group). W is more preferably an alkoxy group, an amino group, or an alkyl group, and even more preferably an alkoxy group or an amino group.

Further preferably, W is an alkoxy group whose total number of carbon atoms is 5 or less, an amino group (an —$NH_2$ group), or an alkylamino group whose total number of carbon atoms is 5 or less. When W is an alkoxy group whose total number of carbon atoms is 5 or less, an amino group, or an alkylamino group whose total number of carbon atoms is 5 or less, it is preferable from the viewpoints of a good hue and high fastness (for example, fastness against light, gas, heat, water, or chemicals).

From the viewpoints of hue, lightfastness and solvent resistance, W is particularly preferably an alkoxy group whose total number of carbon atoms is 3 or less, an amino group (an —$NH_2$ group), or an alkylamino group whose total number of carbon atoms is 3 or less. Among them, a methoxy group (an —$OCH_3$ group) and an ethoxy group (an —$OC_2H_5$ group) are particularly preferable, and a methoxy group is most preferable from the viewpoints of a good hue and an increase in lightfastness.

Preferably, Ra is a hydrogen atom, a substituted or unsubstituted alkyl group whose total number of carbon atoms is from 1 to 12, a substituted or unsubstituted aryl group whose total number of carbon atoms is from 6 to 18, or a substituted or unsubstituted heterocyclic group whose total number of carbon atoms is from 4 to 12. More preferably, Ra is a hydrogen atom, a straight chain or branched alkyl group having 1 to 8 carbon atoms. Particularly preferably, Ra is a hydrogen atom or a straight alkyl group whose total number of carbon atoms is from 1 to 4. Further, from the viewpoints of hue and lightfastness, a hydrogen atom or a methyl group is preferable, and a hydrogen atom is particularly preferable as Ra.

Examples of Rb and Rc preferably include a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group and a substituted or unsubstituted heterocyclic group, and more preferably a substituted or unsubstituted alkyl group, a substituted or unsubstituted aryl group and a substituted or unsubstituted heterocyclic group. Further, from the viewpoints of hue and lightfastness, an alkyl group whose total number of carbon atoms is 3 or less is preferable. Particularly, a methyl group is particularly preferable from the viewpoints of a good hue and an increase in lightfastness.

Examples of a substituent when Q, W, $X_1$, $X_2$, $R_1$, or $R_2$ further have a substituent in the invention include the following substituents (hereinafter referred to as a "substituent J").

Examples of the substituent include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, a silyl group and an ionic hydrophilic group.

More specifically, examples of the halogen atom include a fluorine atom, a chlorine atom, a bromine atom, and an iodine atom.

The alkyl group is synonymous with the alkyl group represented by $X_1$ or $X_2$ in Formula (1), and preferable range thereof is also the same.

As the aralkyl group, a substituted or unsubstituted aralkyl group is listed. As the substituted or unsubstituted aralkyl group, an aralkyl group having 7 to 30 carbon atoms is preferable. For example, a benzyl group and a 2-phenethyl group are listed.

As the alkenyl group, a straight chain, branched, or cyclic, substituted or unsubstituted alkenyl group is listed. Examples thereof include a cycloalkenyl group and a bicycloalkenyl group. Specifically, preferable examples of the alkenyl group include a substituted or unsubstituted alkenyl group having 2 to 30 carbon atoms such as a vinyl group, an allyl group, a prenyl group, a geranyl group, and an oleyl group. Preferable examples of the cycloalkenyl group include a substituted or unsubstituted cycloalkenyl group having 3 to 30 carbon atoms, namely, a monovalent group in which a hydrogen atom of cycloalkene having 3 to 30 carbon atoms is removed (for example, a 2-cyclopenten-1-yl group and a 2-cyclohexen-1-yl group). Examples of the bicycloalkenyl group include a substituted or unsubstituted bicycloalkenyl group, preferably a bicycloalkenyl group having 5 to 30 carbon atoms, namely, a monovalent group in which a hydrogen atom of bicycloalkene having one double bond is removed (for example, a bicyclo[2.2.1]hept-2-en-1-yl group and a bicyclo[2.2.2]oct-2-en-4-yl group).

Preferable examples of the alkynyl group include a substituted or unsubstituted alkynyl group having 2 to 30 carbon atoms such as an ethynyl group, a propargyl group, and a trimethylsilylethynyl group.

Preferable examples of the aryl group include a substituted or unsubstituted aryl group having 6 to 30 carbon atoms such as a phenyl group, a p-tolyl group, a naphthyl group, an m-chlorophenyl group, and an o-hexadecanoylaminophenyl group.

As the heterocyclic group, a monovalent group in which a hydrogen atom is removed from a 5- or 6-membered substituted or unsubstituted aromatic or non-aromatic heterocyclic compound is preferable. Further preferable examples thereof include a 5- or 6-membered aromatic heterocyclic group having 3 to 30 carbon atoms such as a 2-furyl group, a 2-thienyl group, a 2-pyrimidinyl group, and a 2-benzothiazolyl group.

Preferable examples of the alkoxy group include a substituted or unsubstituted alkoxy group having 1 to 30 carbon atoms such as a methoxy group, an ethoxy group, an i-propoxy group, a t-butoxy group, an n-octyloxy group, and a 2-methoxyethoxy group.

Preferable examples of the aryloxy group include a substituted or unsubstituted aryloxy group having 6 to 30 carbon atoms such as a phenoxy group, a 2-methylphenoxy group, a 4-t-butylphenoxy group, a 3-nitrophenoxy group, and a 2-tetradecanoylaminophenoxy group.

Preferable examples of the silyloxy group include a substituted or unsubstituted silyloxy group having 0 to 20 carbon atoms such as a trimethylsilyloxy group and a diphenylmethylsilyloxy group.

Preferable examples of the heterocyclic oxy group include a substituted or unsubstituted heterocyclic oxy group having 2 to 30 carbon atoms such as a 1-phenyltetrazole-5-oxy group and a 2-tetrahydropyranyloxy group.

Preferable examples of the acyloxy group include a formyloxy group, a substituted or unsubstituted alkylcarbonyloxy group having 2 to 30 carbon atoms, a substituted or unsubstituted arylcarbonyloxy group having 6 to 30 carbon atoms, for example, an acetyloxy group, a pivaloyloxy group, a stearoyloxy group, a benzoyloxy group, and a p-methoxyphenycarbonyloxy group.

Preferable examples of the carbamoyloxy group include a substituted or unsubstituted carbamoyloxy group having 1 to 30 carbon atoms such as an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

Preferable examples of the alkoxycarbonyloxy group include a substituted or unsubstituted alkoxycarbonyloxy group having 2 to 30 carbon atoms such as a methoxycarbonyloxy group, an ethoxycarbonyloxy group, a t-butoxycarbonyloxy group, and an n-octyloxycarbonyloxy group.

Preferable examples of the aryloxycarbonyloxy group include a substituted or unsubstituted aryloxycarbonyloxy group having 7 to 30 carbon atoms such as a phenoxycarbonyloxy group, a p-methoxyphenoxycarbonyloxy group, and a p-n-hexadecyloxyphenoxycarbonyloxy group.

Examples of the amino group include an alkylamino group, an arylamino group, and a heterocyclic amino group. Preferable examples thereof include an amino group, a substituted or unsubstituted alkylamino group having 1 to 30 carbon atoms, a substituted or unsubstituted anilino group having 6 to 30 carbon atoms, for example, a methylamino group, a dimethylamino group, an anilino group, an N-methyl-anilino group, and a diphenylamino group.

Preferable examples of the acylamino group include a formylamino group, a substituted or unsubstituted alkylcarbonylamino group having 1 to 30 carbon atoms, a substituted or unsubstituted arylcarbonylamino group having 6 to 30 carbon atoms, for example, an acetylamino group, a pivaloylamino group, a lauroylamino group, a benzoylamino group, and a 3,4,5-tri-n-octyloxyphenylcarbonylamino group.

Preferable examples of the aminocarbonylamino group include a substituted or unsubstituted aminocarbonylamino group having 1 to 30 carbon atoms such as a carbamoylamino group, an N,N-dimethylaminocarbonylamino group, an N,N-diethylaminocarbonylamino group, and a morpholinocarbonylamino group.

Preferable examples of the alkoxycarbonylamino group include a substituted or unsubstituted alkoxycarbonylamino group having 2 to 30 carbon atoms such as a methoxycarbonylamino group, an ethoxycarbonylamino group, a t-butoxycarbonylamino group, an n-octadecyloxycarbonylamino group, and an N-methyl-methoxycarbonylamino group.

Preferable examples of the aryloxycarbonylamino group include a substituted or unsubstituted aryloxycarbonylamino group having 7 to 30 carbon atoms such as a phenoxycarbonylamino group, a p-chlorophenoxycarbonylamino group, and an m-n-octyloxyphenoxycarbonylamino group.

Preferable examples of the sulfamoylamino group include a substituted or unsubstituted sulfamoylamino group having 0 to 30 carbon atoms such as a sulfamoylamino group, an N,N-dimethylaminosulfonylamino group, and an N-n-octylaminosulfonylamino group.

Preferable examples of the alkylsulfonylamino group and the arylsulfonylamino group include a substituted or unsubstituted alkylsulfonylamino group having 1 to 30 carbon atoms, and a substituted or unsubstituted arylsulfonylamino group having 6 to 30 carbon atoms, for example, a methylsulfonylamino group, a butylsulfonylamino group, a phenylsulfonylamino group, a 2,3,5-trichlorophenylsulfonylamino group, and a p-methylphenylsulfonylamino group.

Preferable examples of the alkylthio group include a substituted or unsubstituted alkylthio group having 1 to 30 carbon atoms such as a methylthio group, an ethylthio group, and an n-hexadecylthio group.

Preferable examples of the arylthio group include a substituted or unsubstituted arylthio group having 6 to 30 carbon atoms such as a phenylthio group, a p-chlorophenylthio group, and an m-methoxyphenylthio group.

Preferable examples of the heterocyclic thio group include a substituted or unsubstituted heterocyclic thio group having 2 to 30 carbon atoms such as a 2-benzothiazolylthio group and a 1-phenyltetrazol-5-ylthio group.

Preferable examples of the sulfamoyl group include a substituted or unsubstituted sulfamoyl group having 0 to 30 carbon atoms such as an N-ethylsulfamoyl group, an N-(3-dodecyloxy propyl) sulfamoyl group, an N,N-dimethylsulfamoyl group, an N-acetylsulfamoyl group, an N-benzoyl sulfamoyl group, and an N-(N'-phenylcarbamoyl) sulfamoyl group.

Preferable examples of the alkylsulfinyl group and arylsulfinyl group include a substituted or unsubstituted alkylsulfinyl group having 1 to 30 carbon atoms, and a substituted or unsubstituted arylsulfinyl group having 6 to 30 carbon atoms, for example, a methylsulfinyl group, an ethylsulfinyl group, a phenylsulfinyl group, and a p-methylphenylsulfinyl group.

Preferable examples of the alkylsulfonyl group and arylsulfonyl group include a substituted or unsubstituted alkylsulfonyl group having 1 to 30 carbon atoms, and a substituted or unsubstituted arylsulfonyl group having 6 to 30 carbon atoms, for example, a methylsulfonyl group, an ethylsulfonyl group, a phenylsulfonyl group, and a p-methylphenylsulfonyl group.

Preferable examples of the acyl group include a formyl group, a substituted or unsubstituted alkylcarbonyl group having 2 to 30 carbon atoms, a substituted or unsubstituted aryl carbonyl group having 7 to 30 carbon atoms, and a substituted or unsubstituted heterocyclic carbonyl group having 2 to 30 carbon atoms in which the carbonyl group thereof is bonded to a carbon atoms of the heterocycle thereof, for example, an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

Preferable examples of the aryloxycarbonyl group include a substituted or unsubstituted aryloxycarbonyl group having 7 to 30 carbon atoms such as a phenoxycarbonyl group, an o-chlorophenoxycarbonyl group, an m-nitrophenoxycarbonyl group, and a p-t-butylphenoxycarbonyl group.

Preferable examples of the alkoxycarbonyl group include a substituted or unsubstituted alkoxycarbonyl group having 2 to 30 carbon atoms such as a methoxycarbonyl group, an ethoxycarbonyl group, a t-butoxycarbonyl group, and an n-octadecyloxycarbonyl group.

Preferable examples of the carbamoyl group include a substituted or unsubstituted carbamoyl group having 1 to 30 carbon atoms such as a carbamoyl group, an N-methylcarbamoyl group, an N,N-dimethylcarbamoyl group, an N,N-di-n-octylcarbamoyl group, and an N-(methylsulfonyl) carbamoyl group.

Preferable examples of the arylazo group and heterocyclic azo group include a substituted or unsubstituted arylazo group having 6 to 30 carbon atoms and a substituted or unsubstituted heterocyclic azo group having 3 to 30 carbon atoms (for example, a phenylazo group, a p-chlorophenylazo group, and a 5-ethylthio-1,3,4-thiadiazol-2-ylazo group).

Preferable examples of the imido group include an N-succinimido group and an N-phthalimido group.

Preferable examples of the phosphino group include a substituted or unsubstituted phosphino group having 0 to 30 carbon atoms such as a dimethylphosphino group, a diphenylphosphino group, and a methylphenoxyphosphino group.

Preferable examples of the phosphinyl group include a substituted or unsubstituted phosphinyl group having 0 to 30 carbon atoms such as a phosphinyl group, a dioctyloxyphosphinyl group, and a diethoxyphosphinyl group.

Preferable examples of the phosphinyloxy group include a substituted or unsubstituted phosphinyloxy group having 0 to 30 carbon atoms such as a diphenoxyphosphinyloxy group and a dioctyloxyphosphinyl oxy group.

Preferable examples of the phosphinylamino group include a substituted or unsubstituted phosphinylamino group having 0 to 30 carbon atoms such as a dimethoxyphosphinylamino group and a dimethylaminophosphinylamino group.

Preferable examples of the silyl group include a substituted or unsubstituted silyl group such as a trimethylsilyl group, a t-butyldimethylsilyl group, and a phenyldimethylsilyl group.

Preferable examples of the ionic hydrophilic group include —$SO_3M$ and —$CO_2M$, wherein M is Ca, Mg, Ba, or the like, such that the azo pigment represented by Formula (1) assumes a form of a lake pigment.

When the above-described substituents have a hydrogen atom, the hydrogen atom may be substituted with the above substituent. Examples of such a substituent include an alkylcarbonylaminosulfonyl group, an arylcarbonylaminosulfonyl group, an alkylsulfonylaminocarbonyl group, and an arylsulfonylaminocarbonyl group. Examples thereof include a methylsulfonylaminocarbonyl group, a p-methylphenylsulfonylaminocarbonyl group, an acetylaminosulfonyl group, and a benzoylaminosulfonyl group.

With reference to the combination of preferable substituents of the pigment represented by Formula (1) of the invention, the compound in which at least one of various substituents are the above-described preferred groups is more preferred, the compound in which more various substituents are the above-described preferred groups is more preferred, and the compound in which all substituents are the above-described preferred groups is particularly preferred.

As for the azo pigment represented by Formula (1) of the invention, a particularly preferable combination of the substituents includes the following (1) to (6):

(1) Preferably, $X_1$ and $X_2$ are each independently a hydrogen atom, an alkyl group (for example, a methyl group, an ethyl group, an n-propyl group, an i-propyl group, a t-butyl group, or a cyclopropyl group), an acyl group (for example, a formyl group, an acetyl group, a pivaloyl group, or a benzoyl group), an alkylsulfonyl group (for example, a methylsulfonyl group or an ethylsulfonyl group), an arylsulfonyl group (for example, a phenylsulfonyl group). Among them, a hydrogen atom, an acetyl group, and a methylsulfonyl group are preferable. Particularly, a hydrogen atom is preferable. Particularly, it is the most preferable that both $X_1$ and $X_2$ are hydrogen atoms.

(2) W is preferably an alkoxy group (for example, a methoxy group, an ethoxy group, an i-propoxy group, or a t-butoxy group), an amino group (for example, an —$NH_2$ group, a methylamino group, a dimethylamino group, or an anilino group), an alkyl group (for example, a methyl group, an ethyl group, an n-propyl group, an i-propyl group, a t-butyl group, or a cyclopropyl group) or an aryl group (for example, a phenyl group, a p-tolyl group, or a naphthyl group). Among them, an alkoxy group, an amino group, and an alkyl group are preferable. An alkoxy group and an amino group are more preferable. An alkoxy group whose total number of carbon atoms is 5 or less, an amino group (an —$NH_2$ group), and an alkylamino group whose total number of carbon atoms is 5 or less are more preferable from the viewpoints of a good hue and high fastness (for example, fastness against light, gas, heat, water, or chemicals). From the viewpoints of hue, lightfastness and solvent resistance, an alkoxy group whose total number of carbon atoms is 3 or less, an amino group (an —$NH_2$ group), and an alkylamino group whose total number of carbon atoms is 3 or less are particularly preferable. Among them, a methoxy group (an —$OCH_3$ group) or an ethoxy group (—$OC_2H_5$ group) is preferable, and a methoxy group is more preferable from the viewpoints of a good hue and an increase in lightfastness.

(3) $R_1$ is preferably a hydrogen atom or a substituent (for example, a substituted or unsubstituted acylamino group whose total number of carbon atoms is from 1 to 8, a substituted or unsubstituted alkyl group whose total number of carbon atoms is from 1 to 12, a substituted or unsubstituted aryl group whose total number of carbon atoms is from 6 to 18, or a substituted or unsubstituted heterocyclic group whose total number of carbon atoms is from 4 to 12). A straight chain or branched alkyl group having 1 to 8 carbon atoms in total, a substituted or unsubstituted aryl group whose total number of carbon atoms is from 6 to 10 and a substituted or unsubstituted heterocyclic group whose total number of carbon atoms is from 4 to 8 are more preferable. A methyl group, an i-propyl group, a t-butyl group, a phenyl group, or a pyridyl group is further preferable. A t-butyl group is particularly preferable as $R_1$.

(4) $R_2$ represents a heterocyclic group and it may be further condensed.

$R_2$ is preferably a 5- to 8-membered heterocyclic group, more preferably a 5- or 6-membered substituted or unsubstituted heterocyclic group, and particularly preferably a 6-membered nitrogen-containing heterocyclic group having 3 to 10 carbon atoms. Further, preferable examples of the heterocycle include a pyridine ring, a pyrimidine ring, an s-triazine ring, a pyridazine ring, a pyrazine ring, a 1,2,4-thiadiazole ring, a 1,3,4-thiadiazole ring, and an imidazole ring. More preferable examples thereof include a pyridine ring, a pyrimidine ring, an s-triazine ring, a pyridazine ring, and a pyrazine ring. A pyrimidine ring and an s-triazine ring are particularly preferable. A pyrimidine ring is particularly, preferable as $R_2$.

(5) Q represents a 5- to 7-membered heterocycle together with two carbon atoms to which Q is bonded. An aliphatic ring, aromatic ring, or another heterocycle may be condensed with the heterocycle. Particularly preferable examples of the 5- to 7-membered heterocycle formed by Q together with carbon atoms include a thiophene ring, a furan ring, a pyrrole ring, an indole ring, an imidazole ring, a pyrazole ring, a thiazole ring, an isothiazole ring, an oxazole ring, an isoxazole ring, a triazine ring, a pyridine ring, a pyrazine ring, a pyridazine ring, and an oxazepine ring. Each heterocycle may further have a substituent.

Particularly, as the 5- to 7-membered heterocycle formed by Q together with carbon atoms, a 5-membered nitrogen-containing heterocycle is preferable. Any of heterocycles represented by Formulae (a) to (j) described below are particularly preferable as Q. In Formula (a) to (j) described below, "*" denotes a bond with an azo group in Formula (1) at this position.

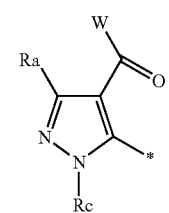

(a)

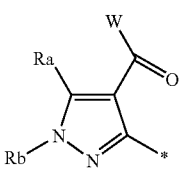

(b)

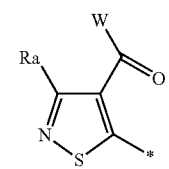

(c)

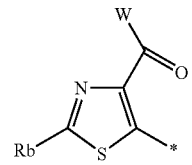

(d)

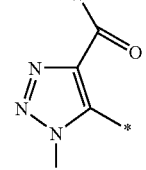

(e)

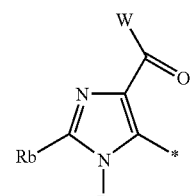

(f)

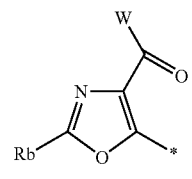

(g)

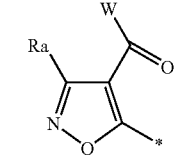

(h)

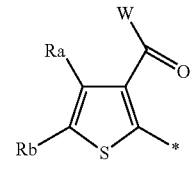

(i)

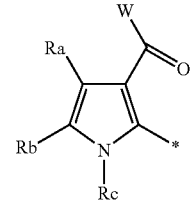

(j)

In Formulae (a) to (j), Ra represents a hydrogen atom or a substituent. Rb and Rc each independently represent a hydrogen atom, an alkyl group, a cycloalkyl group, an aralkyl group, an alkenyl group, an alkynyl group, an aryl group, or a heterocyclic group. W is synonymous with W in Formula (1) and preferable examples thereof are also the same.

Preferably, Ra is a hydrogen atom, a substituted or unsubstituted alkyl group whose total number of carbon atoms is from 1 to 12 carbon atoms, a substituted or unsubstituted aryl group whose total number of carbon atoms is from 6 to 18 carbon atoms, or a substituted or unsubstituted heterocyclic group whose total number of carbon atoms is from 4 to 12.

More preferably, Ra is a hydrogen atom, or a straight chain or branched alkyl group having 1 to 8 carbon atoms in total. Particularly preferably, Ra is a hydrogen atom or a straight chain alkyl group whose total number of carbon atoms is from 1 to 4. A hydrogen atom and a methyl group are preferable. A hydrogen atom is particularly preferable as Ra.

Preferable examples of Rb and Rc include a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group and a substituted or unsubstituted heterocyclic group. More preferable examples thereof include a substituted or unsubstituted alkyl group, a substituted or unsubstituted aryl group and a substituted or unsubstituted heterocyclic group. Particularly, an alkyl group whose total number of carbon atoms is 3 or less is preferable. A methyl group is particularly preferable as Rb or Rc.

The 5-membered heterocycle represented by Q together with carbon atoms, is preferably a heterocycle represented by any one of Formula (a) to (f), or (j), more preferably a heterocycle represented by any one of Formula (a), (b), (c), (e) or (j), even more preferably a heterocycle represented by any one of Formula (a) or (c), particularly preferably a heterocycle represented by Formula (a), from the viewpoints of hue, coloring power and image fastness.

(6) n is preferably an integer of 1 to 3, and more preferably 1 or 2. It is particularly preferable that n equals to 2.

It is the most preferable that the azo pigment represented by Formula (1) is an azo pigment represented by the following Formula (2). Hereinafter, the azo pigment represented by Formula (2) will be described in detail.

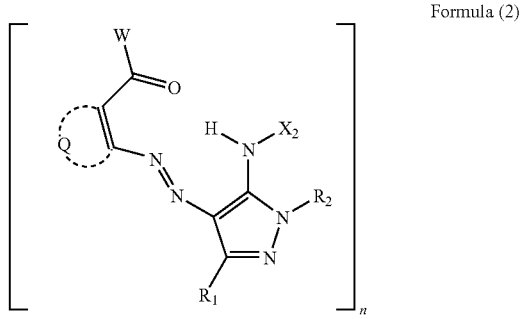

Formula (2)

Each of Q, W, $X_1$, $R_1$, $R_2$, and n in Formula (2) is respectively synonymous with each of Q, W, $X_1$, $R_1$, $R_2$, and n in Formula (1). In the case of n=2 to 4, Formula (2) represents a dimer, a trimer or a tetramer in which the two to four azo compounds in parenthesis are mutually bonded via Q, W, $X_1$, $R_1$, or $R_2$.

Hereinafter, Q, W, $X_1$, $R_1$, $R_2$, and n described above will be described in more detail.

Examples of Q, W, $X_1$, $R_1$, $R_2$, and n are respectively synonymous with examples of Q, W, $X_1$, $R_1$, $R_2$, and n in Formula (1). Preferable examples thereof are respectively the same.

With reference to the combination of preferable substituents of the pigment represented by Formula (2) of the invention, the compound in which at least one of various substituents are the above-described preferred groups is preferred, the compound in which more various substituents are the above-described preferred groups is more preferred, and the compound in which all substituents are the above-described preferred groups is particularly preferred.

A particularly preferable combination of substituents as for the azo pigment represented by Formula (2) of the invention includes combinations similar to those combinations described above in (1) to (6) in the azo pigment represented by Formula (1).

(1) $X_1$ is preferably a hydrogen atom, an alkyl group (for example, a methyl group, an ethyl group, an n-propyl group, an i-propyl group, a t-butyl group, or a cyclopropyl group), an acyl group (for example, a formyl group, an acetyl group, a pivaloyl group, or a benzoyl group), an alkylsulfonyl group (for example, a methylsulfonyl group or an ethylsulfonyl group), an arylsulfonyl group (for example, a phenylsulfonyl group). Among them, a hydrogen atom, an acetyl group, and a methylsulfonyl group are preferable. A hydrogen atom is particularly preferable as $X_1$.

(2) W is preferably an alkoxy group (for example, a methoxy group, an ethoxy group, an i-propoxy group, or a t-butoxy group), an amino group (for example, an —$NH_2$ group, a methylamino group, a dimethylamino group, or an anilino group), an alkyl group (for example, a methyl group, an ethyl group, an n-propyl group, an i-propyl group, a t-butyl group, or a cyclopropyl group) or an aryl group (for example, a phenyl group, a p-tolyl group, or a naphthyl group). Among them, an alkoxy group, an amino group, and an alkyl group are preferable. An alkoxy group and an amino group are more preferable. An alkoxy group whose total number of carbon atoms is 5 or less, an amino group (an —$NH_2$ group), and an alkylamino group whose total number of carbon atoms is 5 or less are more preferable. In a case where W is an alkoxy group whose total number of carbon atoms is 5 or less, an amino group, or an alkylamino group whose total number of carbon atoms is 5 or less, it is preferable from the viewpoints of a good hue and high fastness (for example, fastness against light, gas, heat, water, or chemicals). From the viewpoints of hue, lightfastness and solvent resistance, an alkoxy group whose total number of carbon atoms is 3 or less, an amino group (an —$NH_2$ group), and an alkylamino group whose total number of carbon atoms is 3 or less are particularly preferable. Among them, a methoxy group (an —$OCH_3$ group) or an ethoxy group (an —$OC_2H_5$ group) is preferable, and a methoxy group is particularly preferable, from the viewpoints of a good hue and an increase in lightfastness.

(3) $R_1$ is preferably a hydrogen atom or a substituent such as a substituted or unsubstituted acylamino group whose total number of carbon atoms is from 1 to 8, a substituted or unsubstituted alkyl group whose total number of carbon atoms is from 1 to 12, a substituted or unsubstituted aryl group whose total number of carbon atoms is from 6 to 18, or a substituted or unsubstituted heterocyclic group whose total number of carbon atoms is from 4 to 12, and more preferably a straight chain or branched alkyl group whose total number of carbon atoms is from 1 to 8, a substituted or unsubstituted aryl group whose total number of carbon atoms is from 6 to 10, or a substituted or unsubstituted heterocyclic group whose total number of carbon atoms is from 4 to 8. Among them, a methyl group, an i-propyl group, a t-butyl group, a phenyl group or a pyridyl group is further preferable, and a t-butyl group is particularly preferable.

(4) $R_2$ represents a heterocyclic group and it may be further condensed. $R_2$ is preferably a 5- to 8-membered heterocyclic group, more preferably a 5- or 6-membered substituted or unsubstituted heterocyclic group, particularly preferably a 6-membered nitrogen-containing heterocyclic group having 3 to 10 carbon atoms. Further, preferable examples of the heterocycle include a pyridine ring, a pyrimidine ring, an s-triazine ring, a pyridazine ring, a pyrazine ring, a 1,2,4-thiadiazole ring, a 1,3,4-thiadiazole ring, and an imidazole ring. More preferable examples thereof include a pyridine ring, a pyrimidine ring, an s-triazine ring, a pyridazine ring, and a pyrazine ring. The pyrimidine ring and the s-triazine ring are particularly preferable. A pyrimidine ring is particularly preferable as the heterocycle from which heterocyclic group is derived for $R_2$.

(5) Q represents a 5- to 7-membered heterocycle together with carbon atoms. An aliphatic ring, aromatic ring, or another heterocycle may be condensed with the heterocycle. Particularly preferable examples of the 5- to 7-membered heterocycle formed by Q together with carbon atoms include a thiophene ring, a furan ring, a pyrrole ring, an indole ring, an imidazole ring, a pyrazole ring, a thiazole ring, an isothiazole ring, an oxazole ring, an isoxazole ring, a triazine ring, a pyridine ring, a pyrazine ring, a pyridazine ring, and an oxazepine ring. Each heterocyclic group may further have a substituent. Particularly, as the 5- to 7-membered heterocycle formed by Q together with carbon atoms, a 5-membered nitrogen-containing heterocycle is preferable. Any of heterocycles represented by Formulae (a) to (j) described below are particularly preferable. In Formula (a) to (j) described below, "*" denotes a bond with an azo group in Formula (2) at this position.

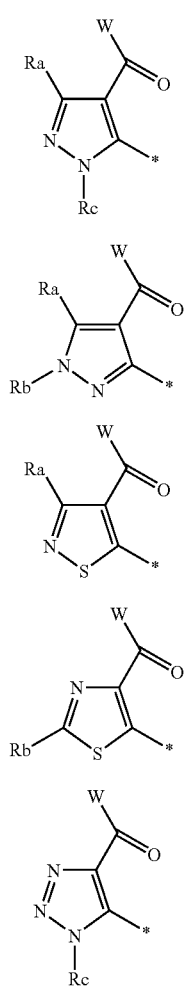

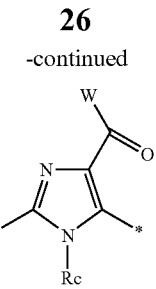

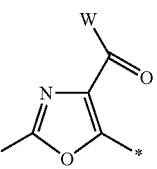

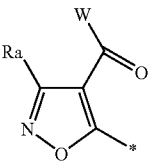

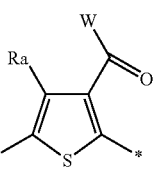

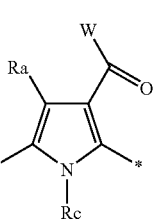

In Formulae (a) to (j), Ra represents a hydrogen atom or a substituent. Rb and Rc each independently represent a hydrogen atom, an alkyl group, a cycloalkyl group, an aralkyl group, an alkenyl group, an alkynyl group, an aryl group, or a heterocyclic group. W is synonymous with W in Formula (1) and preferable examples thereof are also the same.

Preferably, Ra is a hydrogen atom, a substituted or unsubstituted alkyl group whose total number of carbon atoms is from 1 to 12 carbon atoms, a substituted or unsubstituted aryl group whose total number of carbon atoms is from 6 to 18 carbon atoms, or a substituted or unsubstituted heterocyclic group whose total number of carbon atoms is from 4 to 12. More preferably, Ra is a hydrogen atom or a straight chain or branched alkyl group having 1 to 8 carbon atoms in total. Particularly preferably, Ra is a hydrogen atom or a straight chain alkyl group whose total number of carbon atoms is from 1 to 4. A hydrogen atom and methyl group are preferable. A hydrogen atom is particularly preferable as Ra.

Preferable examples of Rb and Rc include a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group and a substituted or unsubstituted heterocyclic group. More preferable examples thereof include a substituted or unsubstituted alkyl group, a substituted or unsubstituted aryl group and a substituted or unsubstituted heterocyclic group. Particularly, an alkyl group whose total number of carbon atoms is 3 or less is preferable. Particularly, a methyl group is the most preferable.

The 5-membered heterocycle represented by Q together with carbon atoms is preferably a heterocycle represented by any one of Formula (a) to (f), or (j), more preferably a heterocycle represented by any one of Formula (a), (b), (c), (e) or (j), even more preferably a heterocycle represented by any one of Formula (a) or (c), and particularly preferably a heterocycle represented by Formula (a), from the viewpoints of hue, coloring power and image fastness.

(6) n is preferably an integer of 1 to 3, and more preferably 1 or 2. Particularly, it is the most preferable that n equals to 2.

In the azo pigment in the invention, a tautomer of the azo pigment represented by Formula (1) or (2) is included in the scope thereof Formulae (1) and (2) are shown as canonical structures among several tautomers with chemically acceptable structures. Tautomers other than an explicitly described structure may be used. The azo pigment may be a mixture containing a plurality of tautomers.

For example, an azo-hydrazone tautomer represented by Formula (2') described below may be considered for the azo pigment represented by Formula (2). The compound represented by Formula (2') which is a tautomer of the azo pigment represented by Formula (2) is included in the scope of the invention.

nyl group, an aryl group, or a heterocyclic group. W, $X_1$, $X_2$, $R_1$, $R_2$, and n are each respectively synonymous with W, $X_1$, $X_2$, $R_1$, $R_2$, and n in Formula (1). In the case of n=2 to 4, Formula (3) represents a dimer, a trimer or a tetramer in which the two to four azo compounds in parenthesis are mutually bonded via G, Y, W, $X_1$, $X_2$, $R_1$, or $R_2$.

Hereinafter, W, $X_1$, $X_2$, $R_1$, $R_2$, G, Y, and n will be described in more detail.

Examples of W, $X_1$, $X_2$, $R_1$, $R_2$, and n are respectively synonymous with examples of W, $X_1$, $X_2$, $R_1$, $R_2$, and n in Formula (1) and the preferable examples thereof are respectively the same.

G represents a hydrogen atom, an alkyl group, a cycloalkyl group, an aralkyl group, an alkenyl group, an alkynyl group, an aryl group, or a heterocyclic group. Particularly, a hydrogen atom, a methyl group, an ethyl group, a n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, and a pyrazinyl group are preferable. Further, a hydrogen atom, a methyl group, a phenyl group, a pyridyl group, a pyrimidinyl group, a pyrazinyl group are preferable. Among them, a methyl group, a 2-pyridyl group, a 2,6-pyrimidinyl group, and a 2,5-pyrazinyl group are preferable.

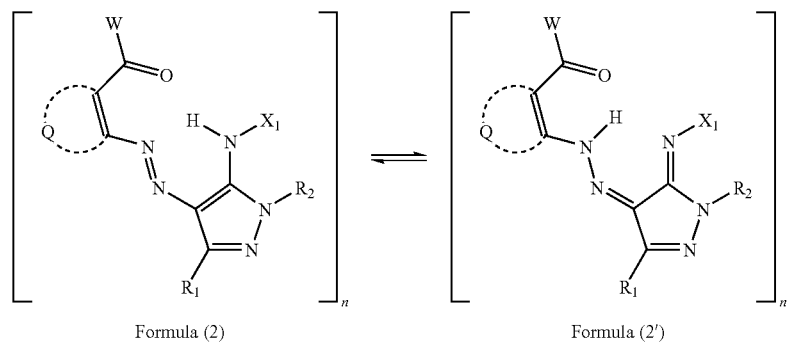

Formula (2)　　　　　　　　Formula (2')

$R_1$, $R_2$, Q, W, $X_1$, and n in Formula (2') are each synonymous with $R_1$, $R_2$, Q, W, $X_1$, and n in Formula (2) and preferable ranges thereof are the same.

More preferably, the azo pigment represented by Formula (1) in the invention is an azo pigment represented by the following Formula (3).

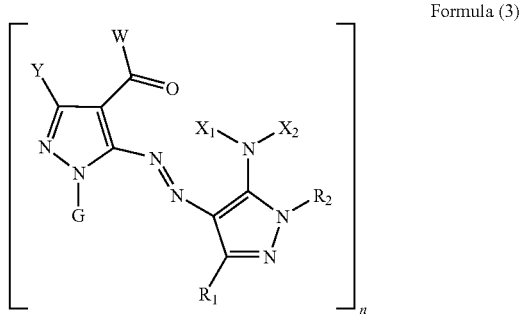

Formula (3)

Y in Formula (3) represents a hydrogen atom or a substituent. G represents a hydrogen atom, an alkyl group, a cycloalkyl group, an aralkyl group, an alkenyl group, an alky- When G represents an alkyl group, G is preferably an alkyl group whose total number of carbon atoms is 5 or less, more preferably an alkyl group whose total number of carbon atoms is 3 or less, and particularly preferably a methyl group.

When Y represents a substituent, examples of Y include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, and a silyl group.

Particularly preferable examples of Y include a hydrogen atom, an alkyl group (e.g., a methyl group), an aryl group (e.g.

a phenyl group), a heterocyclic group (e.g., a 2-pyridyl group), and an alkylthio group (e.g., a methylthio group). Further, a hydrogen atom, a methyl group, a phenyl group, and a methylthio group are preferable. Among them, a hydrogen atom is particularly preferable.

With reference to the combination of preferable substituents of the pigment represented by Formula (3) of the invention, the compound in which at least one of various substituents are the above-described preferred groups is more preferred, the compound in which more various substituents are the above-described preferred groups is preferred, and the compound in which all substituents are the above-described preferred groups is particularly preferred.

As for the azo pigment represented by Formula (3) of the invention, a particularly preferable combination of the substituents includes the following (1) to (7).

(1) Preferably, $X_1$ and $X_2$ are each independently a hydrogen atom, an alkyl group (for example, a methyl or and a cyclopropyl group), an acyl group (for example, a formyl group, an acetyl group, a pivaloyl group, or a benzoyl group), an alkylsulfonyl group (for example, a methylsulfonyl group or an ethylsulfonyl group), an arylsulfonyl group (for example, a phenylsulfonyl group). Among them, a hydrogen atom, an acetyl group, and a methylsulfonyl group are preferable. Particularly, a hydrogen atom is preferable. Particularly, it is preferable that at least one of $X_1$ and $X_2$ is a hydrogen atom. It is particularly preferable that both $X_1$ and $X_2$ are hydrogen atoms.

When at least one of $X_1$ and $X_2$ is the hydrogen atom, not only intermolecular interaction of pigment molecules but also intramolecular interaction is firmly formed. As a result, a pigment with a more stable molecular arrangement is easily formed, which is preferable from the viewpoints of good hue and high fastness (for example, fastness against light, gas, heat, water, or chemicals).

(2) W is preferably an alkoxy group (for example, a methoxy group, an ethoxy group, an i-propoxy group, or a t-butoxy group), an amino group (for example, an —$NH_2$ group, a methylamino group, a dimethylamino group, or an anilino group), an alkyl group (for example, a methyl group, an ethyl group, an n-propyl group, an i-propyl group, a t-butyl group, or a cyclopropyl group) or an aryl group (for example, a phenyl group, a p-tolyl group, or a naphthyl group). Among them, an alkoxy group, an amino group, and an alkyl group are preferable, and an alkoxy group and an amino group are more preferable. From the viewpoints of good hue and high fastness (for example, fastness against light, gas, heat, water, or chemicals), W is preferably an alkoxy group whose total number of carbon atoms is 5 or less, an amino group (an —$NH_2$ group), and an alkylamino group whose total number of carbon atoms is 5 or less. From the viewpoints of hue, lightfastness and solvent resistance, W is more preferably an alkoxy group whose total number of carbon atoms is 3 or less, an amino group (an —$NH_2$ group), or an alkylamino group whose total number of carbon atoms is 3 or less. Specifically, a methoxy group (an —$OCH_3$ group) or an ethoxy group (an —$OC_2H_5$ group) is preferable, and a methoxy group is particularly preferable, from the viewpoints of good hue and increase in lightfastness.

(3) $R_1$ is preferably a hydrogen atom or a substituent (for example, a substituted or unsubstituted acylamino group whose total number of carbon atoms is from 1 to 8, a substituted or unsubstituted alkyl group whose total number of carbon atoms is from 1 to 12, a substituted or unsubstituted aryl group whose total number of carbon atoms is from 6 to 18, or a substituted or unsubstituted heterocyclic group whose total number of carbon atoms is from 4 to 12). A straight chain or branched alkyl group having 1 to 8 carbon atoms in total, a substituted or unsubstituted aryl group whose total number of carbon atoms is from 6 to 10, or a substituted or unsubstituted heterocyclic group whose total number of carbon atoms is from 4 to 8 is more preferable. Specifically, a methyl group, an i-propyl group, a t-butyl group, a phenyl group or a pyridyl group is preferable, and the t-butyl group is particularly preferable as $R_1$.

(4) $R_2$ represents a heterocyclic group and it may be further condensed. $R_2$ is preferably a 5- to 8-membered heterocyclic group, more preferably a 5- or 6-membered substituted or unsubstituted heterocyclic group, and particularly preferably a 6-membered nitrogen-containing heterocyclic group having 3 to 10 carbon atoms. Further, preferable examples of the heterocycle include a pyridine ring, a pyrimidine ring, an s-triazine ring, a pyridazine ring, a pyrazine ring, a 1,2,4-thiadiazole ring, a 1,3,4-thiadiazole ring, and an imidazole ring. More preferable examples thereof include a pyridine ring, a pyrimidine ring, an s-triazine ring, a pyridazine ring, and a pyrazine ring. A pyrimidine ring and the s-triazine ring are particularly preferable. A pyrimidine ring is particularly preferable as the heterocycle from which heterocyclic group is derived for $R_2$.

(5) G is preferably a hydrogen atom, or an alkyl group, cycloalkyl group, aralkyl group, alkenyl group, alkynyl group, aryl group, or heterocyclic group, each of which has a total number of carbon atoms of 12 or less.

More preferably, G is an alkyl group whose total number of carbon atoms is 6 or less, a cycloalkyl group whose total number of carbon atoms is 6 or less, an aralkyl group whose total number of carbon atoms is 12 or less, an alkenyl group whose total number of carbon atoms is 12 or less, an alkynyl group whose total number of carbon atoms is 12 or less, an aryl group whose total number of carbon atoms is 12 or less, or a heterocyclic group whose total number of carbon atoms is 12 or less. Even more preferably, G represents a hydrogen atom, a methyl group, an ethyl group, an n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group.

Further, a hydrogen atom, a phenyl group, a pyridyl group, a pyrimidinyl group, a pyrazinyl group are preferable. Among them, a methyl group, a 2-pyridyl group, a 2,6-pyrimidinyl group, and a 2,5-pyrazinyl group are preferable. A methyl group is most preferable as G.

(6) Y is preferably a hydrogen atom, an alkyl group (for example, a methyl group), an aryl group (for example, a phenyl group), a heterocyclic group (for example, a 2-pyridyl group), or an alkylthio group (for example, a methylthio group). A hydrogen atom, a methyl group, a phenyl group, and a methylthio group are further preferable. Among them, a hydrogen atom is particularly preferable as Y.

(7) n is preferably an integer of 1 to 3, and more preferably 1 or 2. It is particularly preferable that n equals to 2.

In Formulae (1), (2), and (3), n is preferably 2 or 3, and particularly preferably 2. When n is 2, a high coloring power and an excellent light resistance are provided, and further, fastness against chemicals is improved.

In Formulae (1), (2), and (3), the azo pigment in the case of n=2 represents a dimer in which the two azo compounds in parenthesis are mutually bonded via Q, W, $X_1$, $X_2$, $R_1$, or $R_2$.

When the azo pigment in the invention represents a dimer, examples thereof include bonding modes represented by Formulae (4), (5), (6), (7), (8), and (9) described below.

Formula (4)

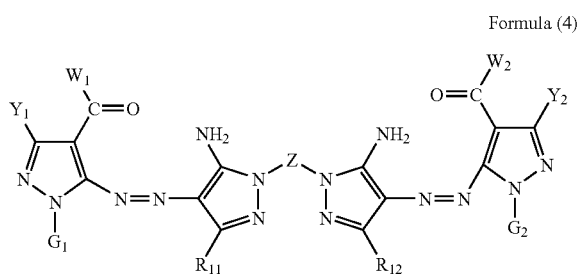

In Formula (4), $G_1$ and $G_2$ are each independently synonymous with G in Formula (3). $R_1$ and $R_{12}$ are each independently synonymous with $R_1$ in Formula (3). $W_1$ and $W_2$ are each independently synonymous with W in Formula (3). $Y_1$ and $Y_2$ are each independently synonymous with Y in Formula (3).

Z represents a divalent group derived from a 5- to 8-membered nitrogen-containing heterocycle.

The 5- to 8-membered nitrogen-containing heterocycle is synonymous with the nitrogen-containing heterocycle in the heterocycles listed as the examples of the 5- to 8-membered nitrogen-containing heterocycle in $R_2$ in Formula (3), and preferable range thereof is also the same.

Further, the term "a divalent group derived from a nitrogen-containing heterocycle" means a divalent group formed by removing two hydrogen atoms from a nitrogen-containing heterocyclic compound. The position where the hydrogen atom is removed is not particularly limited.

Formula (5)

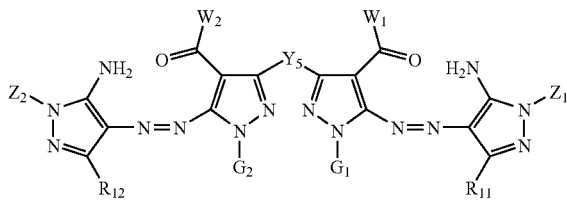

In Formula (5), $G_1$ and $G_2$ are each independently synonymous with G in Formula (3). $R_{11}$ and $R_{12}$ are each independently synonymous with $R_1$ in Formula (3). $W_1$ and $W_2$ are each independently synonymous with W in Formula (3).

$Z_1$ and $Z_2$ are each independently synonymous with $R_2$ in Formula (3).

$Y_5$ represents a divalent group and is synonymous with the substituent which may be a divalent substituent among the substituents exemplified as Y in Formula (3). Specifically, it is preferable that $Y_5$ is a divalent group derived from an alkyl group, an aryl group, a heterocyclic group, or an alkylthio group.

Formula (6)

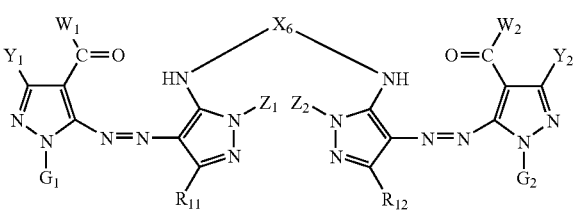

In Formula (6), $G_1$ and $G_2$ are each independently synonymous with G in Formula (3). $R_{11}$ and $R_{12}$ are each independently synonymous with $R_1$ in Formula (3). $W_1$ and $W_2$ are each independently synonymous with W in Formula (3). $Y_1$ and $Y_2$ are each independently synonymous with Y in Formula (3). $Z_1$ and $Z_2$ are each independently synonymous with $R_2$ in Formula (3).

$X_6$ represents a divalent group and is synonymous with the substituent which may be a divalent substituent among the substituents exemplified as $X_1$ or $X_2$ in Formula (3). Specifically, it is preferable that $X_6$ is a divalent group derived from an alkyl group, an acyl group, an alkylsulfonyl group, or an arylsulfonyl group.

Formula (7)

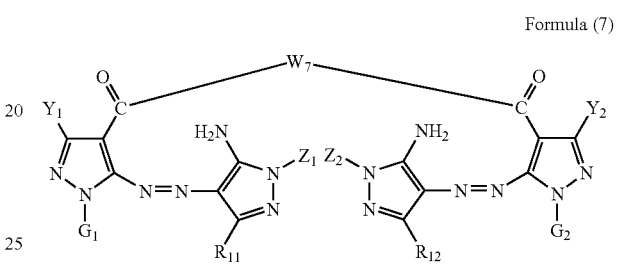

In Formula (7), $G_1$ and $G_2$ are each independently synonymous with G in Formula (3). $R_{11}$ and $R_{12}$ are each independently synonymous with $R_1$ in Formula (3). $Y_1$ and $Y_2$ are each independently synonymous with Y in Formula (3). $Z_1$ and $Z_2$ are each independently synonymous with $R_2$ in Formula (3).

$W_7$ represents a divalent group and is synonymous with the substituent which may be a divalent substituent among the substituents exemplified as W in Formula (3). Specifically, it is preferable that $W_7$ is a divalent group derived from an alkoxy group, an alkyl group, or an aryl group.

Formula (8)

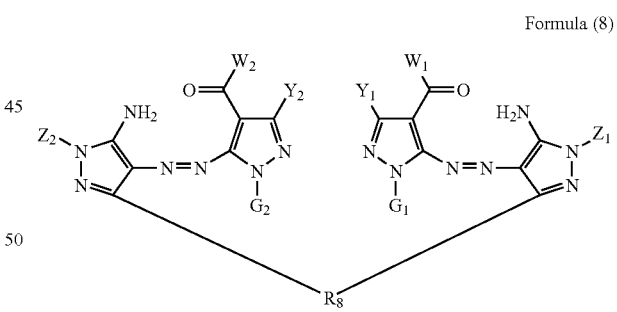

In Formula (8), $G_1$ and $G_2$ are each independently synonymous with G in Formula (3). $W_1$ and $W_2$ are each independently synonymous with W in Formula (3). $Y_1$ and $Y_2$ are each independently synonymous with Y in Formula (3). $Z_1$ and $Z_2$ are each independently synonymous with $R_2$ in Formula (3).

$R_8$ represents a divalent group and is synonymous with the substituent which may be a divalent substituent among the substituents exemplified as $R_1$ in Formula (3). Specifically, it is preferable that $R_8$ is a divalent group derived from an acylamino group, an alkyl group, an aryl group, or a heterocyclic group.

Formula (9)

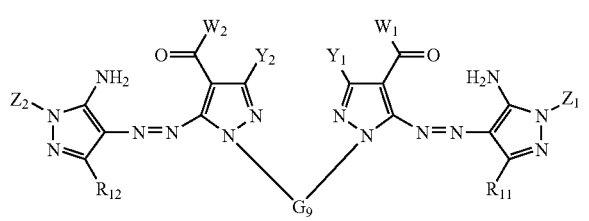

In Formula (9), $R_{11}$ and $R_{12}$ are each independently synonymous with $R_1$ in Formula (3). $W_1$ and $W_2$ are each independently synonymous with W in Formula (3). $Y_1$ and $Y_2$ are each independently synonymous with Y in Formula (3). $Z_1$ and $Z_2$ are each independently synonymous with $R_1$ in Formula (3).

$G_9$ represents a divalent group and is synonymous with the substituent which may be a divalent substituent among the substituents exemplified as G in Formula (3). Specifically, it is preferable that $G_9$ is a divalent group derived from an alkyl group, a cycloalkyl group, an aralkyl group, an alkenyl group, an alkynyl group, an aryl group, or a heterocyclic group.

In the invention, the azo pigment represented by Formula (3) is particularly preferably the azo pigments represented by Formulae (4) (5), (7), (8), or (9), more preferably the azo pigments represented by Formulae (4), (5), (7), or (9). Among them, the azo pigment represented by Formula (4) is particularly preferable.

Hereinafter, the azo pigment represented by Formula (4) and a tautomer thereof will be described in detail.

Formula (4)

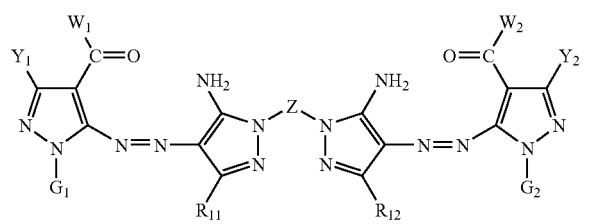

In Formula (4), Z represents a divalent group derived from a 5- to 8-membered nitrogen-containing heterocycle. $Y_1$, $Y_2$, $R_{11}$, and $R_{12}$ each independently represent a hydrogen atom or a substituent. $G_1$ and $G_2$ each independently represent a hydrogen atom, an alkyl group, a cycloalkyl group, an aralkyl group, an alkenyl group, an alkynyl group, an aryl group, or a heterocyclic group. $W_1$ and $W_2$ each independently represent an alkoxy group, an amino group, an alkyl group, or an aryl group.

In formula (4), Z represents a divalent group derived from a 5- to 8-membered nitrogen-containing heterocycle. Preferable examples of the nitrogen-containing heterocycle without limiting the substitution position thereof include a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, and a pyridazine ring. More preferable examples include a 6-membered nitrogen-containing heterocycle such as a pyridine ring, a pyrimidine ring, and an s-triazine ring. Particularly, it is preferable that Z is a divalent group derived from a pyrimidine ring.

When Z is a divalent group derived from a 6-membered nitrogen-containing heterocycle, the intramolecular and intermolecular interactions of pigment molecules are more easily improved from the viewpoint of hydrogen bonding and planarity of the molecules. Thus, it is preferable.

In Formula (4), $Y_1$ and $Y_2$ are synonymous with Y in Formula (3) and preferable examples thereof are also the same. $G_1$ and $G_2$ are synonymous with G in Formula (3) and preferable examples thereof are also the same. $R_{11}$ and $R_{12}$ are synonymous with $R_1$ in Formula (3) and preferable examples thereof are also the same. $W_1$ and $W_2$ are synonymous with W in Formula (1) and preferable examples thereof are also the same.

In the azo pigment in the invention, a tautomer of the azo pigment represented by Formula (4) is included in the scope thereof Formula (4) is shown as a canonical structure among several tautomers with chemically acceptable structures. Tautomers other than the above-described structure may be used. The azo pigment may be used as a mixture containing plural tautomers.

For example, an azo-hydrazone tautomer represented by Formula (4') described below may be thought for the azo pigment represented by Formula (4).

The compound represented by Formula (4') which is a tautomer of the azo pigment represented by Formula (4) is included in the scope of the invention.

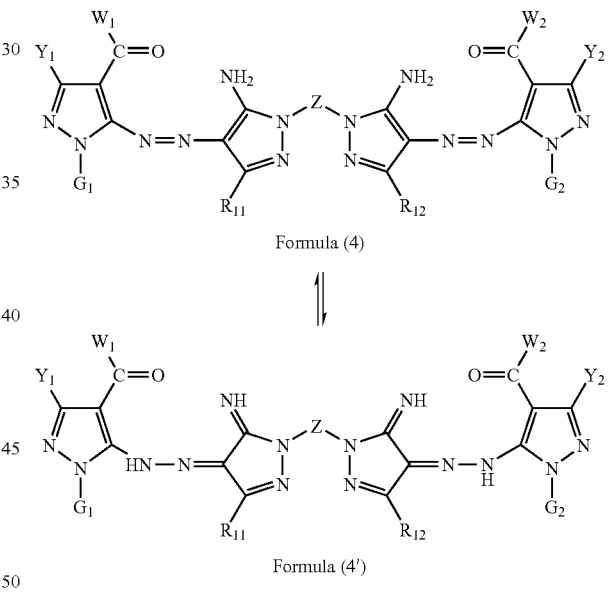

$R_{11}$, $R_{12}$, $W_1$, $W_2$, $Y_1$, $Y_2$, $G_1$, $G_2$, and Z in Formula (4') are respectively synonymous with $R_{11}$, $R_{12}$, $W_1$, $W_2$, $Y_1$, $Y_2$, $G_1$, $G_2$, and Z in Formula (4).

In this regard, with reference to the combination of preferable substituents of the compound represented by Formula (4), the compound in which at least one of various substituents are the above-described preferred groups is more preferred, the compound in which more various substituents are the above-described preferred groups is more preferred, and the compound in which all substituents are the above-described preferred groups is particularly preferred.

Examples of a particularly preferable combination of the azo pigment represented by Formula (4) of the invention include the following combinations (1) to (5):

(1) Preferably, $W_1$ and $W_2$ are each independently an alkoxy group (for example, a methoxy group, an ethoxy group, an i-propoxy group, or a t-butoxy group), an amino group (for example, an —$NH_2$ group, a methylamino group, a dimethylamino group, or an anilino group), an alkyl group (for example, a methyl group, an ethyl group, an n-propyl group, an i-propyl group, a t-butyl group, or a cyclopropyl group) or an aryl group (for example, a phenyl group, a p-tolyl group, or a naphthyl group). Among them, an alkoxy group, an amino group, and an alkyl group are preferable. Further, an alkoxy group and an amino group are preferable. An alkoxy group whose total number of carbon atoms is 5 or less, an amino group (an —$NH_2$ group), and an alkylamino group whose total number of carbon atoms is 5 or less are further preferable. An alkoxy group whose total number of carbon atoms is 3 or less, an amino group (an —$NH_2$ group), an alkylamino group whose total number of carbon atoms is 3 or less are particularly preferable. A methoxy group (an —$OCH_3$ group) is particularly preferable as $W_1$ or $W_2$.

(2) Preferably, $R_{11}$ and $R_{12}$ are each independently a hydrogen atom or a substituent (for example, a substituted or unsubstituted acylamino group having 1 to 8 carbon atoms in total, a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total). A straight chain or branched alkyl group having 1 to 8 carbon atoms in total, a substituted or unsubstituted aryl group having 6 to 10 carbon atoms in total, and a substituted or unsubstituted heterocyclic group having 4 to 8 carbon atoms in total are more preferable. Specifically, a methyl group, an i-propyl group, a t-butyl group, a phenyl group or a pyridyl group is preferable, and a tert-butyl group is particularly preferable as each of $R_{11}$ and $R_{12}$.

(3) Z represents a divalent group derived from a 5- to 8-membered nitrogen-containing heterocycle and it may be further condensed. Preferable examples of the nitrogen-containing heterocycle in Z include a 5- or 6-membered substituted or unsubstituted nitrogen-containing heterocycle such as a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, and a pyridazine ring. Particularly, a 6-membered nitrogen-containing heterocycle having 3 to 10 carbon atoms is preferable. Further, preferable examples of the heterocycle include a pyridine ring, a pyrimidine ring, an s-triazine ring, a pyridazine ring, and a pyrazine ring. More preferable examples thereof include a pyridine ring, a pyrimidine ring, an s-triazine ring, a pyridazine ring, and a pyrazine ring. A pyrimidine ring and an s-triazine ring are further preferable. A pyrimidine ring is particularly preferable as the heterocycle from which a divalent group is derived for Z.

(4) $G_1$ and $G_2$ each independently represent a hydrogen atom, an alkyl group, a cycloalkyl group, an aralkyl group, an alkenyl group, an alkynyl group, an aryl group, or a heterocyclic group. Particularly, a hydrogen atom, a methyl group, an ethyl group, an n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, and a pyrazinyl group are preferable. Further, a hydrogen atom, a methyl group, a phenyl group, a pyridyl group, a pyrimidinyl group, a pyrazinyl group are preferable. Among them, a methyl group, a 2-pyridyl group, a 2,6-pyrimidinyl group, and a 2,5-pyrazinyl group are particularly preferable.

As the alkyl group represented by $G_1$ or $G_2$, an alkyl group whose total number of carbon atoms is 5 or less is more preferable, an alkyl group whose total number of carbon atoms is 3 or less is further preferable, and a methyl group is particularly preferable.

(5) $Y_1$ and $Y_2$ each independently represent a hydrogen atom, an alkyl group (for example, a methyl group) an aryl group (for example, a phenyl group), a heterocyclic group (for example, a 2-pyridyl group), or an alkylthio group (for example, a methylthio group), and more preferably, a hydrogen atom, a methyl group, a phenyl group, or a methylthio group. Among them, a hydrogen atom is particularly preferable as $Y_1$ or $Y_2$.

As for the azo pigment of the invention, in Formulae (1), (2), and (3), n is preferably 2 or 3, and particularly preferably 2. When n is 2, a high coloring power and an excellent light resistance are provided, and further, fastness against chemicals is improved.

In the azo pigments represented by Formulae (1), (2), (3), or (4) in the invention, preferable examples thereof include the azo pigments represented by Formulae (10) to (13) described below.

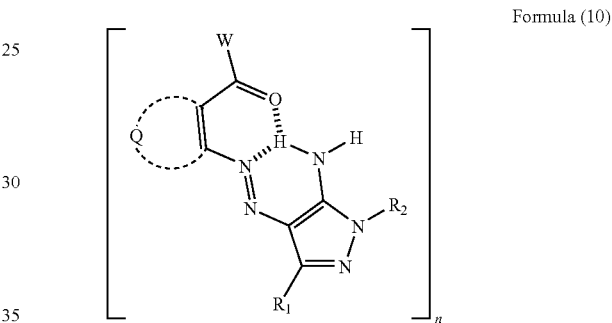

Formula (10)

Formula (11)

$R_1$, $R_2$, W, and Q in Formula (10) are respectively synonymous with $R_1$, $R_2$, W, and Q in Formula (2). G, $R_1$, $R_2$, W, and Y in Formula (11) are respectively synonymous with G, $R_1$, $R_2$, W, and Y in Formula (3).

Formula (12)

$G_1$, $G_2$, $R_{11}$, $R_{12}$, $W_1$, $W_2$, $Y_1$, and $Y_2$ in Formula (12) are respectively synonymous with $G_1$, $G_2$, $R_{11}$, $R_{12}$, $W_1$, $W_2$, $Y_1$, and $Y_2$ in Formula (4).

$X_{11}$ and $X_{12}$ each independently represent a heteroatom in a divalent group (Het.) derived from a nitrogen-containing heterocycle represented by Z in Formula (4).

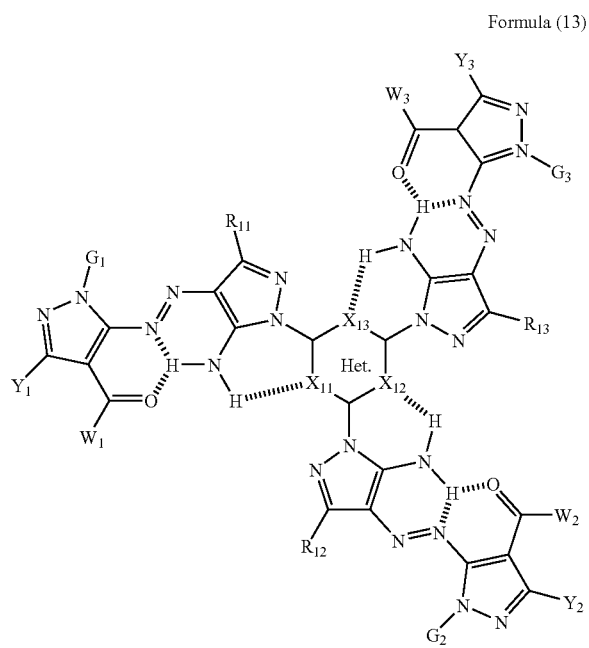

Formula (13)

In Formula (13), $G_1$, $G_2$, and $G_3$ are each independently synonymous with G in Formula (3). $W_1$, $W_2$, and $W_3$ are each independently synonymous with W in Formula (3). $Y_1$, $Y_2$, and $Y_3$ are each independently synonymous with Y in Formula (3). $R_{11}$, $R_{12}$, and $R_{13}$ are each independently synonymous with $R_1$ in Formula (3).

Further, $X_{11}$, $X_{12}$, and $X_{13}$ each independently represent a heteroatom in a trivalent heterocyclic group (Het.) formed by three $R_2$s in the azo compounds shown in parenthesis in Formula (3).

In the invention, a large number of tautomers may be thought for the azo pigments represented by Formulae (1), (2), (3), or (4).

Further, in the invention, it is preferable that the azo pigment represented by Formula (1) has a substituent which forms an intramolecular hydrogen bond or an intramolecular cross hydrogen bond. It is preferable that the azo pigment represented by Formula (1) in the invention has at least one of the substituent which forms an intramolecular cross hydrogen bond. It is more preferable that the azo pigment has at least three of the substituent which forms an intramolecular hydrogen bond. It is particularly preferable that the azo pigment has at least three of the substituent which forms an intramolecular hydrogen bond and at least two of the hydrogen bonds form an intramolecular cross hydrogen bond.

Among the azo pigments represented by Formula (1), (2), (3), or (4), particularly preferable examples of the azo pigment include the azo pigments represented by Formulae (10) to (13).

As shown in Formulae (10) to (13), the reason why these structures are preferable is that a nitrogen atom which forms a heterocyclic group, a hydrogen atom, and a heteroatom (a nitrogen atom of an azo group or its tautomer, i.e., hydrazone group, an oxygen atom of a carbonyl group or a nitrogen atom of an amino group) contained in an azo pigment structure easily form at least one intramolecular cross hydrogen bond (intramolecular hydrogen bond).

As shown in Formulae (10) and (11), the reason why these structures are preferable is that a nitrogen atom which forms a heterocyclic group, a hydrogen atom of an amino group, and a heteroatom (for example, a nitrogen atom of an azo group or its tautomer, i.e., hydrazone group, an oxygen atom of a carbonyl group or a nitrogen atom of an amino group) contained in an azo pigment structure easily form at least one intramolecular cross hydrogen bond.

Further preferably, as shown in Formulae (12) and (13), a nitrogen atom which forms a heterocyclic group, a hydrogen atom of an amino group, and a heteroatom (for example, a nitrogen atom of an azo group or its tautomer, i.e., hydrazone group, an oxygen atom of a carbonyl group or a nitrogen atom of an amino group) contained in an azo pigment structure easily form at least four intramolecular hydrogen bonds and easily form at least two intramolecular cross hydrogen bonds.

As a result, the planarity of the molecules is improved and intramolecular and intermolecular interactions are improved. For example, the crystallinity of the azo pigment represented by Formula (12) becomes high (a higher order structure is easily formed). Further, required performances as the pigment, for example, lightfastness, thermal stability, wet heat stability, waterproof properties, gas resistance or solvent resistance are significantly improved. Thus, it is the most preferable example.

In the azo pigment in the invention, an isotope (for example, $^2H$, $^3H$, $^{13}C$, or $^{15}N$) may be contained in the compounds represented by Formulae (1) to (13).

Hereinafter, Pig.-1 to Pig.-70 will be exemplified as specific examples of the azo pigments represented by Formulae (1) to (13). However, the azo pigment to be used in the invention is not limited thereto. In addition, the structure of the following specific example is shown as a canonical structure among several tautomers with chemically acceptable structures. Needless to say, the structure may be the structure of tautomers other than the above-described structure.

Pig.-1

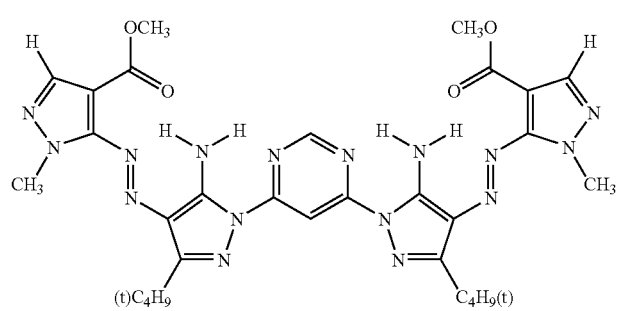

-continued
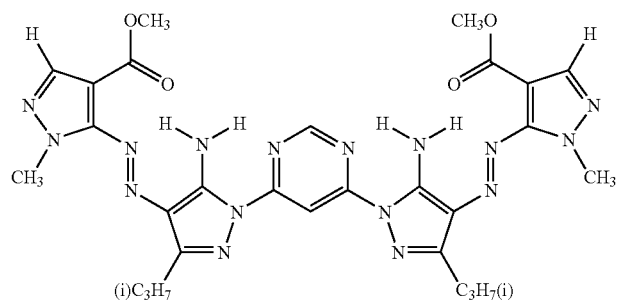
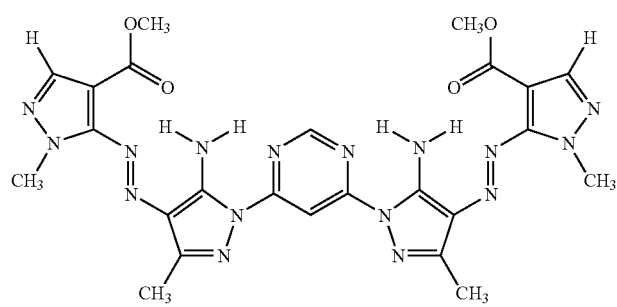
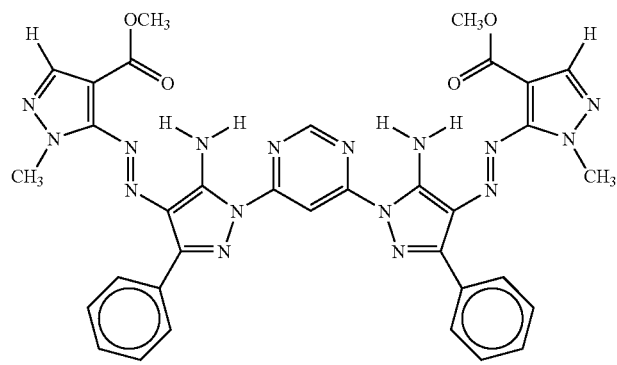
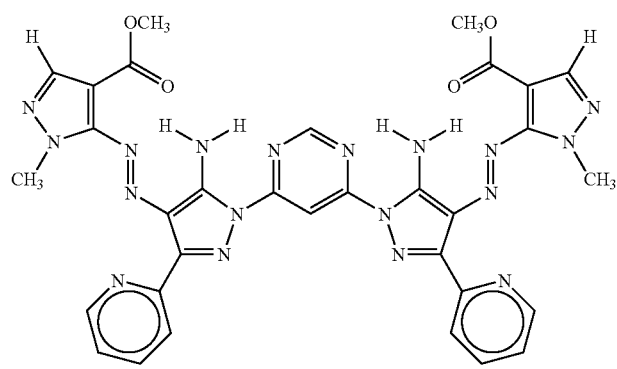
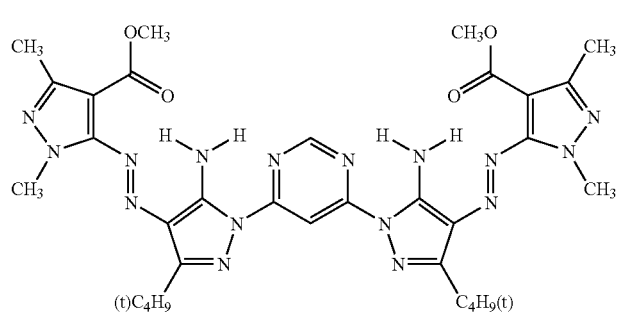

-continued
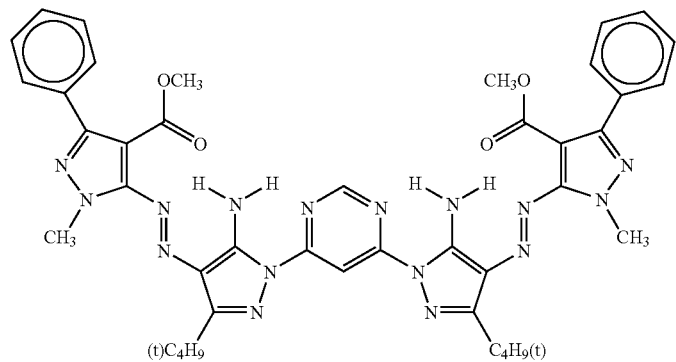
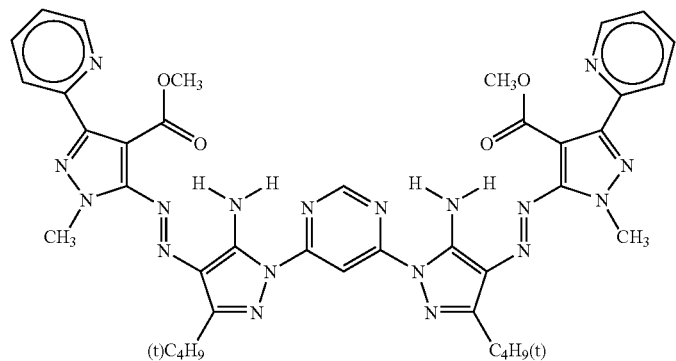
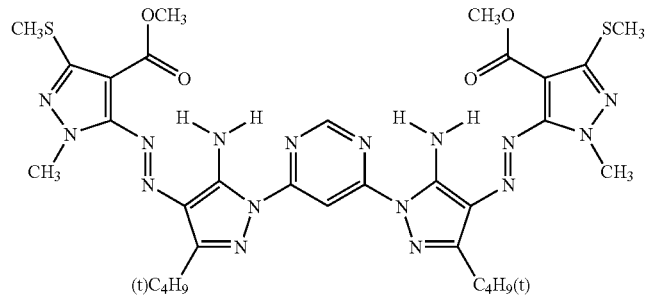
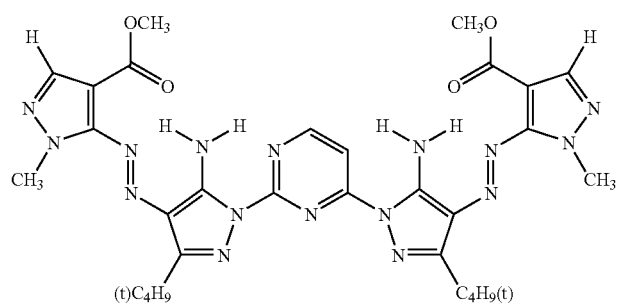
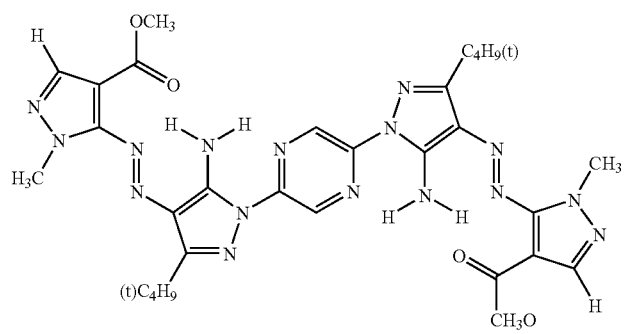

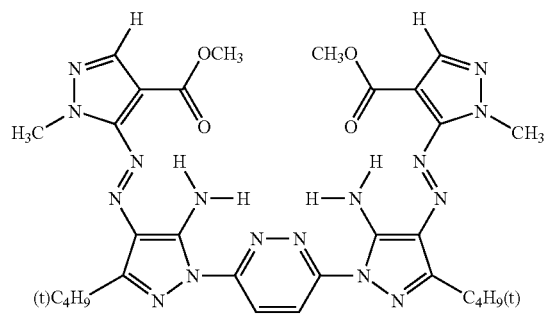
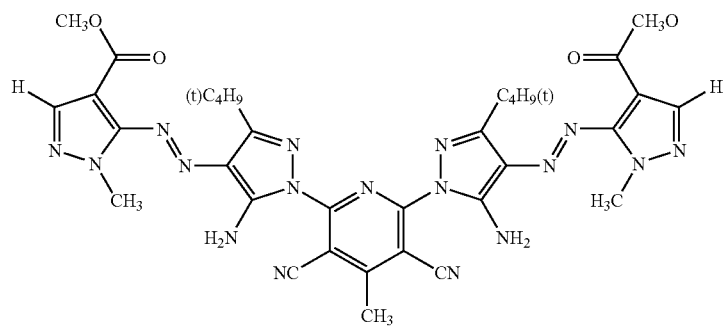
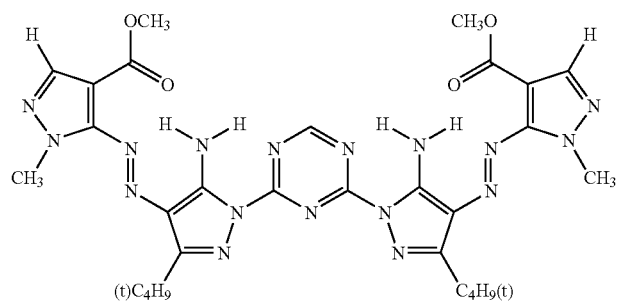
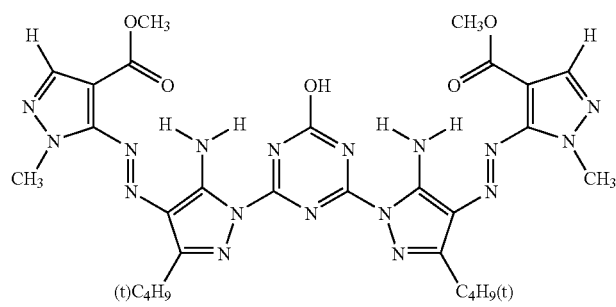
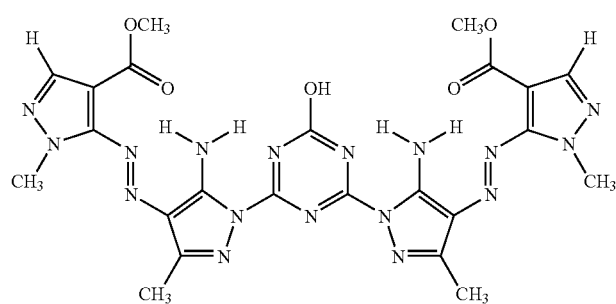

-continued

-continued

-continued

-continued

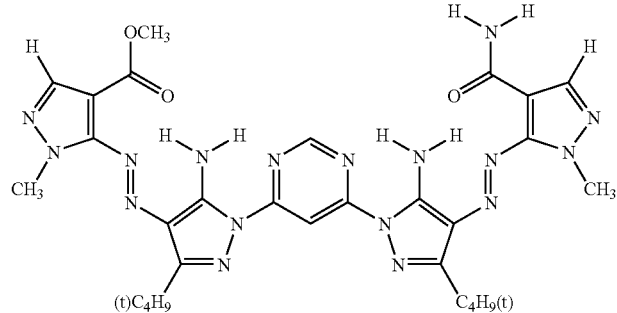
Pig.-41
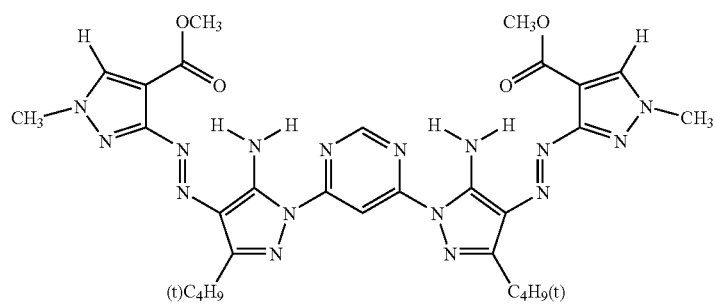
Pig.-42
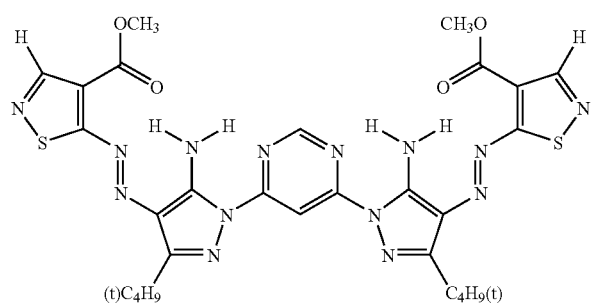
Pig.-43
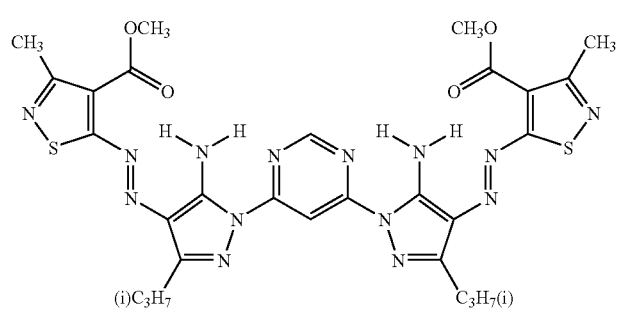
Pig.-44
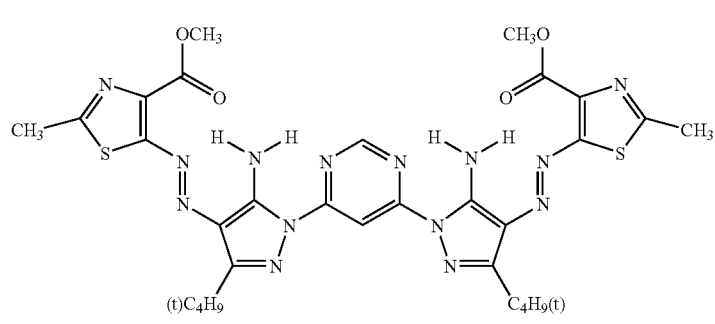
Pig.-45

-continued

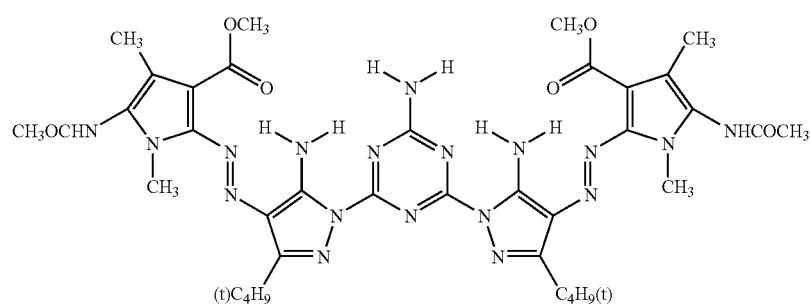
Pig.-51
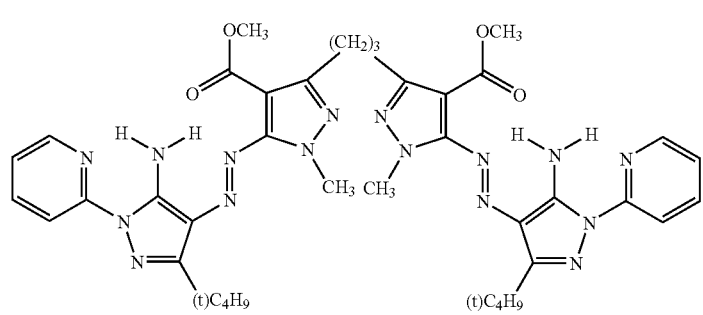
Pig.-52
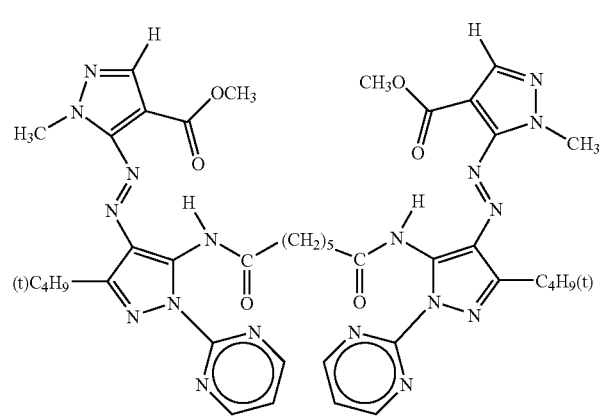
Pig.-53
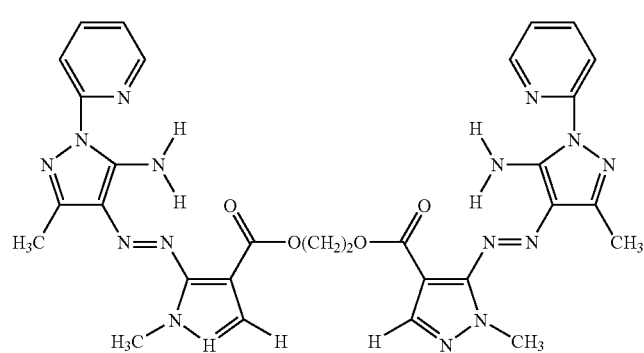
Pig.-54

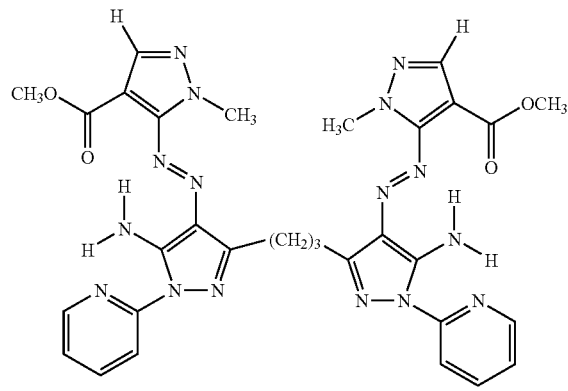
Fig.-55
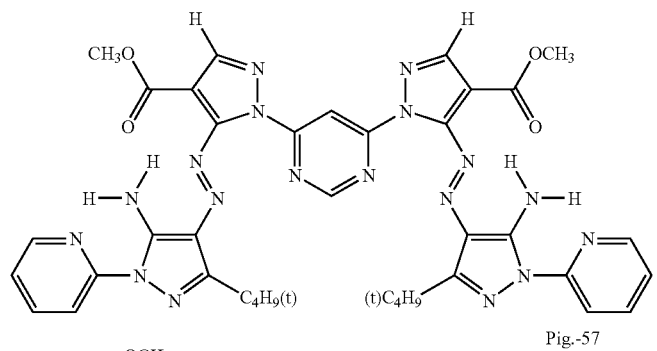
Fig.-56
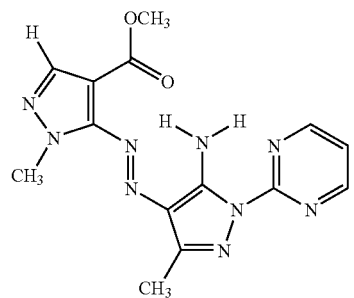
Fig.-57
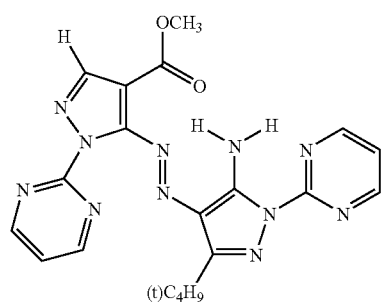
Fig.-59
Fig.-58
Fig.-60
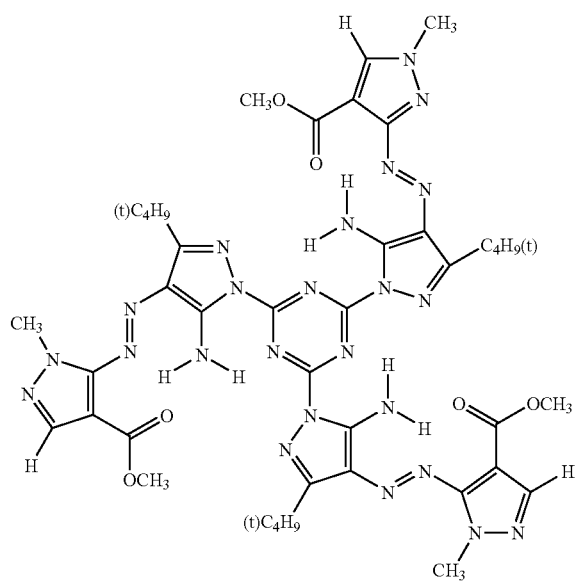

-continued

-continued

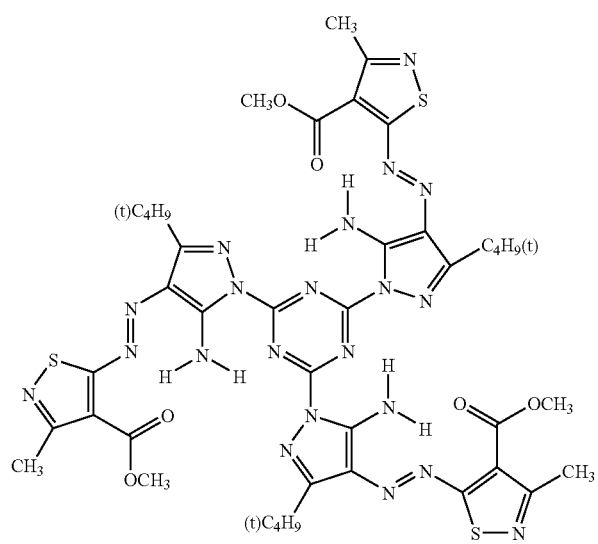

Fig.-70

It is enough that the chemical structures of the azo pigment represented by Formulae (1) to (4) in the invention are Formulae (1) to (4) or tautomers thereof. The crystalline form is not particularly limited. The pigment may have any crystalline form, for example, a so-called polymorph (crystalline polymorphism).

The term "crystalline polymorphism" means a crystal which has the same chemical composition, but whose arrangement of building block (molecule or ion) in the crystal is different. In the crystalline polymorphism, chemical and physical properties are determined by its crystal structure and each crystalline polymorphism may be distinguished based on rheology, hue, and other color characteristics. Further, a different crystalline polymorphism may be confirmed by X-Ray Diffraction (powder X-ray diffraction measurement result) or X-Ray Analysis (X-ray crystal structure analysis result).

When the crystalline polymorphism is present in the azo pigment represented by Formulae (1) to (4) in the invention, the crystal form may be any polymorphism or may be a mixture of two or more polymorphisms. It is preferable that the crystal form includes a single polymorphism as a main component. That is, it is preferable that the level of the incorporation of crystalline polymorphism is small. The content of the azo pigment having a single crystal form is from 70% to 100%, preferably from 80% to 100%, more preferably from 90% to 100%, further preferably from 95% to 100%, and particularly preferably 100% based on the whole azo pigment.

When the azo pigment having a single crystal form is included as a main component, the regularity for the arrangement of pigment molecules is improved and the intramolecular and intermolecular interactions are enhanced. Thus, a high level three-dimensional network is easily formed. As a result, it is preferable from the viewpoint of performances required for the pigment such as improvement in the hue, lightfastness, heat fastness, humidity fastness, oxidizing gas fastness, and solvent resistance.

The mixing ratio of the crystalline polymorphism in the azo pigment may be confirmed by the value of the solid which is physicochemically measured by Single crystal X-ray crystal structure analysis, Powder X diffraction (XRD), Micrograph (TEM) of crystal, or IR (KBr method).

In the invention, when the azo pigment represented by Formula (1) has an acid group, a part or all of the acid groups may be a salt type; or a salt type pigment and a free acid type pigment may be mixed. Examples of the salt type include a salt of alkali metals such as Na, Li, and K; a salt of ammonium which may be substituted by an alkyl group or a hydroxyalkyl group; and a salt of organic amine. Examples of the organic amine include lower alkylamine, hydroxy-substituted lower alkylamine, carboxy-substituted lower alkylamine, and polyamine having 2 to 10 alkyleneimine units having 2 to 4 carbon atoms. In the case of the salt type, the type is not limited to one kind and a plurality of kinds may be mixed and used.

In the structure of the azo pigment to be used in the invention, when a plurality of acid groups are included in one molecule, the plurality of acid groups may be respectively the salt type or acid type or they may be mutually different.

In the invention, the azo pigment represented by Formula (1) may be a hydrate containing water molecules in the crystal and the number of water molecules in the crystal is not particularly limited.

Subsequently, an example of the production method of the azo pigment represented by Formula (1) will be described. For example, a heterocyclic amine represented by Formula (A) described below is diazotized under acid condition, which is subjected to coupling reaction with the compound represented by the following Formula (B). The resulting product is subjected to post-treatment in the ordinary manner. Thus, the azo pigment represented by Formula (1) may be produced.

Formula (A)

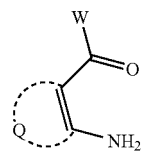

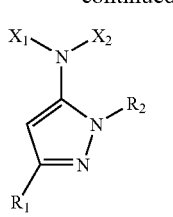

Formula (B)

W, Q, $R_1$, $R_2$, $X_1$, and $X_2$ in Formulae (A) and (B) are respectively synonymous with W, Q, $R_1$, $R_2$, $X_1$, and $X_2$ in Formula (1).

The heterocyclic amine represented by Formula (A) may be generally produced by a well-known and common used method, for example, the method described in Hely. Chim. Acta, 41, 1958, 1052-1056, the method described in Hely. Chim. Acta, 42, 1959, 349-352, and the method in accordance with them.

The compound represented by Formula (B) may be produced by the methods described in PCT International publication No. 06/082669 and JP-A No. 2006-57076 or the methods based on these methods.

The diazotizing reaction of the heterocyclic amine represented by Formula (A) may be performed by allowing the heterocyclic amine to react with reagents such as sodium nitrite, nitrosylsulfuric acid, and isoamyl nitrite in an acidic solvent such as sulfuric acid, phosphoric acid, acetic acid, hydrochloric acid, or methanesulfonic acid at a temperature of 15° C. or lower for about 10 minutes to about 6 hours.

The coupling reaction may be carried out by reacting the diazonium salt obtained by the above-described method with the compound represented by Formula (B) at 40° C. or lower, preferably 25° C. or lower for about 10 minutes to about 12 hours.

In some cases, a crystal is precipitated in the reaction liquid. Generally, a crystal is precipitated by adding water or an alcohol solvent to the reaction liquid and then the crystal may be filtered. A crystal is also precipitated by adding the reaction liquid to an alcohol solvent or water and then precipitated crystal may be filtered. The azo pigment represented by Formula (1) may be obtained by washing and drying the filtered crystal, if necessary.

The azo pigment represented by Formula (1) is obtained as a crude azo pigment by the above production method. When the azo pigment is used as the pigment of the invention, it is preferred to perform a post-treatment. Examples of the post-treatment include milling treatments such as solvent salt milling, salt milling, dry milling, solvent milling, and acid pasting; a process of controlling the pigment particles by solvent heating treatment; and a process of treating the surface with resins, surfactants, and dispersing agents.

It is preferable that the azo pigment represented by Formula (1) of the invention is subjected to solvent heating treatment and/or solvent salt milling as post-treatment.

Examples of the solvent to be used for the solvent heating treatment include water; aromatic hydrocarbon solvents such as toluene and xylene; halogenated hydrocarbon solvents such as chlorobenzene and o-dichlorobenzene; alcohol solvents such as i-propanol and i-butanol; polar aprotic organic solvents such as N,N-dimethylformamide, N,N-dimethylacetamide, and N-methyl-2-pyrrolidone; glacial acetic acid, pyridine, and mixtures thereof. Organic or inorganic acids or bases may be further added to the above-described solvents. The temperature of solvent heating treatment varies depending on the primary particle diameter of the desired pigment and the temperature is preferably from 40° C. to 150° C., and further preferably from 60° C. to 100° C. Further, the time for the treatment is preferably from 30 minutes to 24 hours.

An example of the solvent salt milling includes a method including the steps of placing a crude azo pigment, an inorganic salt, and an organic solvent which does not dissolve the organic salt into a kneading machine and kneading and grinding in it. As the inorganic salt, a water-soluble inorganic salt may be suitably used. Preferable examples thereof include inorganic salts such as sodium chloride, potassium chloride, and sodium sulfate. It is more preferable to use an inorganic salt having an average particle diameter of 0.5 μm to 50 μm. The amount of the inorganic salt is preferably 3 parts by mass to 20 parts by mass, more preferably 5 parts by mass to 15 parts by mass with respect to the crude azo pigment. A water-soluble organic solvent may be suitably used as the organic solvent. However, the solvent evaporates easily due to the temperature rise at the time of kneading and, thus a high-boiling-point solvent is preferable from a viewpoint of safety. Examples of the organic solvent include diethylene glycol, glycerol, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and mixtures thereof. The amount of the water-soluble organic solvent is preferably from 0.1 parts by mass to 5 parts by mass based on the crude azo pigment. The kneading temperature is preferably from 20° C. to 130° C., and particularly preferably from 40° C. to 110° C. Usable examples of the kneading machine include kneaders and mix maulers.

The preparation method of the vinyl polymer particles containing the styrene-acrylic acid copolymer in the invention and the azo pigment represented by Formula (1) is not particularly limited. For example, it may be produced by the production method of an encapsulated pigment described in JP-A No. 10-140065. Specifically, the styrene-acrylic acid copolymer and the azo pigment represented by Formula (1) are dispersed in a water-based medium containing a water-soluble organic solvent. Thereafter, at least a part of the water-soluble organic solvent is removed therefrom and a water dispersion of colored particles is obtained.

The content of the vinyl polymer particles in the water-based ink composition for inkjet recording of the invention may be suitably set according to the purpose. For example, it may be set to 1% by mass to 10% by mass. From the viewpoint of image density and ink stability, the content is preferably from 1.5% by mass to 7% by mass, and more preferably from 2% by mass to 6% by mass.

<Water-Soluble Solvent>

The water-based ink composition for inkjet recording (hereinafter, may be simply referred to as an "ink") of the invention includes a water-based liquid medium. An essential ingredient, water and a water-soluble organic solvent are included in the water-based liquid medium.

In this regard, the water-soluble organic solvent is used, for example, for the purpose of an anti-drying agent, a wetting agent or a penetration-enhancing agent. Specifically, the anti-drying agent is used in order to prevent clogging due to drying of the water-based ink composition for inkjet recording at the inkjet tip of a nozzle. As the anti-drying agent and the wetting agent, the water soluble organic solvent which has a vapor pressure lower than that of water is more preferable. For purpose of allowing the water-based ink composition for inkjet recording to penetrate the paper, the water soluble organic solvent is suitably used as the penetration-enhancing agent.

Examples of the water-soluble organic solvent include alkanediols (polyhydric alcohols) including glycerin, 1,2,6-hexanetriol, trimethylolpropane, ethylene glycol, propylene glycol, diethylene glycol, triethylene glycol, tetraethylene glycol, pentaethylene glycol, dipropylene glycol, polyoxyethylene glyceryl ether, polyoxypropylene glyceryl ether, 2-butene-1,4-diol, 2-ethyl-1,3-hexanediol, 2-methyl-2,4-pentanediol, 1,2-hexanediol, 1,2-octanediol, 1,2-pentanediol, and 4-methyl-1,2-pentanediol; alkyl alcohols having 1 to 4 carbon atoms such as ethanol, methanol, butanol, propanol or i-propanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-i-propyl ether, diethylene glycol mono-i-propyl ether, ethylene glycol mono-n-butyl ether, ethylene glycol mono-t-butyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-i-propyl ether, dipropylene glycol monomethyl ether, dipropylene glycol monoethyl ether, dipropylene glycol mono-n-propyl ether, or dipropylene glycol mono-i-propyl ether; 2-pyrrolidone, N-methyl 2-pyrrolidone, 1,3-dimethyl-2-imidazolidinone, formamide, acetamide, dimethylsulfoxide, sorbit, sorbitan, acetin, diacetin, triacetin, and sulfolane. These solvents may be used singly, or in a combination of two or more of them.

When the water-soluble organic solvent is used for the purpose of an anti-drying agent or a wetting agent, the water-soluble organic solvent is preferably a polyol compound, and examples thereof include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, and 1,2,6-hexanetriol. The water-soluble organic solvent as an anti-drying agent or a wetting agent may be used singly, or in a combination of two or more of them.

When the water-soluble organic solvent is used for the purpose of a penetration-enhancing agent, the water-soluble organic solvent is preferably a polyol compound. Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol or 2,2,4-trimethyl-1,3-pentanediol. Among these compounds, 2-ethyl-1,3-hexanediol and 2,2,4-trimethyl-1,3-pentanediol are preferable.

The water-soluble organic solvent used in the invention may be used singly, or two or more kinds of them may be mixed and used. Preferable examples of the water-soluble organic solvent include glycerin, dipropylene glycol, polyoxyethylene glyceryl ether and polyoxypropylene glyceryl ether.

The content of the water-soluble organic solvent in the water-based ink composition is preferably from 5% by mass to 60% by mass, and more preferably from 10% by mass to 40% by mass.

The addition amount of water used in the water-based ink composition of the invention is not particularly limited. The addition amount of water is preferably from 10% by mass to 99% by mass, more preferably from 30% by mass to 80% by mass, and still more preferably from 50% by mass to 70% by mass.

<Surfactant>

The water-based ink composition for inkjet recording of the invention may preferably contain a surface tension regulating agent. Any of a nonionic surfactant, a cationic surfactant, an anionic surfactant or a betaine surfactant can be used as the surface tension regulating agent. In order for the ink of the invention to be satisfactorily applied by an inkjet system, the addition amount of the surface tension regulating agent is such an amount that the surface tension of the ink composition for inkjet recording of the invention is adjusted preferably to a range of from 20 mN/m to 60 mN/m, more preferably from 20 mN/m to 45 mN/m, and still more preferably from 25 mN/m to 40 mN/m.

As the surfactant in the invention, a compound having a structure in which a hydrophilic moiety and a hydrophobic moiety are included in the molecule thereof can be effectively used. Any of an anionic surfactant, a cationic surfactant, an amphoteric surfactant, or a nonionic surfactant can be used. Furthermore, the above-mentioned polymer substance (polymer dispersing agent) is also usable as a surfactant.

Examples of the anionic surfactant include sodium dodecylbenzene sulfonate, sodium lauryl sulfate, sodium alkyl diphenyl ether disulfonate, sodium alkylnaphthalene sulfonate, sodium dialkylsulfosuccinate, sodium stearate, potassium oleate, sodium dioctylsulfosuccinate, sodium polyoxyethylene alkyl ether sulfate, sodium polyoxyethylene alkylphenyl ether sulfate, sodium oleate, and sodium t-octylphenoxyethoxy-polyethoxyethyl sulfate. These surfactants may be used singly, or in a combination of two or more of them.

Examples of the nonionic surfactant include polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octyl phenoxyethyl polyethoxyethanol, and nonylphenoxyethyl polyethoxyethanol. The nonionic surfactants may be used singly, or in a combination of two or more of them.

Examples of the cationic surfactant include a tetraalkyl ammonium salt, an alkylamine salt, a benzalkonium salt, an alkylpyridinium salt, and an imidazolium salt. Specific examples include dihydroxyethyl stearylamine, 2-heptadecenyl-hydroxyethyl imidazoline, lauryldimethyl benzyl ammonium chloride, cetyl pyridinium chloride, and stearamidomethylpyridinium chloride.

The addition amount of the surfactant to be added to the water-based ink composition for inkjet recording of the invention is not specifically limited, but is preferably 1% by mass or more, more preferably from 1% by mass to 10% by mass, and even more preferably from 1% by mass to 3% by mass with respect to the total amount of the water-based ink composition for inkjet recording.

<Other Components>

The ink composition of the invention may contain other additives. Examples of other additives include known additives such as a solid humectant, an ultraviolet absorber, an anti-fading agent, an antifungal agent, a pH adjuster, an anti-rust agent, an antioxidant, an emulsion stabilizer, an antiseptic agent, a defoaming agent, a viscosity adjusting agent, a dispersion stabilizer, a chelating agent, and a solid wetting agent.

Examples of the solid humectant include saccharides such as glucose, mannose, fructose, ribose, xylose, arabinose, galactose, aldonic acid, glucitol, maltose, cellobiose, lactose, sucrose, trehalose, and maltotriose; sugar alcohols; hyaluronic acids; and ureas.

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

As anti-fading agents, various organic anti-fading agents and metal complex anti-fading agents can be used. Examples of the organic anti-fading agents include hydroquinones, alkoxyphenols, dialkoxyphenols, phenols, anilines, amines, indans, chromanes, alkoxy anilines, and heterocycles. Examples of the metal complex anti-fading agents include a nickel complex and a zinc complex.

Examples of the antifungal agent include sodium dehydroacetate, sodium benzoate, sodium pyridinethione-1-oxide, ethyl p-hydroxybenzoate, 1,2-benzisothiazolin-3-one, sodium sorbate, and sodium pentachlorophenol. The content of antifungal agent in the ink composition for inkjet recording is preferably from 0.02% by mass to 1.00% by mass.

The pH adjuster is not specifically limited as long as the pH adjuster can adjust a pH value to a desired value without exerting an adverse influence on an ink composition for inkjet recording to which the pH adjuster is added. The pH adjuster may be selected appropriately in accordance with the purpose. Examples of the pH adjuster include alcohol amines (such as diethanol amine, triethanol amine or 2-amino-2-ethyl-1,3-propanediol); alkali metal hydroxides (such as lithium hydroxide, sodium hydroxide or potassium hydroxide); ammonium hydroxides (such as ammonium hydroxide or quaternary ammonium hydroxide); phosphonium hydroxide; and alkali metal carbonates.

Examples of the antirust agent include acid sulfite, sodium thiosulfate, ammonium thiodiglycolate, dii-propyl ammonium nitrite, pentaerythritol tetranitrate, and dicyclohexyl ammonium nitrite.

Examples of the antioxidant include phenolic antioxidants (including hindered phenol antioxidants), amine antioxidants, sulfur antioxidants, and phosphorus antioxidants.

Examples of the chelating agent include sodium ethylenediamine tetraacetate, sodium nitrilotriacetate, sodium hydroxyethyl ethylenediamine triacetate, sodium diethylenetriamine pentaacetate, and sodium uranyl diacetate.

<Resin Particles>

The water-based ink composition for inkjet recording according to the invention may include resin particles or polymer latexes. Preferable examples of the resin particles or the polymer latexes include particles of any of the following: an acrylic resin, a vinyl acetate resin, a styrene-butadiene resin, a vinyl chloride resin, an acryl-styrene resin, a butadiene resin, a styrene resin, a crosslinked acrylic resin, a crosslinked styrene resin, a benzoguanamine resin, a phenol resin, a silicone resin, an epoxy resin, a urethane resin, a paraffin resin, and a fluororesin. Among them, resin particles of an acrylic resin, an acryl-styrene resin, a styrene resin, a crosslinked acrylic resin, and a crosslinked styrene resin are preferable.

As a preferable example of the resin particles, self-dispersing fine polymer particles are listed. Here, the term "self-dispersing fine polymer particles" means fine particles of a water-insoluble polymer which may be dispersed in a water-based medium by a functional group (particularly, an acidic group or its salt) which is included in the polymer in the absence of another surfactant and does not contain a free emulsifying agent. Here, the term "dispersion state" includes an emulsified state (emulsion) in which the water-insoluble polymer is dispersed in the water-based medium in the liquid state and a dispersion state (suspension) in which the water-insoluble polymer is dispersed in the water-based medium in the solid state. In the invention, it is preferable that the water-insoluble polymer may be in a dispersion state in which the water-insoluble polymer is dispersed in the solid state.

It is preferable that the self-dispersing fine polymer particles preferably used in the invention include a water-insoluble polymer containing a hydrophilic constitutional unit and a constitutional unit derived from an aromatic group-containing monomer from the viewpoint of self-dispersibility.

The hydrophilic constitutional unit is not particularly limited as long as it is derived from a hydrophilic group-containing monomer. The hydrophilic constitutional unit may be derived from one kind of hydrophilic group-containing monomer or two or more kinds of hydrophilic group-containing monomers. The hydrophilic group is not particularly limited and it may be a dissociative group or a nonionic hydrophilic group. From the viewpoints of facilitation of self-dispersion, and stability of the formed emulsification state or stability of dispersion state, the hydrophilic group is preferably a dissociative group, and more preferably an anionic dissociative group. Examples of the dissociative group include a carboxy group, a phosphoric acid group, and a sulfonic acid group. Among them, a carboxy group is preferable from the viewpoint of fixability when an ink composition is formed. Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethyl succinic acid. Specific examples of the unsaturated sulfonic acid monomer include styrene sulfonic acid, 2-acrylamido-2-methylpropane-sulfonic acid, 3-sulfopropyl(meth)acrylate, and bis-(3-sulfopropyl)-itaconic acid ester. Specific examples of the unsaturated phosphoric acid monomer include vinylphosphonic acid, vinyl phosphate, bis(methacryloxyethyl)phosphate, diphenyl-2-acryloyloxyethyl phosphate, diphenyl-2-metacryloyloxyethyl phosphate, and dibutyl-2-acryloyloxyethyl phosphate. From the viewpoints of dispersion stability and discharge stability, the unsaturated carboxylic acid monomer is preferable. Acrylic acid and methacrylic acid are more preferable.

As long as the aromatic group-containing monomer is a compound which contains an aromatic group and a polymerizable group, it is not particularly limited. The aromatic group may be a group derived from aromatic hydrocarbon or a group derived from an aromatic heterocycle. From the viewpoint of particle shape stability in the water-based medium, an aromatic group derived from aromatic hydrocarbon is preferable. The polymerizable group may be a condensation polymerizable group or an addition polymerizable group. In the invention, an addition polymerizable group is preferable and a group having an ethylenically unsaturated bond is more preferable from the viewpoint of particle shape stability in the water-based medium.

The aromatic group-containing monomer is preferably a monomer having an aromatic group derived from aromatic hydrocarbon and an ethylenically unsaturated bond, and more preferably an aromatic group-containing (meth)acrylate monomer. Examples of the aromatic group-containing monomer include phenoxyethyl(meth)acrylate, benzyl (meth)acrylate, phenyl(meth)acrylate, and styrene monomer. Among them, at least one selected from phenoxyethyl(meth) acrylate, benzyl(meth)acrylate, and phenyl(meth)acrylate is preferable, phenoxyethyl(meth)acrylate is more preferable, phenoxyethyl acrylate is particularly preferable from the viewpoints of the balance between hydrophilicity and hydrophobicity in the polymer chain as well as ink fixability.

In this regard the term "(meth)acrylate" means acrylate or methacrylate. The self-dispersing fine polymer particles include a constitutional unit derived from an aromatic group containing (meth)acrylate monomer and the content is preferably from 10% by mass to 95% by mass. When the content of the aromatic group containing (meth)acrylate monomer is from 10% by mass to 95% by mass, stability of the self-emulsification or self-dispersion state is improved. Further, an increase in ink viscosity may be suppressed. From the viewpoints of stability of the self-dispersion state, stabilization of particle shape in the water-based medium by hydrophobic interaction between aromatic rings, and decrease in the amount of water-soluble components caused by adequate hydrophobization of the particles, the content is preferably from 15% by mass to 90% by mass, more preferably 15% by mass to 80% by mass, and particularly preferably 25% by mass to 70% by mass.

For example, the self-dispersing fine polymer particles may be formed of a constitutional unit consisting of the aromatic group-containing monomer and a constitutional unit consisting of the dissociative group-containing monomer, and may further include other constitutional units, if necessary.

The monomer which forms other constitutional units is not particularly limited as long as it may be copolymerized with the aromatic group-containing monomer and the dissociative group-containing monomer. Among them, an alkyl group-containing monomer is preferable from the viewpoints of the flexibility of the polymer skeleton and the easiness of control of the glass transition temperature (Tg).

Examples of the monomer containing an alkyl group include alkyl(meth)acrylates such as methyl(meth)acrylate, ethyl(meth)acrylate, n-propyl(meth)acrylate, i-propyl(meth) acrylate, n-butyl(meth)acrylate, i-butyl(meth)acrylate, t-butyl(meth)acrylate, hexyl(meth)acrylate, or ethylhexyl(meth) acrylate; ethylenically unsaturated monomer having a hydroxy group such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, or hydroxyhexyl(meth)acrylate; dialkylaminoalkyl (meth)acrylates such as dimethylaminoethyl(meth)acrylate; (meth)acrylamides including N-hydroxyalkyl(meth)acrylamides such as N-hydroxymethyl(meth)acrylamide, N-hydroxyethyl(meth)acrylamide, or N-hydroxybutyl(meth)acrylamide; N-alkoxyalkyl(meth)acrylamides such as N-methoxymethyl(meth)acrylamide, N-ethoxymethyl (meth)acrylamide, N-n-butoxymethyl(meth)acrylamide, N-i-butoxymethyl(meth)acrylamide, N-methoxyethyl(meth) acrylamide, N-ethoxyethyl(meth)acrylamide, N-n-butoxyethyl(meth)acrylamide, N-i-butoxyethyl(meth)acrylamide and the like.

As for the molecular weight range of the water-insoluble polymer constituting the self-dispersing fine polymer particles in the invention, the weight average molecular weight is preferably from 3000 to 200,000, more preferably from 5000 to 150,000, and further preferably from 10000 to 100,000. When the weight average molecular weight is 3000 or more, the amount of water-soluble components may be suppressed effectively. Further, when the weight average molecular weight is 200,000 or less, the self-dispersion stability may be improved.

In this regard, the weight average molecular weight may be measured by gel permeation chromatography (GPC).

From the viewpoint of controlling hydrophilicity and hydrophobicity of the polymer, it is preferable that the water-insoluble polymer constituting the self-dispersing fine polymer particles contains an aromatic group-containing (meth) acrylate monomer in an amount of 15% by mass to 90% by mass in term of copolymerization ratio, a carboxy group-containing monomer, and an alkyl group-containing monomer, an acid value of the water-insoluble polymer being from 25 mgKOH/g to 100 mgKOH/g, and the weight average molecular weight of the water-insoluble polymer being from 3000 to 200,000. It is more preferable that the water-insoluble polymer constituting the self-dispersing fine polymer particles contains an aromatic group-containing (meth)acrylate monomer in an amount of 15% by mass to 80% by mass in terms of copolymerization ratio, a carboxy group-containing monomer, and an alkyl group-containing monomer, the acid value being from 25 mgKOH/g to 95 mgKOH/g, and the weight average molecular weight being from 5000 to 150,000.

The average particle diameter of the self-dispersing fine polymer particles is preferably from 10 nm to 1 µm, more preferably from 10 nm to 200 nm, further preferably 20 nm to 100 nm, and particularly preferably 20 nm to 50 nm.

The addition amount of the self-dispersing fine polymer particles is preferably 0.5% by mass to 20% by mass, more preferably 3% by mass to 20% by mass, and further preferably 5% by mass to 15% by mass based on the ink.

The glass transition temperature (Tg) of the self-dispersing fine polymer particles is preferably 30° C. or higher, more preferably 40° C. or higher, further preferably 50° C. or higher.

The particle size distribution of the polymer particles is not particularly limited and the polymer particles may have either a large particle size distribution or a monodispersed particle size distribution. Additionally, two or more kinds of the polymer particles having a monodispersed particle size distribution may be mixed and used.

<Printability-Improving Liquid Composition>

Preferable examples of the inkjet recording method using the inkjet recording liquid of the invention include an inkjet recording method including a process of applying a printability-improving liquid composition onto a recording medium.

Preferable examples of the printability-improving liquid composition include a liquid composition that, when mixed with an inkjet recording liquid, causes aggregation by changing the pH of the inkjet recording liquid. The pH of the liquid composition is preferably from 1 to 6, more preferably from 2 to 5, and still more preferably from 3 to 5.

The printability-improving liquid composition may include a component that causes aggregation of the pigment, and examples of the component includes a polyvalent metal salt, an organic acid, a polyallylamine, and derivatives thereof.

Examples of the polyvalent metal salt include a metal salt of any of the following: a salt of an alkaline earth metal belonging to Group 2 of the Periodic Table (for example, magnesium or calcium), a salt of a transition metal belonging to Group 3 of the Periodic Table (for example, lanthanum), a salt of a cation derived from an element belonging to Group 13 of the Periodic Table (for example, aluminum), or a salt a lanthanide (for example, neodymium). Preferable examples of the metal salt include a carboxylate (for example, a formate, an acetate, or a benzoate), a nitrate, a chloride, or a thiocyanate. Among them, more preferable examples include a calcium or magnesium salt of a carboxylic acid (such as formic acid, acetic acid, or benzoic acid), a calcium or magnesium salt of nitric acid, calcium chloride, magnesium chloride, and a calcium or magnesium salt of thiocyanic acid.

The organic acid is preferably selected, for example, from the following: polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, derivatives thereof, and salts thereof.

The component that causes aggregation of the pigment may be used singly or in a combination of two or more of them.

The content of the component that causes aggregation of the pigment in the printability-improving liquid composition is preferably from 1% by mass to 10% by mass, more preferably from 1.5% by mass to 7% by mass, and still more preferably from 2% by mass to 6% by mass.

<Physical Properties of Ink>

The surface tension of the ink of the invention is preferably from 20 mN/m to 60 mN/m, more preferably from 20 mN/m to 45 mN/m, and still more preferably from 25 mN/m to 40 mN/m. The viscosity of the ink of the invention is preferably from 1.2 mPa·s to 15.0 mPa·s, more preferably 2 mPa·s or more but less than 13 mPa·s, and still more preferably 2.5 mPa·s or more but less than 10 mPa·s at 20° C.

<Inkjet Recording Method>

In a preferable inkjet recording method in the invention, energy is supplied to the ink for inkjet recording to form an image on a known image receiving material such as plain paper, resin coated paper, inkjet paper as those described in JP-A Nos. 8-169172, 8-27693, 2-276670, 7-276789, 9-323475, 62-238783, 10-153989, 10-217473, 10-235995, 10-337947, and 10-217597, a film, electrophotographic common paper, fabrics, glass, metal or ceramics. In addition, as an inkjet recording method preferably applied to the invention, the inkjet recording method described in the paragraphs [0093] to [0105] of JP-A No. 2003-306623 is preferable.

When forming an image, a polymer latex compound may be used together for the purpose of imparting glossiness and water resistance or of improving weather-resistance. The time when the latex compound is added to the image receiving material may be before, after, or simultaneously with application of a colorant. Accordingly, the latex compound may be added to an image receiving paper or added to an ink, or may be used as an independent liquid of the polymer latex. More specifically, methods described in JP-A Nos. 2002-166638, 2002-121440, 2002-154201, 2002-144696 and 2002-080759 can be preferably used.

A preferable example of an image forming method using the inkjet recording liquid of the invention is an inkjet recording method including the following processes:

a first process, being a process of applying a printability-improving liquid composition onto a recording medium;

a second process, being a process of applying an inkjet recording liquid onto the recording medium onto which the liquid composition has been applied; and other additional processes, which are not particularly limited, and may be suitably selected according to the purpose.

Examples of the additional processes include a drying and removing process, and a heating and fixing process. The drying and removing process is not specifically restricted as long as the ink solvent in the inkjet recording liquid that is applied to a recording medium is dried and removed by the process, and the process may be suitably selected according to the purpose. The heating and fixing process is not specifically restricted as long as resin particles contained in the inkjet recording liquid used in the inkjet recording method are fused and fixed in the process, and the process may be suitably selected according to the purpose.

Another example of a preferable image forming system in the invention includes inkjet recording method including the following processes.

a first process, being a process of applying a printability-improving liquid composition onto an intermediate transfer medium;

a second process, being a process of applying an inkjet recording liquid onto the intermediate transfer medium onto which the liquid composition has been applied;

a third process, being a process of transferring an ink image formed on the intermediate transfer medium onto a recording medium; and other additional processes, which are not particularly limited, and may be suitably selected according to the purpose. Examples of the additional processes include a drying and removing process, and a heating and fixing process.

EXAMPLES

Hereinafter, the invention will be described in more detail with reference to examples, but the invention is not limited to the examples. Further, "parts" and "%" are expressed in terms of mass, unless otherwise specified.

Synthesis Example 1

Synthesis of Exemplified Compound (Pig.-1)

The synthetic scheme of the exemplified compound (Pig.-1) is shown below.

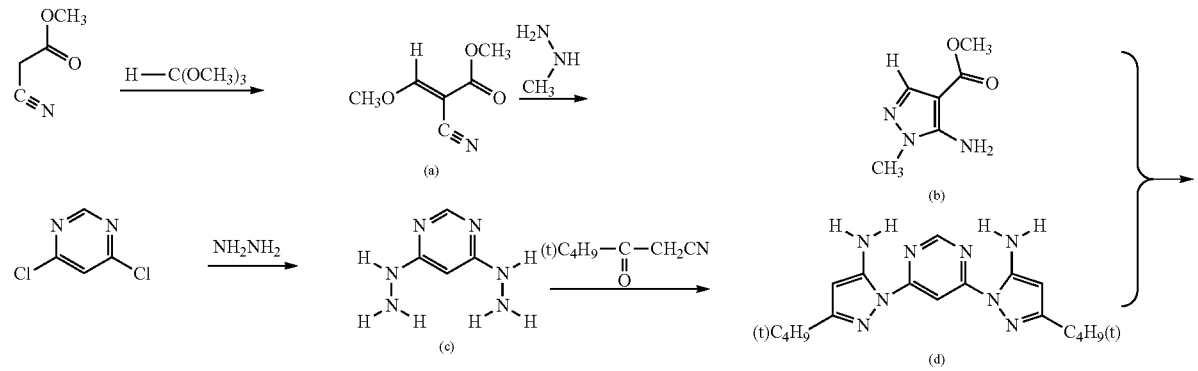

-continued

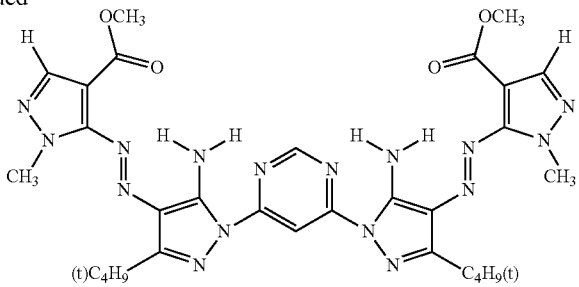

Pig.-1

(1) Synthesis of Intermediate (a)

42.4 g (0.4 mol) of trimethyl orthoformate, 20.4 g (0.2 mol) of acetic anhydride, and 0.5 g of p-toluenesulfonic acid were added to 29.7 g (0.3 mol) of methyl cyanoacetate, which was heated at 110° C. (outside temperature) and then stirred for 20 hours while a low-boiling-point component formed from the reaction system was distilled away. The reaction liquid was concentrated under reduced pressure. Thereafter, the resulting product was purified on a silica gel column, and 14.1 g of the intermediate (a) (yellow powder, yield: 30%) was obtained. The results of NMR measurement of the obtained intermediate (a) are shown below.

$^1$H-NMR (300 MHz, CDCl$_3$) 7.96 (s, 1H), 4.15 (s, 3H), 3.81 (s, 3H)

(2) Synthesis of Intermediate (b)

150 mL of i-propanol was added to 7.4 mL (141 mmol) of methylhydrazine, which was cooled to 15° C. (inside temperature). 7.0 g (49.6 mmol) of the intermediate (a) was gradually added to the mixed solution, which was then heated at 50° C. and stirred for 1 hour and 40 minutes. The reaction liquid was concentrated under reduced pressure. Thereafter, the resulting product was purified on a silica gel column, and 10.5 g of the intermediate (b) (white powder, yield: 50%) was obtained. The results of NMR measurement of the obtained intermediate (b) are shown below.

$^1$H-NMR (300 MHz, CDCl$_3$) 7.60 (s, 1H), 4.95 (brs, 2H), 3.80 (s, 3H), 3.60 (s, 3H)

(3) Synthesis of Intermediate (c)

100 mL of methanol was added to 130 mL of hydrazine monohydrate, which was cooled to 10° C. (inside temperature). 50.0 g (336 mmol) of 4,6-dichloropyrimidine was gradually added to the mixed solution (inside temperature: 20° C. or lower), which was then heated at 50° C. and stirred for 4 hours and 30 minutes. A crystal precipitated from the reaction liquid was filtered, washed with i-propanol, and dried. Thereby, 43.1 g of the intermediate (c) (white powder, yield: 92%) was obtained. The results of NMR measurement of the obtained intermediate (c) are shown below.

$^1$H-NMR (300 MHz, d$_6$-DMSO) 7.82 (s, 1H), 7.55 (s, 2H), 5.96 (s, 1H), 4.12 (s, 4H)

(4) Synthesis of Intermediate (d)

900 mL of water was added to 35.0 g (0.25 mol) of the intermediate (c) and 68.8 g (0.55 mol) of pivaloylacetonitrile, which was stirred at room temperature. 1 M hydrochloric acid aqueous solution was added dropwise into the suspension so as to give the pH of 3, which was then heated at 50° C. and stirred for 8 hours.

8 M potassium hydroxide aqueous solution was added dropwise into the reaction liquid, so as to adjust the pH to 8. Further, 1 M hydrochloric acid aqueous solution was added dropwise thereto so as to give the pH of 6. The precipitated crystal was filtered, washed with i-propanol, and dried. Thereby, 83.0 g of the intermediate (d) (white powder, yield: 94%) was obtained. The results of NMR measurement of the obtained intermediate (d) are shown below.

$^1$H-NMR (300 MHz, d$_6$-DMSO) 8.73 (s, 1H), 7.97 (s, 1H), 6.88 (s, 4H), 5.35 (s, 2H), 1.22 (s, 18H)

(5) Synthesis of Exemplified Compound (Pig.-1)

18.5 mL of acetic acid was added to 4.1 mL of concentrated sulfuric acid, which was cooled on ice and stirred. 3.85 g (12.1 mmol) of 40% nitrosylsulfuric acid was added dropwise thereto. 1.71 g (11.0 mmol) of the intermediate (b) was gradually added to the mixed solution (inside temperature: 0° C. or lower), which was then stirred at 0° C. for 2 hours. 150 mg of urea was added to the reaction liquid, which was stirred at 0° C. for 15 minutes to prepare a diazo solution A.

50 mL of methanol was added to the intermediate (d), which was heated and dissolved. Then, the resulting mixed solution was cooled on ice and stirred. The diazo solution A was slowly added dropwise to the mixed solution (inside temperature: 10° C. or lower). The reaction liquid was stirred at room temperature for 2 hours. A crystal precipitated was filtered, washed with methanol. Thereby, a crude crystal of the exemplified compound (Pig.-1) was obtained. Further, water was added to the crude crystal, which was stirred. The pH of the suspension was adjusted to 7 using a sodium hydroxide aqueous solution. 20 mL of dimethylacetamide was added thereto and stirred at 80° C. for 2 hours. A crystal precipitated was filtered and was suspended and washed with methanol. The obtained crystal was filtered and dried to give 2.0 g of the exemplified compound (Pig.-1) (yellow powder, yield: 79%).

Exemplified compounds (Pig.-18), (Pig.-49), and (Pig.-52) were synthesized in a manner substantially similar to the synthetic scheme described above.

Synthesis Example 2

—Synthesis of Styrene-Acrylic Acid Copolymer—

The components having the following monomer composition were mixed so that the whole content of monomer components was 100 parts by mass. As a polymerization initiator, 1 part by mass of 2,2'-azobis(2,4-dimethylvaleronitrile) was added thereto. Then, the nitrogen gas replacement was sufficiently carried out and a synthetic mixture was obtained.

| | |
|---|---|
| Styrene | 45 parts by mass |
| Acrylic acid | 10 parts by mass |
| Methacrylic acid | 10 parts by mass |
| Methyl methacrylate | 35 parts by mass |
| 2-mercaptoethanol | 0.1 part by mass |

Subsequently, while 100 parts by mass of methyl ethyl ketone was stirred under nitrogen atmosphere, the temperature was increased to 75° C. While the compound was stirred at 75° C., the synthetic mixture was added dropwise into the compound over 2 hours. Further, the reaction was continued while the mixture was stirred at 75° C. for 4 hours. Then, the synthetic compound was naturally cooled to 25° C. Thereafter, methyl ethyl ketone was added thereto so as to have a solid content of 50% to obtain a solution of styrene-acrylic acid copolymer having a weight average molecular weight of 35000.

Further, each solution of styrene-acrylic acid copolymer having the monomer composition described in Table 1 was produced in a manner substantially similar to the above-described method.

In this regard, the weight average molecular weight was calculated by gel permeation chromatography (GPC) in polystyrene conversion. The columns TSKgel SuperHZM-H, TSKgel SuperHZ4000, TSKgel SuperHZ200, (trade names; all manufactured by TOSOH CORPORATION) were used.

Synthesis Example 3

—Preparation of Self-Dispersing Fine Polymer Particles—

350.0 g of methyl ethyl ketone was placed in a 2 L three-necked flask equipped with a stirrer, a thermometer, a reflux condenser, and a nitrogen gas introducing tube, which was heated to 75° C. While the inside temperature of the reaction vessel was kept at 75° C., a mixed solution of 162.0 g of phenoxyethyl acrylate, 180.0 g of methyl methacrylate, 18.0 g of acrylic acid, 70 g of methyl ethyl ketone, and 1.44 g of V-601 (trade name; manufactured by Wako Pure Chemical Industries, Ltd.) was added dropwise at a constant speed so as to complete the dropping within 2 hours. After the dropping, a solution of 0.72 g of "V-601" and 36.0 g of methyl ethyl ketone was added thereto, which was stirred at 75° C. for 2 hours.

A solution of 0.72 g of "V-601" and 36.0 g of i-propanol was added to the resulting mixture, which was stirred at 75° C. for 2 hours, then heated to 85° C., and further stirred for 2 hours. The weight average molecular weight (Mw) of the obtained copolymer was 64000 which was calculated by gel permeation chromatography (GPC) in polystyrene conversion. The columns TSKgel SuperHZM-H, TSKgel SuperHZ4000, TSKgel SuperHZ200 (trade names; all manufactured by TOSOH CORPORATION) were used. The acid value was 38.9 (mgKOH/g).

Subsequently, 668.3 g of the obtained polymerization solution was weighed. 388.3 g of i-propanol and 145.7 mL of an NaOH aqueous solution (1 mol/L) were added thereto and the inside temperature of the reaction vessel was elevated to 80° C.

Subsequently, 720.1 g of distilled water was added dropwise thereto at a rate of 20 mL/min and water dispersion was performed. Thereafter, the inside temperature of the reaction vessel was kept at atmospheric pressure at 80° C. for 2 hours and then kept at 85° C. for 2 hours. Then, it was kept at 90° C. for 2 hours. Thereafter, the reaction vessel was depressurized. A total of 913.7 g of i-propanol, methyl ethyl ketone, and distilled water was distilled away and a water dispersion (emulsion) of self-dispersing fine polymer particles (B-01) having a solid matter concentration of 28.0% was obtained.

Example 1

5 mol/L sodium hydroxide aqueous solution was added to 7 parts by mass of the resulting 50% styrene-acrylic acid copolymer solution, which was neutralized. In this regard, the amount of alkali which completely neutralizes methacrylic acid or acrylic acid in the styrene-acrylic acid copolymer was added. The exemplified compound (Pig.-1), i.e., the azo pigment according to the invention (10 parts by mass) was added thereto, which was kneaded using a roll mill for 2 hours to 8 hours as needed. Thereafter, the kneaded product was dispersed in 100 parts by mass of ion exchange water. The organic solvent was completely removed from the obtained dispersion under reduced pressure at 55° C. The resulting product was concentrated by removing water and a water dispersion of vinyl polymer particles containing the azo pigment having a solid matter concentration of 15% was obtained.

Respective components shown in the following ink composition were mixed to prepare a water-based ink composition for inkjet recording of Example 101. The pH of the water-based ink composition for inkjet recording was measured using a pH meter (trade name: WM-50EG, manufactured by DKK-TOA CORPORATION) and pH was 8.5.

[Composition of Ink]

| | |
|---|---|
| Water dispersion of vinyl polymer particles containing azo pigment | 25 parts by mass |
| Glycerin | 5 parts by mass |
| Diethylene glycol | 5 parts by mass |
| Triethylene glycol monobutyl ether | 10 parts by mass |
| Polyoxypropylene glyceryl ether | 5 parts by mass |
| Dipropylene glycol | 5 parts by mass |
| Triethanolamine | 1 part by mass |
| OLFINE E1010 (trade name: manufactured by Nissin Chemical Industry Co., Ltd.) | 1 part by mass |
| Water dispersion of self-dispersing fine polymer particle (B-01) | 15 parts by mass |
| Ion exchanged water | 28 parts by mass |

[Evaluation]
—Dischargeability—

The obtained water-based ink composition for inkjet recording was placed into a container made of PET, which was sealed and left at 62° C. for 3 weeks.

Color photofinishing PRO (trade name; manufactured by Fuji Photo Film) was used as the recording medium and 1 million dots were printed using an inkjet recording apparatus (trade name: DMP-2831 PRINTER, manufactured by Fuji Photo Film Dimatix) under the following conditions; ink droplet amount: 2 pL, and discharge frequency: 20 kHz.

The printhead was capped and left under the general environment (temperature: 25±1° C., humidity: 50±5% RH) for 1 month. Thereafter, dummy jet (2000 shots) was carried out without maintenance and then a ratio of the number of undischarged nozzles was used to evaluate the dischargeability. The results of evaluation by the following evaluation criteria are shown in Table 1.

—Evaluation Criteria—

AA . . . The ratio of the number of undischarged nozzles is less than 4%.

A . . . The ratio of the number of undischarged nozzles is 4% or more but less than 8%.

B . . . The ratio of the number of undischarged nozzles is 8% or more but less than 12%.

C . . . The ratio of the number of undischarged nozzles is 12% or more.

Next, water-based ink compositions for inkjet recording of Examples 102 to 159 were respectively prepared in a manner substantially similar to the method described above except that the monomer composition of the styrene-acrylic acid copolymer, the addition amount (percent relative to the azo pigment) of the styrene-acrylic acid copolymer, and the type of azo pigment were changed to those shown in the following Table 1 in the preparation of the water-based ink composition for inkjet recording of Example 101. Then, the dischargeability was evaluated in a manner substantially similar to the method described above.

TABLE 1

| Example number | Pigment | Composition of styrene-acrylic acid copolymer (% by mass) | | | | Acid value (mgKOH/g) | Weight average molecular weight | Addition amount relative to pigment | Discharge-ability | Remark |
| --- | --- | --- | --- | --- | --- | --- | --- | --- | --- | --- |
| | | Styrene | Acrylic acid | Methacrylic acid | Other components | | | | | |
| Example 101 | Exemplified compound (Pig.-1) | 0 | 10 | 10 | Methyl methacrylate = 80 | 142.9 | 33000 | 35% | C | Comparative example |
| Example 102 | Exemplified compound (Pig.-1) | 20 | 10 | 10 | Methyl methacrylate = 60 | 142.9 | 36000 | 35% | C | Comparative example |
| Example 103 | Exemplified compound (Pig.-1) | 25 | 10 | 10 | Methyl methacrylate = 55 | 142.9 | 34000 | 35% | A | Present invention |
| Example 104 | Exemplified compound (Pig.-1) | 35 | 10 | 10 | Methyl methacrylate = 45 | 142.9 | 35500 | 35% | A | Present invention |
| Example 105 | Exemplified compound (Pig.-1) | 40 | 10 | 10 | Methyl methacrylate = 40 | 142.9 | 35000 | 35% | AA | Present invention |
| Example 106 | Exemplified compound (Pig.-1) | 55 | 10 | 10 | Methyl methacrylate = 25 | 142.9 | 36500 | 35% | AA | Present invention |
| Example 107 | Exemplified compound (Pig.-1) | 70 | 10 | 10 | Methyl methacrylate = 10 | 142.9 | 33500 | 35% | AA | Present invention |
| Example 108 | Exemplified compound (Pig.-1) | 75 | 10 | 10 | Methyl methacrylate = 5 | 142.9 | 34000 | 35% | A | Present invention |
| Example 109 | Exemplified compound (Pig.-1) | 80 | 10 | 10 | none | 142.9 | 36000 | 35% | A | Present invention |
| Example 110 | Exemplified compound (Pig.-1) | 54 | 3 | 3 | Methyl methacrylate = 40 | 42.9 | 34500 | 35% | B | Present invention |
| Example 111 | Exemplified compound (Pig.-1) | 55 | 4 | 3 | Methyl methacrylate = 38 | 50.6 | 36500 | 35% | A | Present invention |
| Example 112 | Exemplified compound (Pig.-1) | 55 | 4 | 5 | Methyl methacrylate = 36 | 63.7 | 33500 | 35% | AA | Present invention |
| Example 113 | Exemplified compound (Pig.-1) | 55 | 10 | 11 | Methyl methacrylate = 24 | 149.4 | 34500 | 35% | AA | Present invention |
| Example 114 | Exemplified compound (Pig.-1) | 55 | 11 | 11 | Methyl methacrylate = 23 | 157.2 | 36000 | 35% | A | Present invention |
| Example 115 | Exemplified compound (Pig.-1) | 55 | 17 | 17 | Methyl methacrylate = 11 | 242.9 | 34500 | 35% | A | Present invention |
| Example 116 | Exemplified compound (Pig.-1) | 55 | 18 | 18 | Methyl methacrylate = 9 | 257.2 | 36500 | 35% | B | Present invention |
| Example 117 | Exemplified compound (Pig.-1) | 40 | 10 | 10 | Methyl methacrylate = 40 | 142.9 | 20000 | 35% | A | Present invention |
| Example 118 | Exemplified compound (Pig.-1) | 40 | 10 | 10 | Methyl methacrylate = 40 | 142.9 | 30000 | 35% | AA | Present invention |
| Example 119 | Exemplified compound (Pig.-1) | 40 | 10 | 10 | Methyl methacrylate = 40 | 142.9 | 40000 | 35% | AA | Present invention |
| Example 120 | Exemplified compound (Pig.-1) | 40 | 10 | 10 | Methyl methacrylate = 40 | 142.9 | 49000 | 35% | A | Present invention |
| Example 121 | Exemplified compound (Pig.-1) | 40 | 10 | 10 | Methyl methacrylate = 40 | 142.9 | 100000 | 35% | B | Present invention |
| Example 122 | Exemplified compound (Pig.-1) | 40 | 10 | 10 | Methyl methacrylate = 40 | 142.9 | 35000 | 15% | A | Present invention |
| Example 123 | Exemplified compound (Pig.-1) | 40 | 10 | 10 | Methyl methacrylate = 40 | 142.9 | 35000 | 20% | AA | Present invention |
| Example 124 | Exemplified compound (Pig.-1) | 40 | 10 | 10 | Methyl methacrylate = 40 | 142.9 | 35000 | 35% | AA | Present invention |
| Example 125 | Exemplified compound (Pig.-1) | 40 | 10 | 10 | Methyl methacrylate = 40 | 142.9 | 35000 | 60% | AA | Present invention |
| Example 126 | Exemplified compound (Pig.-1) | 40 | 10 | 10 | Methyl methacrylate = 40 | 142.9 | 35000 | 65% | A | Present invention |
| Example 127 | Exemplified compound (Pig.-1) | 40 | 10 | 10 | Methyl methacrylate = 40 | 142.9 | 35000 | 100% | B | Present invention |
| Example 128 | Exemplified compound (Pig.-2) | 40 | 10 | 10 | Methyl methacrylate = 40 | 142.9 | 35000 | 35% | AA | Present invention |
| Example 129 | Exemplified compound (Pig.-3) | 40 | 10 | 10 | Methyl methacrylate = 40 | 142.9 | 35000 | 35% | AA | Present invention |
| Example 130 | Exemplified compound (Pig.-4) | 40 | 10 | 10 | Methyl methacrylate = 40 | 142.9 | 35000 | 35% | AA | Present invention |
| Example 131 | Exemplified compound (Pig.-6) | 40 | 10 | 10 | Methyl methacrylate = 40 | 142.9 | 35000 | 35% | AA | Present invention |
| Example 132 | Exemplified compound (Pig.-9) | 40 | 10 | 10 | Methyl methacrylate = 40 | 142.9 | 35000 | 35% | AA | Present invention |
| Example 133 | Exemplified compound (Pig.-10) | 40 | 10 | 10 | Methyl methacrylate = 40 | 142.9 | 35000 | 35% | AA | Present invention |
| Example 134 | Exemplified compound (Pig.-11) | 40 | 10 | 10 | Methyl methacrylate = 40 | 142.9 | 35000 | 35% | AA | Present invention |

TABLE 1-continued

| Example number | Pigment | Composition of styrene-acrylic acid copolymer (% by mass) | | | | Acid value (mgKOH/g) | Weight average molecular weight | Addition amount relative to pigment | Discharge-ability | Remark |
| --- | --- | --- | --- | --- | --- | --- | --- | --- | --- | --- |
| | | Styrene | Acrylic acid | Methacrylic acid | Other components | | | | | |
| Example 135 | Exemplified compound (Pig.-12) | 40 | 10 | 10 | Methyl methacrylate = 40 | 142.9 | 35000 | 35% | AA | Present invention |
| Example 136 | Exemplified compound (Pig.-15) | 40 | 10 | 10 | Methyl methacrylate = 40 | 142.9 | 35000 | 35% | AA | Present invention |
| Example 137 | Exemplified compound (Pig.-18) | 40 | 10 | 10 | Methyl methacrylate = 40 | 142.9 | 35000 | 35% | AA | Present invention |
| Example 138 | Exemplified compound (Pig.-19) | 40 | 10 | 10 | Methyl methacrylate = 40 | 142.9 | 35000 | 35% | AA | Present invention |
| Example 139 | Exemplified compound (Pig.-21) | 40 | 10 | 10 | Methyl methacrylate = 40 | 142.9 | 35000 | 35% | AA | Present invention |
| Example 140 | Exemplified compound (Pig.-24) | 40 | 10 | 10 | Methyl methacrylate = 40 | 142.9 | 35000 | 35% | AA | Present invention |
| Example 141 | Exemplified compound (Pig.-25) | 40 | 10 | 10 | Methyl methacrylate = 40 | 142.9 | 35000 | 35% | AA | Present invention |
| Example 142 | Exemplified compound (Pig.-34) | 40 | 10 | 10 | Methyl methacrylate = 40 | 142.9 | 35000 | 35% | AA | Present invention |
| Example 143 | Exemplified compound (Pig.-35) | 40 | 10 | 10 | Methyl methacrylate = 40 | 142.9 | 35000 | 35% | AA | Present invention |
| Example 144 | Exemplified compound (Pig.-36) | 40 | 10 | 10 | Methyl methacrylate = 40 | 142.9 | 35000 | 35% | AA | Present invention |
| Example 145 | Exemplified compound (Pig.-37) | 40 | 10 | 10 | Methyl methacrylate = 40 | 142.9 | 35000 | 35% | AA | Present invention |
| Example 146 | Exemplified compound (Pig.-42) | 40 | 10 | 10 | Methyl methacrylate = 40 | 142.9 | 35000 | 35% | A | Present invention |
| Example 147 | Exemplified compound (Pig.-43) | 40 | 10 | 10 | Methyl methacrylate = 40 | 142.9 | 35000 | 35% | A | Present invention |
| Example 148 | Exemplified compound (Pig.-45) | 40 | 10 | 10 | Methyl methacrylate = 40 | 142.9 | 35000 | 35% | A | Present invention |
| Example 149 | Exemplified compound (Pig.-46) | 40 | 10 | 10 | Methyl methacrylate = 40 | 142.9 | 35000 | 35% | A | Present invention |
| Example 150 | Exemplified compound (Pig.-47) | 40 | 10 | 10 | Methyl methacrylate = 40 | 142.9 | 35000 | 35% | A | Present invention |
| Example 151 | Exemplified compound (Pig.-50) | 40 | 10 | 10 | Methyl methacrylate = 40 | 142.9 | 35000 | 35% | A | Present invention |
| Example 152 | Exemplified compound (Pig.-51) | 40 | 10 | 10 | Methyl methacrylate = 40 | 142.9 | 35000 | 35% | A | Present invention |
| Example 153 | Exemplified compound (Pig.-57) | 40 | 10 | 10 | Methyl methacrylate = 40 | 142.9 | 35000 | 35% | A | Present invention |
| Example 154 | Exemplified compound (Pig.-60) | 40 | 10 | 10 | Methyl methacrylate = 40 | 142.9 | 35000 | 35% | A | Present invention |
| Example 155 | Exemplified compound (Pig.-69) | 40 | 10 | 10 | Methyl methacrylate = 40 | 142.9 | 35000 | 35% | B | Present invention |
| Example 156 | Exemplified compound (Pig.-70) | 40 | 10 | 10 | Methyl methacrylate = 40 | 142.9 | 35000 | 35% | B | Present invention |
| Example 157 | C.I. Pigment Yellow 74 | 0 | 10 | 10 | Methyl methacrylate = 80 | 142.9 | 33000 | 35% | C | Comparative example |
| Example 158 | C.I. Pigment Yellow 74 | 20 | 10 | 10 | Methyl methacrylate = 60 | 142.9 | 36000 | 35% | C | Comparative example |
| Example 159 | C.I. Pigment Yellow 74 | 40 | 10 | 10 | Methyl methacrylate = 40 | 142.9 | 35000 | 35% | C | Comparative example |

From Examples 101 to 109, it is found that a good result was obtained in the evaluation of the clogging in ink discharge even after storage at high temperatures when the exemplified compound (Pig.-1) of the invention was used as the pigment and the total amount of styrene, acrylic acid, and methacrylic acid in the styrene-acrylic acid copolymer was in a range of from 45% by weight to 100% by weight, and a particularly good result was obtained when the total amount of styrene, acrylic acid, and methacrylic acid in the styrene-acrylic acid copolymer was in a range of from 60% by weight to 90% by weight.

From Examples 110 to 116, it is found that a good result was obtained when the exemplified compound (Pig.-1) of the invention was used as the pigment, the styrene-acrylic acid copolymer contained styrene, acrylic acid, and methacrylic acid, and the acid value of the styrene-acrylic acid copolymer was in a range of from 50 mgKOH/g to 250 mgKOH/g, and a particularly good result was obtained when the acid value was in a range of from 60 mgKOH/g to 150 mgKOH/g.

From Examples 117 to 121, it is found that a good result was obtained when the exemplified compound (Pig.-1) of the invention was used as the pigment and the weight average molecular weight of the styrene-acrylic acid copolymer was in a range of from 20,000 to 50,000, and a particularly good result was obtained when the weight average molecular weight of the styrene-acrylic acid copolymer was in a range of from 30,000 to 40,000.

From Examples 122 to 127, it is found that a particularly good result was obtained when the exemplified compound (Pig.-1) of the invention was used as the pigment and the addition amount of the styrene-acrylic acid copolymer relative to the pigment was in a range of from 20% by weight to 60% by weight.

From Examples 105, 128 to 145, 153 and 154, it is found that a good result was obtained when the exemplified compounds (Pig.-1) to (Pig.-4), (Pig.-6), (Pig.-9) to (Pig.-12), (Pig.-15), (Pig.-18), (Pig.-19), (Pig.-21), (Pig.-24), (Pig.-25), (Pig.-35) to (Pig.-37), (Pig.-57) or (Pig.-60) of the invention was used as the pigment. Further, it is found that a particularly good result was obtained in the case of n=2 in the azo pigment represented by Formula (1).

From Examples 105, 146 to 152, 155 and 156, it is found that a good result was obtained when the exemplified compounds (Pig.-42), (Pig.-43), (Pig.-45) to (Pig.-47), (Pig.-50), (Pig.-51), (Pig.-69) or (Pig.-70) of the invention was used as the pigment. Further, it is found that a particularly good result was obtained in the case of n=2 in the azo pigment represented by Formula (1).

From Examples 157 to 159, it is found that the dischargeability was deteriorated when C.I. Pigment Yellow 74 was used as the pigment.

Comparative Example 1

A vinyl polymer was synthesized using C.I. Pigment Yellow 74 or the exemplified compound (Pig.-1) in the invention as the pigment in accordance with Synthesis Example described in JP-A No. 2000-239594 (paragraphs 0053 to 0059), and a dispersion liquid of vinyl polymer particles containing the pigment was produced. Then, a water-based ink composition for inkjet recording containing the dispersion liquid was prepared according to the method of Example 1 in the invention.

The dischargeability as to the above-described ink was evaluated in accordance with the method of Example 1 in the invention. The obtained results are shown in Table 2.

late. The dischargeability was evaluated in a manner substantially similar to that in Example 1 and good performance similar to those of Examples 105, 128 to 156 was exhibited.

Example 3

Water-based ink compositions for inkjet recording were prepared in a manner substantially similar to those in Examples 103 to 127 except that methacrylic acid in Examples 103 to 127 of Example 1 was changed to acrylic acid so as to have an equivalent acid value. The dischargeability was evaluated in a manner substantially similar to that in Example 1 and good performance similar to those of Examples 103 to 127 was exhibited.

Example 4

Water-based ink compositions for inkjet recording were prepared in a manner substantially similar to those in Examples 103 to 127 except that acrylic acid in Examples 103 to 127 of Example 1 was changed to methacrylic acid so as to have an equivalent acid value. The dischargeability was evaluated in a manner substantially similar to that of Example 1 and good performance similar to those in Examples 103 to 127 was exhibited.

Example 5

In Examples 1 to 4, the water-based ink composition for inkjet recording was placed into a high density polyethylene container (instead of the container made of PET), which was

TABLE 2

| Example number | Pigment | Dispersing agent | Addition amount of polymer dispersing agent relative to pigment (% by weight) | Dischargeability | Remark 1 | Remark 2 |
|---|---|---|---|---|---|---|
| Example 201 | C.I. Pigment Yellow 74 | [a copolymer of n-butyl methacrylate (35% by weight), n-butyl acrylate (10% by weight), 2-hydroxyethyl methacrylate (15% by weight), methacrylic acid (20% by weight) and styrene (20% by weight)] | 35 | C | Comparative example | Example 1 of JP-A No. 2000-239594 |
| Example 202 | Exemplified compound (Pig.-1) | [a copolymer of n-butyl methacrylate (35% by weight), n-butyl acrylate (10% by weight), 2-hydroxyethyl methacrylate (15% by weight), methacrylic acid (20% by weight) and styrene (20% by weight)] | 35 | C | Comparative example | Example 1 of JP-A No. 2000-239594 |

From Examples 201 and 202, a good dischargeability was not obtained when the water-based dispersion liquid described in JP-A No. 2000-239594 was used and the dispersing agent described in JP-A No. 2000-239594 was used in combination with the pigment of the invention.

Example 2

Water-based ink compositions for inkjet recording were prepared in a manner substantially similar to those in Examples 105, 128 to 156 except that methyl methacrylate of the styrene-acrylic acid copolymer in Examples 105, 128 to 156 of Example 1 was changed to methyl acrylate, ethyl acrylate, ethyl methacrylate, butyl methacrylate, 2-ethylhexyl methacrylate, cyclohexyl methacrylate, cyclohexyl acrylate, benzyl methacrylate, or phenoxy ethyl methacrysealed and left at room temperature for 3 months (instead of leaving at 62° C. for 3 weeks). Thereafter, the dischargeability was evaluated in a manner substantially similar to that in Example 1. It is confirmed that the water-based ink composition for inkjet recording of the invention exhibited good performance as those in Examples 1 to 4.

Example 6

Water-based ink compositions for inkjet recording were produced in a manner substantially similar to those in Examples 1 to 5 except that the ink in which the water dispersion of self-dispersing fine polymer particle (B-01) was changed to ion exchange water was prepared in the preparation of the water-based ink in Examples 1 to 5. The dischargeability was evaluated in a manner substantially similar to that in Example 1 and good performance similar to those in Examples 1 to 5 was exhibited.

Example 7

Dischargeability was evaluated in a manner substantially similar to that in Example 1 except that, as a recording medium, YOU RIGHT (trade name; manufactured by Nippon Paper Industries Co., Ltd.), XEROX 4024 (trade name; manufactured by Fuji Xerox Co., Ltd.), OK PRINCE HIGH QUALITY (trade name; manufactured by Oji Paper Co., Ltd.), SHIORAI (trade name; manufactured by Nippon Paper Industries Co., Ltd.), OK EVER LIGHT COAT (trade name; manufactured by Oji Paper Co., Ltd.), AURORA COAT (trade name; manufactured by Nippon Paper Industries Co., Ltd.) or TOKUBISHI ART (trade name; manufactured by Mitsubishi Paper Mills Limited) was used in place of color photofinishing PRO (trade name; manufactured by Fuji Photo Film) in Examples 1 to 6. It is confirmed that good performance as those in Examples 1 to 6 was obtained when the water-based ink composition for inkjet recording of the invention was used.

According to the invention, a water-based ink composition for inkjet recording which is excellent in discharge stability after long-term storage or after aging at high temperatures may be provided.

Namely, the present invention may provide the following items <1> to <19>.

<1> A water-based ink composition for inkjet recording, including vinyl polymer particles and a water-based liquid medium, the vinyl polymer particles including: a styrene-acrylic acid copolymer including a constitutional unit derived from a styrene monomer and a constitutional unit derived from at least either acrylic acid or methacrylic acid in which the total content of the constitutional units derived from the styrene monomer, acrylic acid, and methacrylic acid is 45% by mass or more; and at least one of an azo pigment represented by the following Formula (1), a tautomer thereof, a salt of the azo pigment or tautomer, or a hydrate of the azo pigment or tautomer:

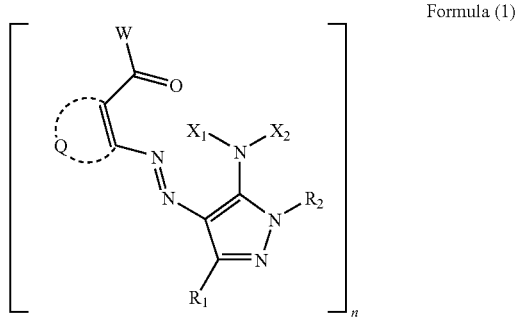

Formula (1)

wherein, in Formula 1, Q represents a 5- to 7-membered heterocycle together with two carbon atoms to which Q is bonded; W represents an alkoxy group, an amino group, an alkyl group, or an aryl group; $X_1$ and $X_2$ each independently represent a hydrogen atom, an alkyl group, an acyl group, an alkylsulfonyl group, or an arylsulfonyl group; $R_1$ represents a hydrogen atom or a substituent; $R_2$ represents a heterocyclic group; and n represents an integer of 1 to 4, provided that in the case of n=2 to 4, Formula (1) represents a dimer, a trimer, or a tetramer which is bonded via Q, W, $X_1$, $X_2$, $R_1$, or $R_2$.

<2> The water-based ink composition for inkjet recording according to the item <1>, wherein the total content of the constitutional unit derived from the styrene monomer, acrylic acid, and methacrylic acid is in a range of from 60% by mass to 90% by mass in the styrene-acrylic acid copolymer.

<3> The water-based ink composition for inkjet recording according to the item <1> or the item <2>, wherein an acid value of the styrene-acrylic acid copolymer is in a range of from 50 mgKOH/g to 250 mgKOH/g.

<4> The water-based ink composition for inkjet recording according to any one of the items <1> to <3>, wherein a weight average molecular weight (Mw) of the styrene-acrylic acid copolymer is from 20,000 to 50,000.

<5> The water-based ink composition for inkjet recording according to any one of the items <1> to <4>, wherein the styrene-acrylic acid copolymer is a styrene-acrylic acid-methacrylic acid-methacrylic acid ester copolymer.

<6> The water-based ink composition for inkjet recording according to any one of the items <1> to <5>, wherein the azo pigment represented by Formula (1) is represented by the following Formula (2):

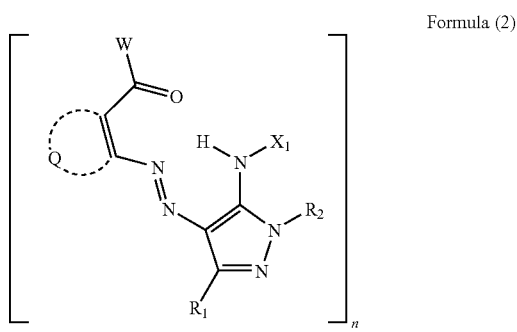

Formula (2)

wherein, in Formula (2), Q represents a 5- to 7-membered heterocycle together with two carbon atoms to which Q is bonded; W represents an alkoxy group, an amino group, an alkyl group, or an aryl group; $X_1$ represents a hydrogen atom, an alkyl group, an acyl group, an alkylsulfonyl group, or an arylsulfonyl group; $R_1$ represents a hydrogen atom or a substituent; $R_2$ represents a heterocyclic group; and n represents an integer of 1 to 4 provided that in the case of n=2 to 4, Formula (2) represents a dimer, a trimer or a tetramer which is bonded via Q, W, $X_1$, $R_1$, or $R_2$.

<7> The water-based ink composition for inkjet recording according to any one of the items <1> to <6>, wherein Q in Formula (1) or Formula (2) represents a 5-membered nitrogen-containing heterocycle together with two carbon atoms to which Q is bonded.

<8> The water-based ink composition for inkjet recording according to any one of the items <1> to <7>, wherein n in Formula (1) or Formula (2) is 2.

<9> The water-based ink composition for inkjet recording according to any one of the items <6> to <8>, wherein $X_1$ in Formula (2) is a hydrogen atom.

<10> The water-based ink composition for inkjet recording according to any one of the items <1> to <5>, wherein the azo pigment represented by Formula (1) is represented by the following Formula (3):

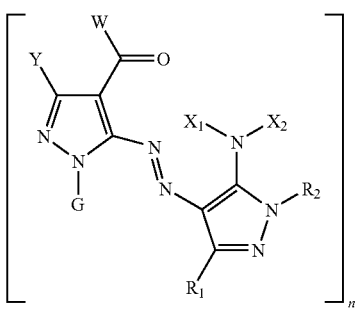

Formula (3)

wherein, in Formula (3), Y represents a hydrogen atom or a substituent; G represents a hydrogen atom, an alkyl group, a cycloalkyl group, an aralkyl group, an alkenyl group, an alkynyl group, an aryl group, or a heterocyclic group; W represents an alkoxy group, an amino group, an alkyl group, or an aryl group; $X_1$ and $X_2$ each independently represent a hydrogen atom, an alkyl group, an acyl group, an alkylsulfonyl group, or an arylsulfonyl group; $R_1$ represents a hydrogen atom or a substituent; $R_2$ represents a heterocyclic group; and n represents an integer of 1 to 4 provided that in the case of n=2 to 4, Formula (3) represents a dimer, a trimer or a tetramer which is bonded via G, Y, W, $X_1$, $X_2$, $R_1$, or $R_2$.

<11> The water-based ink composition for inkjet recording according to any one of the items <1> to <10>, wherein W in any one of Formulae (1) to (3) is an alkoxy group whose total number of carbon atoms is 3 or less, an amino group, or an alkylamino group whose total number of carbon atoms is 3 or less.

<12> The water-based ink composition for inkjet recording according to the item <10>, wherein G in Formula (3) is an alkyl group whose total number of carbon atoms is 3 or less.

<13> The water-based ink composition for inkjet recording according to any one of the items <10> to <12>, wherein $X_1$ in Formula (3) is a hydrogen atom.

<14> The water-based ink composition for inkjet recording according to any one of the items <10> to <13>, wherein the azo pigment represented by Formula (3) is represented by the following Formula (4):

Formula (4)

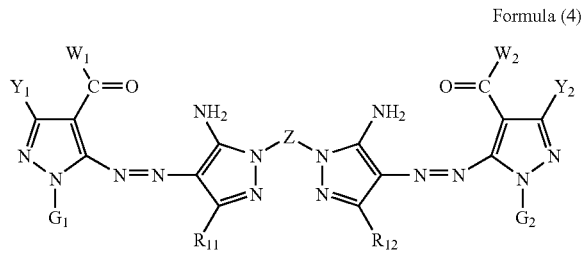

wherein, in Formula (4), Z represents a divalent group derived from a 5- to 8-membered nitrogen-containing heterocycle; $Y_1$, $Y_2$, $R_{11}$, and $R_{12}$ each independently represent a hydrogen atom or a substituent; $G_1$ and $G_2$ each independently represent a hydrogen atom, an alkyl group, an aralkyl group, an alkenyl group, an alkynyl group, an aryl group, or a heterocyclic group; and $W_1$ and $W_2$ each independently represent an alkoxy group, an amino group, an alkyl group, or an aryl group.

<15> The water-based ink composition for inkjet recording according to the item <14>, wherein $W_1$ and $W_2$ in Formula (4) each independently represent an alkoxy group whose total number of carbon atoms is 3 or less, an amino group, or an alkylamino group whose total number of carbon atoms is 3 or less.

<16> The water-based ink composition for inkjet recording according to the items <14> or <15>, wherein $G_1$ and $G_2$ in Formula (4) each independently represent an alkyl group whose total number of carbon atoms is 3 or less.

<17> The water-based ink composition for inkjet recording according to any one of the items <14> to <16>, wherein Z in Formula (4) is a divalent group derived from a 6-membered nitrogen-containing heterocycle.

<18> The water-based ink composition for inkjet recording according to any one of the items <14> to <17>, wherein $Y_1$ and $Y_2$ in Formula (4) each independently represent a hydrogen atom, a methyl group, a phenyl group, or a methylthio group.

<19> The water-based ink composition for inkjet recording according to any one of the items <14> to <18>, wherein $R_{11}$ and $R_{12}$ in Formula (4) each independently represent a straight chain or branched alkyl group whose total number of carbon atoms is from 1 to 8.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. A water-based ink composition for inkjet recording, comprising vinyl polymer particles and a water-based liquid medium, the vinyl polymer particles including:

a styrene-(meth)acrylic acid copolymer including a constitutional unit derived from a styrene monomer and a constitutional unit derived from at least either acrylic acid or methacrylic acid, in which the total content of the constitutional units derived from the styrene monomer, acrylic acid, and methacrylic acid is 45% by mass or more with respect to a total amount of all monomers constituting the styrene-(meth)acrylic acid copolymer; and at least one of an azo pigment represented by the following Formula (1), a tautomer thereof, a salt of the azo pigment or tautomer, or a hydrate of the azo pigment or tautomer:

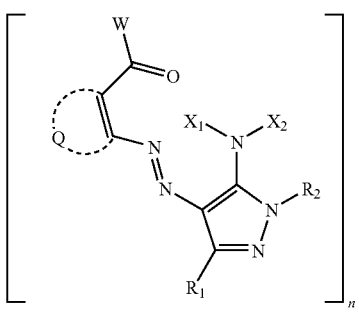

Formula (1)

wherein, in Formula (1), Q represents a 5- to 7-membered heterocycle together with two carbon atoms to which Q is bonded; W represents an alkoxy group, an amino group, an alkyl group, or an aryl group; $X_1$ and $X_2$ each independently represent a hydrogen atom, an alkyl group, an acyl group, an alkylsulfonyl group, or an arylsulfonyl group; $R_1$ represents a hydrogen atom or a substituent; $R_2$ represents a heterocyclic group; and n represents an integer of 1 to 4, provided that in the case of n=2 to 4, Formula (1) represents a dimer, a trimer, or a tetramer which is bonded via Q, W, $X_1$, $X_2$, $R_1$, or $R_2$.

2. The water-based ink composition for inkjet recording according to claim 1, wherein the total content of the constitutional units derived from the styrene monomer, acrylic acid, and methacrylic acid is in a range of from 60% by mass to 90% by mass with respect to the total amount of all monomers constituting the styrene-(meth)acrylic acid copolymer.

3. The water-based ink composition for inkjet recording according to claim 1, wherein an acid value of the styrene-(meth)acrylic acid copolymer is in a range of from 50 mgKOH/g to 250 mgKOH/g.

4. The water-based ink composition for inkjet recording according to claim 1, wherein a weight average molecular weight (Mw) of the styrene-(meth)acrylic acid copolymer is from 20,000 to 50,000.

5. The water-based ink composition for inkjet recording according to claim 1, wherein the styrene-(meth)acrylic acid copolymer is a styrene-acrylic acid-methacrylic acid-methacrylic acid ester copolymer.

6. The water-based ink composition for inkjet recording according to claim 1, wherein the azo pigment represented by Formula (1) is represented by the following Formula (2):

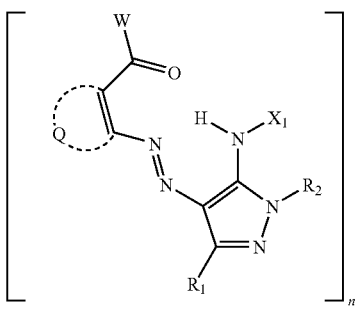

Formula (2)

wherein, in Formula (2), Q represents a 5- to 7-membered heterocycle together with two carbon atoms to which Q is bonded; W represents an alkoxy group, an amino group, an alkyl group, or an aryl group; $X_1$ represents a hydrogen atom, an alkyl group, an acyl group, an alkylsulfonyl group, or an arylsulfonyl group; $R_1$ represents a hydrogen atom or a substituent; $R_2$ represents a heterocyclic group; and n represents an integer of 1 to 4, provided that in the case of n=2 to 4, Formula (2) represents a dimer, a trimer or a tetramer which is bonded via Q, W, $X_1$, $R_1$, or $R_2$.

7. The water-based ink composition for inkjet recording according to claim 1, wherein Q in Formula (1) represents a 5-membered nitrogen-containing heterocycle together with two carbon atoms to which Q is bonded.

8. The water-based ink composition for inkjet recording according to claim 1, wherein n in Formula (1) is 2.

9. The water-based ink composition for inkjet recording according to claim 6, wherein $X_1$ in Formula (2) is a hydrogen atom.

10. The water-based ink composition for inkjet recording according to claim 1, wherein the azo pigment represented by Formula (1) is represented by the following Formula (3):

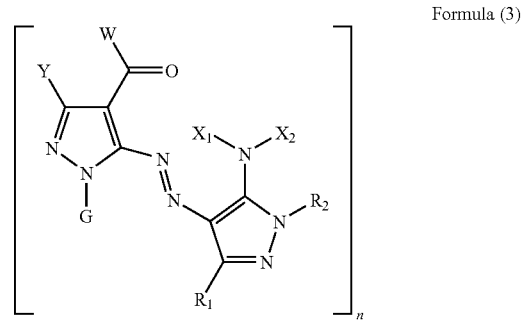

Formula (3)

wherein, in Formula (3), Y represents a hydrogen atom or a substituent; G represents a hydrogen atom, an alkyl group, a cycloalkyl group, an aralkyl group, an alkenyl group, an alkynyl group, an aryl group, or a heterocyclic group; W represents an alkoxy group, an amino group, an alkyl group, or an aryl group; $X_1$ and $X_2$ each independently represent a hydrogen atom, an alkyl group, an acyl group, an alkylsulfonyl group, or an arylsulfonyl group; $R_1$ represents a hydrogen atom or a substituent; $R_2$ represents a heterocyclic group; and n represents an integer of 1 to 4, provided that in the case of n=2 to 4, Formula (3) represents a dimer, a trimer or a tetramer which is bonded via G, Y, W, $X_1$, $X_2$, $R_1$, or $R_2$.

11. The water-based ink composition for inkjet recording according to claim 1, wherein W in Formula (1) is an alkoxy group whose total number of carbon atoms is 3 or less, an amino group, or an alkylamino group whose total number of carbon atoms is 3 or less.

12. The water-based ink composition for inkjet recording according to claim 10, wherein G in Formula (3) is an alkyl group whose total number of carbon atoms is 3 or less.

13. The water-based ink composition for inkjet recording according to claim 12, wherein $X_1$ in Formula (3) is a hydrogen atom.

14. The water-based ink composition for inkjet recording according to claim 10, wherein the azo pigment represented by Formula (3) is represented by the following Formula (4):

Formula (4)

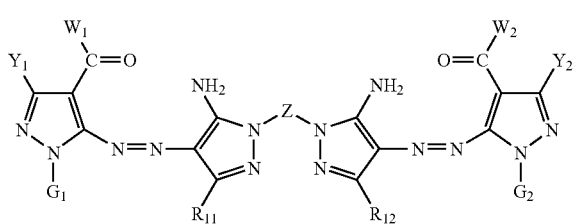

wherein, in Formula (4), Z represents a divalent group derived from a 5- to 8-membered nitrogen-containing heterocycle; $Y_1$, $Y_2$, $R_{11}$, and $R_{12}$ each independently represent a hydrogen atom or a substituent; $G_1$ and $G_2$ each independently represent a hydrogen atom, an alkyl group, an aralkyl group, an alkenyl group, an alkynyl group, an aryl group, or a heterocyclic group; and $W_1$ and $W_2$ each independently represent an alkoxy group, an amino group, an alkyl group, or an aryl group.

15. The water-based ink composition for inkjet recording according to claim 14, wherein $W_1$ and $W_2$ in Formula (4) each independently represent an alkoxy group whose total number of carbon atoms is 3 or less, an amino group, or an alkylamino group whose total number of carbon atoms is 3 or less.

16. The water-based ink composition for inkjet recording according to claim 14, wherein $G_1$ and $G_2$ in Formula (4) each independently represent an alkyl group whose total number of carbon atoms is 3 or less.

17. The water-based ink composition for inkjet recording according to claim 14, wherein Z in Formula (4) is a divalent group derived from a 6-membered nitrogen-containing heterocycle.

18. The water-based ink composition for inkjet recording according to claim 14, wherein $Y_1$ and $Y_2$ in Formula (4) each independently represent a hydrogen atom, a methyl group, a phenyl group, or a methylthio group.

19. The water-based ink composition for inkjet recording according to claim 14, wherein $R_{11}$ and $R_{12}$ in Formula (4) each independently represent a straight chain or branched alkyl group whose total number of carbon atoms is from 1 to 8.

* * * * *